United States Patent
Shibata et al.

(10) Patent No.: US 12,435,467 B2
(45) Date of Patent: Oct. 7, 2025

(54) DYEING SYSTEM

(71) Applicant: NIDEK CO., LTD., Gamagori (JP)

(72) Inventors: Ryoji Shibata, Gamagori (JP); Minoru Inuzuka, Gamagori (JP); Koji Abe, Gamagori (JP); Motoshi Tanaka, Gamagori (JP)

(73) Assignee: NIDEK CO., LTD., Gamagori (JP)

( * ) Notice: Subject to any disclaimer, the term of this patent is extended or adjusted under 35 U.S.C. 154(b) by 905 days.

(21) Appl. No.: 16/943,416

(22) Filed: Jul. 30, 2020

(65) Prior Publication Data

US 2021/0032809 A1 Feb. 4, 2021

(30) Foreign Application Priority Data

Jul. 30, 2019 (JP) .................................. 2019-140255
Jul. 30, 2019 (JP) .................................. 2019-140256
(Continued)

(51) Int. Cl.
*D06P 5/20* (2006.01)
*B05C 9/14* (2006.01)
(Continued)

(52) U.S. Cl.
CPC .............. *D06P 5/2072* (2013.01); *B05C 9/14* (2013.01); *B05C 11/1021* (2013.01);
(Continued)

(58) Field of Classification Search
USPC ............ 118/313–315, 324, 500, 300, 72–74, 118/641–643, 712, 686, 695–698;
(Continued)

(56) References Cited

U.S. PATENT DOCUMENTS 8,028,650 B2 * 10/2011 Jinbo ....................... G02B 1/10
118/62
2009/0314203 A1 * 12/2009 Nakamura ....... B29D 11/00365
118/642
(Continued)

FOREIGN PATENT DOCUMENTS

JP 2004037467 A * 2/2004
JP 2011-209645 A 10/2011
(Continued)

OTHER PUBLICATIONS

English Translation JP2004037467 A (Year: 2004).*
(Continued)

*Primary Examiner* — Yewebdar T Tadesse
(74) *Attorney, Agent, or Firm* — Oliff PLC

(57) ABSTRACT

A dyeing system includes a conveyance device, a reader, a dye fixing device, and a controller. The conveyance device conveys a conveyance unit including the resin body. The reader reads information relating to the conveyance unit. The dye fixing device heats the resin body in the conveyance unit conveyed by the conveyance device and fixes a dye adhering to a surface of the resin body, on the resin body. The controller acquires a parameter for a process executed to the resin body in the conveyance unit, based on the information read by the reader. The controller controls the dye fixing device based on the acquired parameter.

15 Claims, 17 Drawing Sheets

(30) Foreign Application Priority Data

| | | | |
|---|---|---|---|
| Jan. 15, 2020 | (JP) | ................................. | 2020-004757 |
| Jan. 15, 2020 | (JP) | ................................. | 2020-004758 |
| Jan. 15, 2020 | (JP) | ................................. | 2020-004759 |
| Jan. 15, 2020 | (JP) | ................................. | 2020-004760 |
| Jan. 15, 2020 | (JP) | ................................. | 2020-004761 |

(51) Int. Cl.
- B05C 11/10 (2006.01)
- B05C 13/02 (2006.01)
- C23C 18/16 (2006.01)
- D06P 3/00 (2006.01)
- G02C 7/10 (2006.01)

(52) U.S. Cl.
CPC .......... B05C 13/02 (2013.01); C23C 18/1667 (2013.01); D06P 3/00 (2013.01); D06P 5/2011 (2013.01); G02C 7/108 (2013.01)

(58) Field of Classification Search
USPC .................. 264/1.1, 1.36, 1.38; 425/805
See application file for complete search history.

(56) References Cited

U.S. PATENT DOCUMENTS

| | | |
|---|---|---|
| 2013/0008374 A1 | 1/2013 | Ookubo et al. |
| 2016/0002768 A1* | 1/2016 | Ota .................. C23C 14/542 |
| | | 118/697 |
| 2018/0127918 A1 | 5/2018 | Inuzuka et al. |

FOREIGN PATENT DOCUMENTS

| | | | |
|---|---|---|---|
| JP | 2012-107910 A | | 6/2012 |
| JP | 2018-127722 A | | 8/2018 |
| JP | 2018183932 A | * | 11/2018 |
| WO | 2019/048041 A1 | | 3/2019 |

OTHER PUBLICATIONS

English Translation JP2018183932A (Year: 2018).*
Dec. 21, 2021 Office Action issued in European Patent Application No. 20188372.5.
Mar. 22, 2021 extended Search Report issued in European Patent Application No. 20188372.5.
May 22, 2025 Office Action issued in Korean Application No. KR 10-2020-0092092.

\* cited by examiner

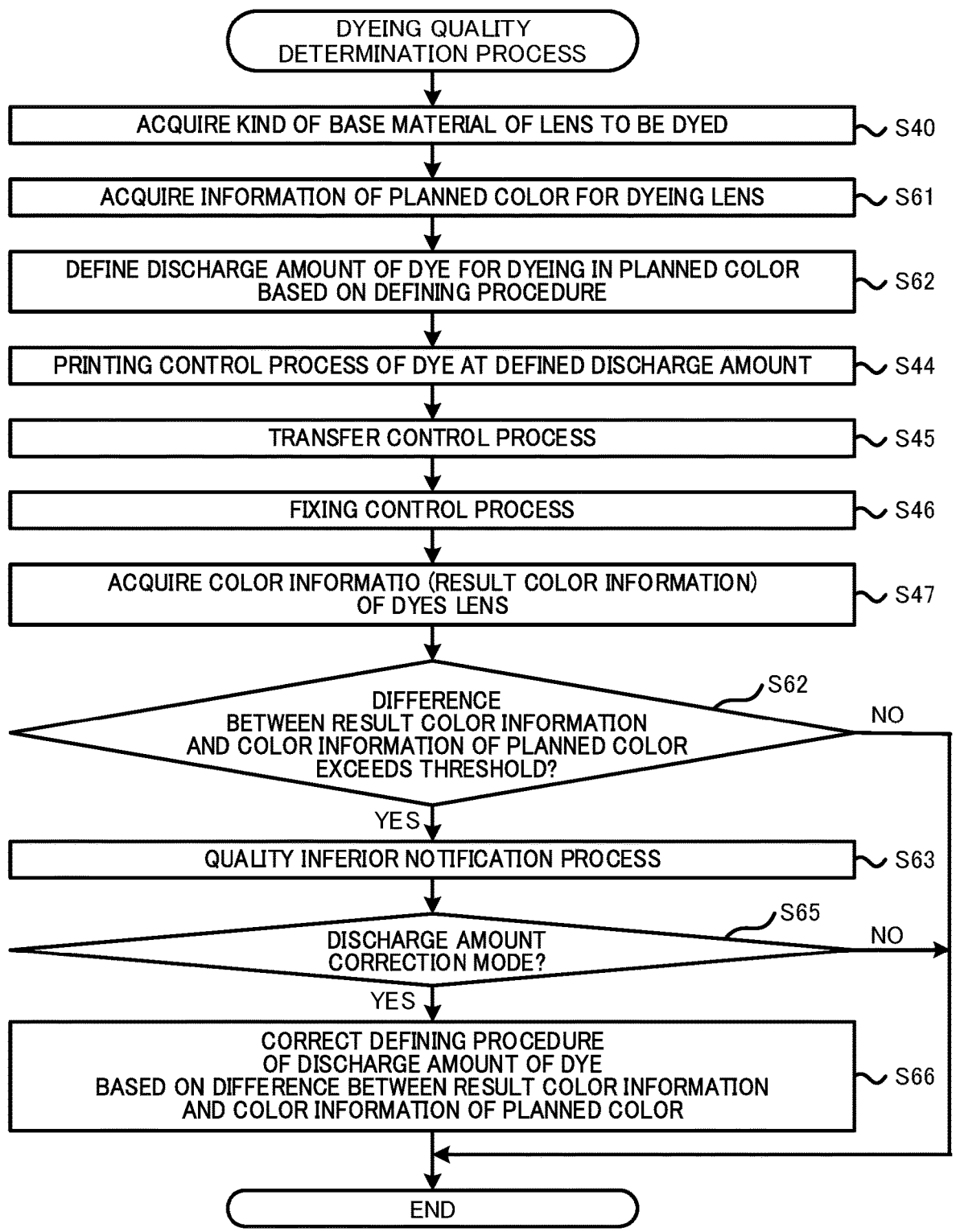

DYEING SYSTEM

CROSS-REFERENCE TO RELATED APPLICATION

This application is based upon and claims the benefit of priority of Japanese Patent Applications No. 2019-140255 filed on Jul. 30, 2019, No. 2019-140256 filed on Jul. 30, 2019, No. 2020-004757 filed on Jan. 15, 2020, No. 2020-004758 filed on Jan. 15, 2020, No. 2020-004759 filed on Jan. 15, 2020, No. 2020-004760 filed on Jan. 15, 2020, and No. 2020-004761 filed on Jan. 15, 2020, the contents of which are incorporated herein by reference in their entirety.

BACKGROUND

The present disclosure relates to a dyeing system that dyes a resin body.

Various techniques for dyeing a resin body such as a plastic lens have been proposed. For example, in a dyeing method called a dip dyeing method, a resin body is dipped into a dyeing solution to a dye the resin body. However, in the dip dyeing method, it is difficult to keep an operation environment clean, and also difficult to dye a certain resin body (for example, a lens having a high refraction index, or the like).

Thus, a technique that transfers dye to a surface of the resin body and heats the resin body to which the dye adheres so to dye the resin body has been proposed. For example, Japanese Patent Application Publication No. 2018-127722 discloses a dyeing method that applies a sublimable dye to a substrate using an inkjet printer. In a state in which the resin body and the substrate are arranged in a vacuum in a non-contact manner, the sublimable dye applied to the substrate is sublimed, so that the dye is transferred to the resin body. And then, the resin body is irradiated with a laser beam to heat the resin body, so that the dye is fixed on the resin body.

SUMMARY

In the conventional method, many processes are manually operated by an operator when the resin body is dyed. Accordingly, a technique that the resin body is dyed automatically is desired. However, a specific process that dyes the resin body is changed in accordance with various conditions. For example, in a process that heats the resin body to fix the dye, a specific method for heating the resin body should be changed as needed depending on a shape or the like of the resin body.

Embodiments of the broad principles derived herein provide a dyeing system capable of automatically and appropriately dyeing a resin body.

Embodiments provide a dyeing system that dyes a resin body. The dye system includes: a conveyance device that conveys a conveyance unit including the resin body; a reader that reads information relating to the conveyance unit; a dye fixing device that heats the resin body in the conveyance unit conveyed by the conveyance device and fixes a dye adhering to a surface of the resin body, on the resin body; and a controller. The controller executes a parameter acquisition step that acquires a parameter for a process executed to the resin body in the conveyance unit, based on the information read by the reader. And, when the controller causes the dye fixing device to heat the resin body in the conveyance unit of which the information is read, the controller executes a fixing control step that controls the dye fixing device based on the acquired parameter.

BRIEF DESCRIPTION OF THE DRAWINGS

FIG. 17 is a flowchart illustrating one example of a dyeing quality determination process executed by the controller 71.

DETAILED DESCRIPTION

First Aspect

Figure 1:
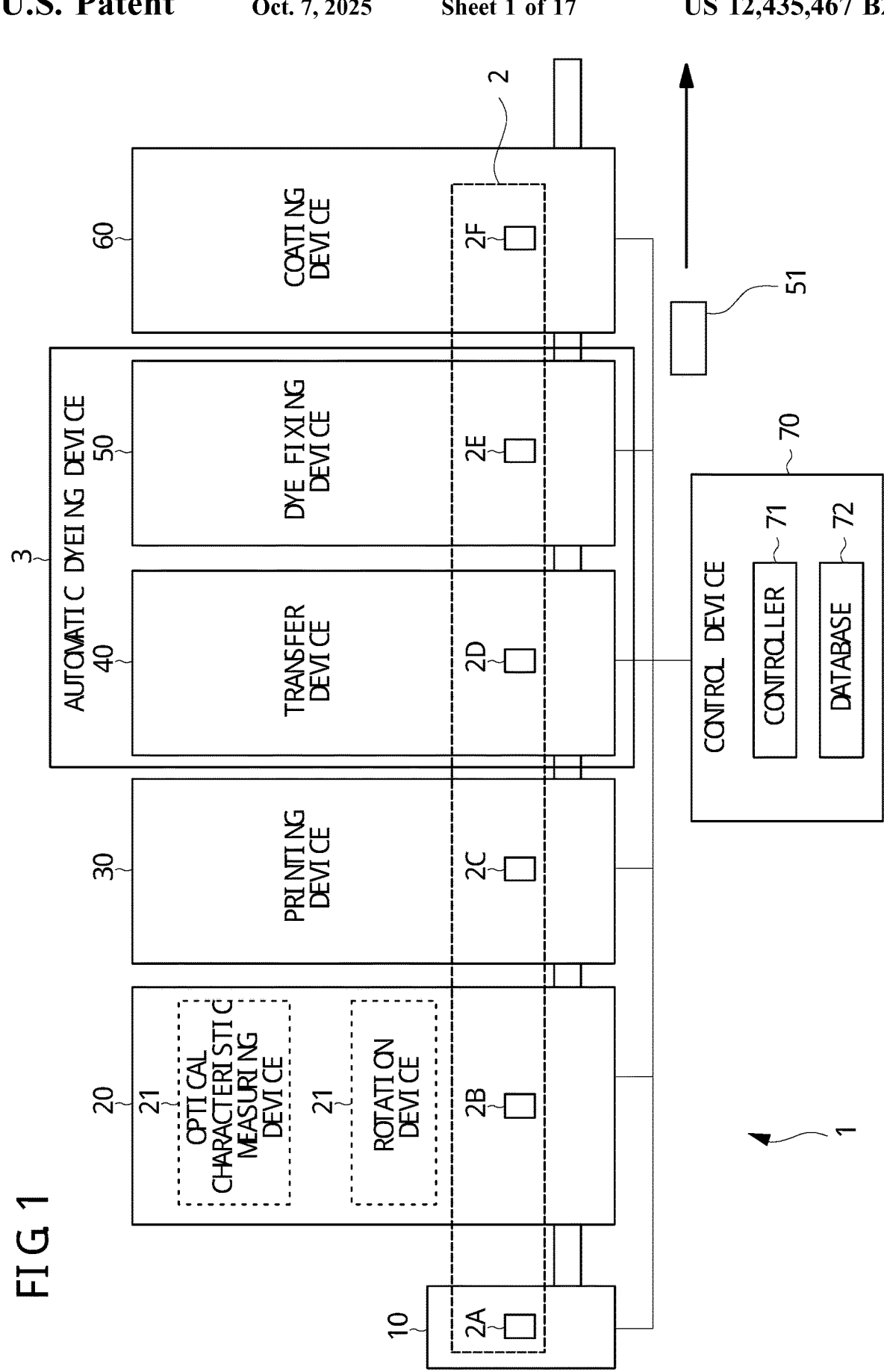
FIG. 1 is a block diagram illustrating a system configuration of a dyeing system 1.

A dyeing system exemplarily described in the present disclosure is provided with a conveyance device, a reader, a dye fixing device, and a controller. The conveyance device continuously conveys a conveyance unit including a resin body. The conveyance unit is one unit conveyed by the conveyance device. The reader reads information relating to the conveyance unit. The dye fixing device heats the resin body in the conveyance unit conveyed by the conveyance device and fixes the dye adhering to a surface of the resin body. The controller executes a parameter acquisition step and a fixing control step. In the parameter acquisition step, the controller acquires a parameter for a process executed to the resin body included in the conveyance unit of which the information is read, based on the information read by the reader. In the fixing control step, when the controller causes the dye fixing device to heat the resin body in the conveyance unit of which the information is read, the controller controls the dye fixing device based on the acquired parameter.

According to the dyeing system exemplarily described in the present disclosure, the parameter for the process executed to the resin body is acquired for each conveyance unit, based on the information relating to the conveyance unit read by the reader. The resin body is heated by a method suitable to each resin body based on the acquired parameter, so that the dye is fixed on the resin body. Accordingly, the resin body is automatically and appropriately dyed.

The conveyance device may continuously convey the conveyance units. The reader may read the information relating to the conveyance unit, for each conveyance unit. The dye fixing device may heat the resin body included in the conveyance unit and fix the resin body adhering to the surface of the resin body, for each conveyance unit conveyed by the conveyance unit. With this, the resin bodies are continuously and automatically dyed. In a case in which the resin body included in each of the conveyance units is dyed while continuously conveying the conveyance units, the conveyance order of the conveyance unit might be changed or a certain conveyance unit might be removed in the middle of the conveyance from the conveyance device. As a result, the resin body might be dyed in a different aspect different from a planned aspect. However, in the dyeing system of the present disclosure, even in a case in which the conveyance order of the conveyance unit is changed, the resin body is dyed in accordance with the method suitable to each resin body based on the information relating to the conveyance unit read by the reader. Consequently, each resin body is appropriately dyed.

The dye fixing device may be provided with an electromagnetic wave generator that generates an electromagnetic wave. The dye fixing device may irradiate the electromagnetic wave to the resin body to heat the resin body. With this, the dyeing system can appropriately control the heating of the resin body using the electromagnetic wave, for each resin body. Consequently, the resin body is automatically and appropriately dyed.

A specific method for irradiating the electromagnetic wave to the resin body using the dye fixing device can be select as needed. For example, the electromagnetic wave generator of the dye fixing device may be a laser beam source that emits a laser beam. The dye fixing device may be provided with a scanning unit that scans the resin body with the laser beam emitted from the laser beam source. When the controller causes the dye fixing device to heat the resin body in the conveyance unit of which the information is read, the controller may control the scanning unit of the dye fixing device based on the acquired parameter. With this, the laser beam is irradiated depending on each resin body, so that the dye is appropriately fixed on the resin body. Further, the dye fixing device may be provided with a distribution adjusting unit that adjusts an intensity distribution of the electromagnetic wave irradiated to the resin body from the electromagnetic wave generator. For example, the distribution adjusting unit may be provided with an opening that allows a part of the electromagnetic wave to pass therethrough and may be arranged between the electromagnetic wave generator and the resin body. For example, the controller may change at least one of a position of the distribution adjusting unit and a shape of the opening, based on the acquired parameter. Also in this case, the electromagnetic wave is appropriately irradiated depending on each resin body.

In a case in which the laser beam source or the distribution adjusting unit is utilized, a time necessary for fixing the dye can be shortened easily, compared to a case in which other method is utilized (for example, a case in which the resin body is heated by increasing a temperature of gas or liquid around the resin body). While, in a case in which the electromagnetic wave is irradiated directly to the resin body, a temperature of the surface of the resin body is sharply increased, and thereby a temperature difference might be caused between portions in the resin body (for example, a center portion and a peripheral portion). When the temperature difference between the portions is caused, the dyeing quality might be deteriorated. The temperature difference is different depending on the shape or the like of the resin body. Also, it may be preferable to change the irradiation method of the electromagnetic wave depending on a material of the resin body. Against this, the dyeing system of the present disclosure can appropriately control the heating of the resin body using the electromagnetic wave, for each resin body. Consequently, the resin body is automatically and appropriately dyed.

The reader may be provided with an identifier reader that reads an identifier arranged for each conveyance unit. In the parameter acquisition step, the controller may acquire the parameter of the conveyance unit corresponding to the identifier read by the identifier reader, from a database that stores the parameter for each conveyance unit. With this, even in a case in which, for example, the orders of the conveyance units are changed, the controller can appropriately recognize the parameter of each conveyance unit.

The controller may execute, based on the process information that indicates the process contents to be executed to the resin body, an associating step that associates the parameter indicating the process contents with the identifier of the conveyance unit in which the resin body is included and causes the database to store the parameter therein. With this, the identifier and the parameter are appropriately associated with each other and stored in the database, for each conveyance unit (namely, each resin body). Accordingly, the appropriate process is executed to each resin body by reading the identifier.

The dyeing system may be further provided with a printing device and a transfer device. The printing device prints the dye on a sheet-like substrate. The transfer device transfers the dye to the resin body in a state in which the resin body in the conveyance unit conveyed by the conveyance device is arranged to face the substrate on which the dye is printed. The controller may further execute an identifier printing control step that controls the printing device to print the identifier corresponding to the conveyance unit on the substrate, together with the dye. With this, even in a case in which the identifier is not arranged in an installation portion (for example, a tray) in which the resin body is installed, the parameter is appropriately acquired for each conveyance unit. Further, even after a dyeing process, a schedule and a result of the dyeing process (for example, whether the dyeing process has been executed as scheduled) are easily checked by reading the identifier of the substrate conveyed with the resin body.

The controller may cause the printing device to print at least one of letters and symbols, which indicate the process contents to be executed to the resin body included in the conveyance unit, together with the identifier on the substrate. With this, the operator can easily check the process contents (to be) executed to the resin body without reading the identifier using the reader.

The conveyance unit may be provided with an installation portion in which the resin body is installed (for example, a tray on which the resin body is installed). The identifier may be installed in the installation portion. With this, the parameter for the process to be executed to the resin body is appropriately acquired by reading the identifier installed in the installation portion on which the resin body is installed, using the reader.

Here, a component in which the identifier is installed may be changed. For example, the identifier may be installed in the resin body itself. With this, when the parameter of the resin body is acquired, a possibility of misinterpreting the parameter of a certain resin body as a parameter of another resin body is further reduced.

The reader may be provided with a tag reader that reads information from a writable tag installed in the conveyance unit. In the parameter acquisition step, the controller may acquire the parameter included in the information read by the tag reader. Thus, the parameter that indicates the process contents is stored in the tag in advance, so that, even in a case in which, for example, the orders of the conveyance units are changed, the controller can appropriately recognize the parameter of each conveyance unit.

The reader may be provided with an optical characteristic measuring device that measures an optical characteristic of the resin body formed as a lens. In the parameter acquisition step, the controller may acquire the parameter for controlling the dye fixing device, based on the optical characteristic of the lens measured by the optical characteristic measuring device. When the resin body is formed as a lens, the optical characteristic is different depending on a shape of the lens. When the shape of the lens is different, a temperature difference caused between portions in the lens in heating the lens using the dye fixing device is different. Accordingly, the dyeing system acquires the parameter depending on the shape of the lens based on the optical characteristic of the lens measured by the optical characteristic measuring device, so that the dyeing system can heat the lens by a method suitable to each resin body. Further, the optical characteristic is different depending on a material of the lens. It may be preferable to change the method for heating the lens using the dye fixing device, depending on the material of the lens. Accordingly, the dyeing system acquires the parameter depending on the material of the lens based on the optical characteristic of the lens measured by the optical characteristic measuring device, so that the dyeing system can heat the lens by a method suitable to each resin body.

Further, in a case in which the optical characteristic of the lens actually measured by the optical characteristic measuring device is different from the optical characteristic included in the parameter acquired by reading the identifier or the tag, the controller may execute at least one of a warning process that warns the operator and an aborting process that aborts the dyeing process. With this, the lens can be further appropriately dyed.

The dyeing system may be further provided with at least one dyeing process executing device that executes a certain process other than the dye fixing process executed by the dye fixing device, in the dyeing process that dyes the resin body. The conveyance device may convey the conveyance unit to each of the dye fixing device and the dyeing process executing device. When the controller causes the dyeing process executing device to execute the dyeing process to the resin body in the conveyance unit of which the information is read, the controller may control the dyeing process executing device based on the acquired parameter. That is, the controller may control the dyeing process executed to each resin body, based on the information read by the reader. With this, the resin body can be further appropriately dyed.

The certain process other than the dye fixing process in the dyeing process may include at least one of a dye adhering process that causes the dye to adhere to a sheet-like substrate and a transfer process that transfers the dye, which adheres to the substrate, to the resin body. With this, the dyeing system can smoothly execute the dyeing process as a sequential process.

When the controller causes the printing device, which is one component in the dyeing process executing device, to print the dye on the substrate used in the conveyance unit of which the information is read, the controller may execute a printing control step that controls the printing device based on the acquired parameter. With this, the substrate with dye for dyeing the resin body is appropriately obtained for each resin body.

The dyeing system may be further provided with a rotation device, which is one component in the dyeing process executing device. The rotation device defines an orientation of the resin body against the substrate with dye by rotating the resin body for each conveyance unit conveyed by the conveyance device. When the controller causes the rotation device to rotate the resin body in the conveyance unit of which the information is read, the controller may execute a rotation control step that controls the rotation device based on the acquired parameter. For example, in a case in which gradation dyeing is executed to a cylindrical lens and a progressive lens, it is necessary to appropriately define the orientation (direction) of the lens against the substrate with dye using the rotation device. The dyeing system controls the rotation device based on the parameter, so that the dyeing system can appropriately define the direction of the resin body against the substrate with dye, for each conveyance unit.

The dyeing system may be further provided with a coating device. The coating device coats the surface of the resin body to which the dye is fixed by the dye fixing device, for each conveyance unit conveyed by the conveyance device. When the controller causes the coating device to coat the resin body in the conveyance unit of which the information is read, the controller may execute a coating control step that controls the coating device based on the acquired parameter. With this, the coating to the resin body is appropriately executed for each resin body.

The conveyance device may convey the conveyance unit from the printing device to the transfer device. In this case, the substrate on which the dye is printed by the printing device is installed in the conveyance unit, and thereby the substrate is conveyed to the transfer device together with the conveyance unit. Consequently, the process that conveys the substrate is simplified.

Second Aspect

In the dyeing method disclosed in Japanese Patent Application Publication No. 2018-127722, since a space around the laser beam source and the resin body is opened, the laser beam might be reflected toward an unfavorable direction. Thus, it is desired to interrupt at least a part of a space around an optical path of the laser beam. However, when the space around the optical path of the laser beam is interrupted, the dye heated and gasified is apt to adhere to an objective lens of a laser beam irradiation unit. When the dye adheres to the objective lens, the optical characteristic of the objective lens is deteriorated. Furthermore, when the dye adhering to the objective lens is heated by the laser beam, a temperature of components such as the objective lens is increased, so that the components might be damaged. A second aspect of the present disclosure provides a dye fixing device capable of suppressing an influence caused by the adhering of the dye to the objective lens of the laser beam irradiation unit.

The dye fixing device according to the second aspect of the present disclosure irradiates a laser beam to a resin body and fixes a dye, which adheres to a surface of the resin body, on the resin body. The dye fixing device includes: a laser beam irradiation unit having a laser beam source that emits a laser beam, the laser beam irradiation unit irradiating the laser beam to the resin body through an objective lens; a cylindrical laser beam interruption unit that covers at least a part of a space around an optical path of the laser beam extended from the objective lens of the laser beam irradiation unit toward the resin body and interrupts leakage of the laser beam to an outside of the optical path; an inflow port formed in the laser beam interruption unit to allow gas to flow from the outside to an inside of the laser beam interruption unit; an outflow port formed in the laser beam interruption unit to discharge the gas from the inside to the outside of the laser beam interruption unit; and a pressure difference generation unit that generates a pressure difference that allows the gas to flow from the inflow port to the outflow port.

The dye fixing device exemplarily described in the present disclosure is provided with the laser beam irradiation unit, the laser beam interruption unit, the inflow port, the outflow port, and the pressure difference generation unit. The laser beam irradiation unit is provided with the laser beam source that emits the laser beam to irradiate the laser beam to the resin body through the objective lens. The laser beam interruption unit is a cylindrical member that interrupts the leakage of the laser beam to the outside of the optical path by covering at least a part of the space around the optical path of the laser beam extended from the objective lens of the laser beam irradiation unit toward the resin body. The inflow port is formed in the laser beam interruption unit to allow the gas to flow from the outside to the inside of the laser beam interruption unit. The outflow port is formed in the laser beam interruption unit to discharge the gas from the inside to the outside of the laser beam interruption unit. The pressure difference generation unit generates the pressure difference that allows the gas to flow from the inflow port to the outflow port.

According to the dye fixing device exemplarily described in the present disclosure, the gas flows from the inflow port toward the outflow port. That is, the gas flows through the inside of the laser beam interruption unit. Accordingly, even when the dye on the surface of the resin body is heated and gasified, the dye hardly adheres to the objective lens of the laser beam irradiation unit. With this, various influences caused by the adhering of the dye to the objective lens of the laser beam irradiation unit are appropriately suppressed.

The outflow port may be formed in the laser beam irradiation unit at a downstream side of the optical path of the laser beam with respect to the objective lens of the laser beam irradiation unit. With this, even in a case in which the gas, which flows from the inflow port to the outflow port, includes the gasified dye, the gas hardly reaches the objective lens. Thus, a possibility of the adhering of the gasified dye to the objective lens is further reduced, compared to a configuration in which the outflow port is formed at an upstream side of the optical path of the laser beam with respect to the objective lens.

The direction in which the optical path of the laser beam is extended may be defined as needed. For example, in a case in which the laser beam source emits the laser beam from an upper side toward a lower side, the downstream side of the optical path of the laser beam corresponds to the lower side, and the upstream side of the optical path of the laser beam corresponds to the upper side. While, in a case in which the laser beam source emits the laser beam toward a left side, the downstream side of the optical path of the laser beam corresponds to the left side, and the upstream side of the optical path of the laser beam corresponds to a right side.

Each of the inflow port and the outflow port exemplarily described in the present disclosure is formed as a hole formed in a wall surface of the laser beam interruption unit. However, a configuration of each of the inflow port and the outflow port may be changed. For example, at least one of the inflow port and the outflow port may be formed as a gap between the laser beam interruption unit and other member (for example, the laser beam irradiation unit, the resin body, or the like).

The outflow port may be formed in the laser beam interruption unit at the downstream side of the optical path of the laser beam with respect to the inflow port. In this case, the gas flows from the upstream side to the downstream side of the optical path of the laser beam in the inside of the laser beam interruption unit. Accordingly, the possibility of the adhering of the gasified dye to the objective lens of laser beam irradiation unit is further reduced.

The outflow port may be formed in the laser beam interruption unit at the upstream side of the optical path of the laser beam with respect to a position where the resin body is installed. In a case in which the outflow port is formed in the laser beam interruption unit at the position where the resin body is installed or at the downstream side of the optical path with respect to the position where the resin body is installed, the gas that flows in from the inflow port passes the resin body. When the gas passes the resin body, the resin body, which is a target to be heated, is cooled by the gas, and thereby a heating efficiency is deteriorated. Against this, in a case in which the outflow port is formed at the upstream side of the optical path with respect to the position where the resin body is installed, the gas that flows in from the inflow port hardly reaches the resin body. With this, the dye fixing device can suppress the resin body to be cooled by the gas and can appropriately suppress the adhering of the gasified dye to the objective lens.

The position of each of the inflow port and the outflow port may be changed. For example, the inflow port and the outflow port may be formed in the laser beam interruption unit between the objective lens of the laser beam irradiation unit and the position where the resin body is installed so as to face each other to interpose the optical path therebetween. In this case, the gas flows across the optical path of the laser beam. Accordingly, even when the gasified dye moves from the resin body to the objective lens, the gasified dye is apt to flow toward the outflow port before reaching the objective lens. Also, the outflow port may be formed in the laser beam interruption unit at the position where the resin body is installed or at the downstream side of the optical path with respect to the position where the resin body is installed. Also in this case, the gasified dye hardly adheres to the objective lens.

The dye fixing device may be provided with a thermo camera. The thermo camera is arranged in the laser beam interruption unit to detect a heat distribution in the resin body. With this, the dye fixing device can further appropriately control the heating of the resin body, based on the detected result of the heat distribution detected by the thermo camera.

The dye fixing device may be further provided with a scanning unit that scans the resin body with the laser beam emitted from the laser beam source by relatively moving the laser beam against the resin body. A controller of the dye fixing device may control the scanning unit, based on the heat distribution of the resin body detected by the thermo camera. With this, the heating process to the resin body using the laser beam is appropriately executed based on the actual heat distribution in the resin body.

Further, a specific configuration of the scanning unit may be selected as needed. For example, the scanning unit may be formed as a scanner that deflects an orientation of the laser beam (for example, at least one of a galvanometer mirror, a polygon mirror, an acoustic optical element, and the like). In this case, the scanning unit may be arranged in the laser beam irradiation unit. Further, the scanning unit may be formed as a moving unit that moves a position of the resin body against the laser beam. The scanner and the moving unit may be used together.

The outflow port may be formed in the laser beam interruption unit at the downstream side of the optical path of the laser beam with respect to an electromagnetic wave incident unit that allows the electromagnetic wave to be incident on the thermo camera. With this, the dye heated and gasified by the laser beam hardly adheres to the electromagnetic wave incident unit of the thermo camera, in addition to the objective lens of the laser beam irradiation unit. Accordingly, the deterioration of the performance of the thermo camera caused by the adhering of the dye to the electromagnetic wave incident unit can be appropriately suppressed.

The electromagnetic wave incident unit may be formed by, for example, an image forming lens (for example, a germanium lens and the like) that forms an image of the electromagnetic wave (infrared ray or the like) generated from the resin body, on a detection element of the thermo camera. A filter that interrupts a light having a wavelength of the laser beam irradiated by the laser beam irradiation unit may be formed in the thermo camera. In this case, the electromagnetic wave incident unit may be formed by the image forming lens and the filter.

The pressure difference generation unit may be provided with at least one of an inflow blower and an outflow blower. The inflow blower sends gas from the inflow port to the inside of the laser beam interruption unit. The outflow blower sends gas from the outflow port to the outside of the laser beam interruption unit. The dye fixing device is provided with at least one of the inflow blower and the outflow blower, so that the pressure difference for sending the gas from the inflow port to the outflow port can be appropriately generated with a simple configuration.

The dye fixing device may be further provided with a driving detection unit that detects whether the pressure difference generation unit is driven normally. In a case in which the driving detection unit detects that the pressure difference generation unit is not driven normally, the controller of the dye fixing device may execute at least one of the warning process that warns the operator and a prohibiting process that prohibits the heating of the resin body using the laser beam irradiation unit. With this, the adhering of the dye to the objective lens of the laser beam irradiation unit due to the failure or the like of the pressure difference generation unit can be appropriately suppressed.

Third Aspect

In the dyeing method disclosed in Japanese Patent Application Publication No. 2018-127722, a space around the laser beam source and the resin body is opened. Thus, the heat of the resin body is dissipated to surroundings thereof, and thereby it becomes difficult to increase the temperature of the resin body. Further, the heat of the resin body in an outer peripheral portion is apt to be dissipated to the surroundings than in an inner portion, so that a temperature difference, which might cause a color deviation, is generated between the outer peripheral portion and the inner portion of the resin body. A third aspect of the present disclosure provides a dye fixing device capable of appropriately fixing the dye on the resin body.

The dye fixing device according to the third aspect of the present disclosure irradiates a laser beam to a resin body and fixes a dye, which adheres to a surface of the resin body, on the resin body. The dye fixing device includes: a laser beam irradiation unit that irradiates a laser beam to the resin body; a cylindrical laser beam interruption unit that covers at least a part of a space around an optical path of the laser beam extended from the laser beam irradiation unit toward the resin body and interrupts leakage of the laser beam to an outside of the optical path; and a radiant heat reflection unit formed at least on an inner peripheral surface of a resin body peripheral portion, which covers a periphery of the resin body, of the laser beam interruption unit, the radiant heat reflection unit reflecting radiant heat from the resin body.

The dye fixing device exemplarily described in the present disclosure is provided with the laser beam irradiation unit, the laser beam interruption unit, and the radiant heat reflection unit. The laser beam irradiation unit irradiates the laser beam to the resin body. The laser beam interruption unit is a cylindrical member that interrupts the leakage of the laser beam to the outside of the optical path by covering at least a part of the space around the optical path of the laser beam extended from the laser beam irradiation unit toward the resin body. The radiant heat reflection unit is at least formed on the inner peripheral surface of the resin body peripheral portion, which covers a periphery of the resin body, of the laser beam interruption unit, and the radiant heat reflection unit reflects the radiant heat from the resin body.

According to the dye fixing device exemplarily described in the present disclosure, the leakage of the laser beam to the outside of the optical path is interrupted by the laser beam interruption unit. Further, the radiant heat reflection unit is arranged on the inner peripheral surface of the resin body peripheral portion, which covers the periphery of the resin body, in laser beam interruption unit. Accordingly, at least a part of the radiant heat discharged from the resin body heated by the laser beam is reflected toward the resin body by the radiant heat reflection unit. As a result, the heat of the resin body (in particular, the outer peripheral portion) is hardly dissipated to the surroundings thereof, so that the temperature of the resin body is easily and appropriately increased by the laser beam. Consequently, the dye is easily and appropriately fixed on the resin body.

The radiant heat reflection unit may be formed on a whole periphery of the resin body peripheral portion having a cylindrical shape. With this, the radiant heat discharged from the resin body is easily and further efficiently reflected by the radiant heat reflection unit toward the resin body. Consequently, the resin body is further appropriately heated by the laser beam.

While, the radiant heat reflection unit may be formed on a part of the periphery of the resin body peripheral portion (for example, formed intermittently) in a circumferential direction thereof. Also with this, the resin body is appropriately heated, compared to a configuration without the radiant heat reflection unit.

At least a part of a portion, which is different from the resin body peripheral portion, in the laser beam interruption unit may be formed by a light transmissive member that interrupts the laser beam irradiated from the laser beam irradiation unit and transmits a visible light. With this, the operator can check a state of the resin body covered with the laser beam interruption unit through light transmissive member. Consequently, the operation is appropriately performed.

Here, a whole of a main body of the laser beam interruption unit having a cylindrical shape may be formed by the light transmissive member. The laser beam interruption unit may be formed by attaching the radiant heat reflection unit to the main body of the laser beam interruption unit formed by the light transmissive member. With this, the operator can check the resin body through various portions other than the radiant heat reflection unit.

The configuration of the laser beam interruption unit may be changed. For example, a whole of the main body of the laser beam interruption unit may be formed by the radiant heat reflection unit.

The radiant heat reflection unit may be formed of metal such as aluminum and stainless steel. Aluminum or stainless steel can easily reflect the radiant heat (electromagnetic wave). Consequently, the temperature of the resin body is further easily increased.

However, the radiant heat reflection unit may be formed of metal other than aluminum and stainless steel. Further, the radiant heat reflection unit may be formed of material other than metal.

Fourth Aspect

A method that transfers a sublimable dye to a resin body and thereby dyes the resin body by a vapor phase transfer method is called a vapor phase transfer dyeing method. In the vapor phase transfer dyeing method, in order to dye the resin body in a planned color, the dye is needed to be printed on a substrate by a printing device with a discharge amount corresponding to the planned color. However, even when the printing device is controlled to print the dye with the discharge amount corresponding to the planned color, the color of the dyed resin body might not be matched with the planned color, due to an individual difference of the printing device, a change of a state of the printing device caused by the use thereof, an installation environment (for example, temperature or the like) of the dyeing system, an individual difference of a heating unit that heats the resin body, or the like. In the conventional method, it is necessary that the operator checks the color of the dyed resin body and then adjusts the discharge amount of the dye discharged from the printing device by him/herself such that the resin body is dyed in the planned color in the later dyeing process. Thus, it is difficult to reduce a work process of the operator. The fourth aspect of the present disclosure provides a dyeing system capable of appropriately dyeing the resin body in a planned color.

The dyeing system according to the fourth aspect of the present disclosure dyes a resin body. The dyeing system includes: a printing device that prints a dye on a substrate; a transfer device that transfers the dye to the resin body in a state in which the resin body is arranged to face the substrate on which the dye is printed; a dye fixing device that heats the resin body to which the dye is transferred and fixes the dye on the resin body; a color information measuring device that measures color information of the resin body on which the dye is fixed; and a controller. The controller executes: a discharge amount defining step that defines a discharge amount of the dye discharged by the printing device to the substrate for dyeing the resin body to be dyed in the planned color; a result color information acquisition step that acquires result color information, which is the color information measured by the color information measuring device, of the resin body that has been actually dyed by the printing device, the transfer device, and the dye fixing device using the dye with the discharge amount defined in the discharge amount defining step; and a correcting step that corrects the discharge amount of the dye to be defined in the discharge amount defining step, based on the result color information acquired in the result color information acquisition step and the planned color, such that the color of the resin body to be dyed in the later dyeing process is close to the planned color.

The dyeing system exemplarily described in the present disclosure is provided with the printing device, the transfer device, the dye fixing device, the color information measuring device, and the controller. The printing device prints the dye on the substrate. The transfer device transfers the dye to the resin body in a state in which the resin body is arranged to face the substrate on which the dye is printed (substrate with dye). The dye fixing device heats the resin body to which the dye is transferred and thereby fixes the dye on the resin body. The color information measuring device measures the color information of the resin body on which the dye is fixed (namely, dyed resin body). The controller executes the discharge amount defining step, the result color information acquisition step, and the correcting step. In the discharge amount defining step, the controller defines the discharge amount of the dye discharged by the printing device to the substrate for dyeing the resin body to be dyed in the planned color, in accordance with a defining procedure. In the result color information acquisition step, the controller acquires the result color information, which is the color information measured by the color information measuring device, of the resin body that has been actually dyed by the printing device, the transfer device, and the dye fixing device using the dye with the discharge amount defined in the discharge amount defining step. In the correcting step, the controller corrects the discharge amount of the dye to be defined in the discharge amount defining step, based on the result color information acquired in the result color information acquisition step and the planned color, such that the color of the resin body to be dyed in the later dyeing process is close to the planned color.

According to the dyeing system of the present disclosure, the discharge amount of the dye to be defined afterward in the discharge amount defining step (that is, the discharge amount of the dye for dyeing the resin body in the planned color) is corrected, based on the planned dyeing color and the color of the resin body that has been actually dyed (result color). As a result, in the later dyeing process, the discharge amount of the dye to be printed on the substrate for dyeing the resin body in the planned color is corrected, so that the color of the resin body actually dyed is appropriately close to the planned color. Consequently, the resin body is appropriately dyed in the planned color.

A specific method for correcting the discharge amount of the dye defined in the discharge amount defining step may be selected as needed. For example, the controller may correct the discharge amount of the dye based on a result of a comparison process that compares the result color information and the color information of the planned color. The comparison process may, for example, acquire a difference between the result color information and the color information of the planned color or acquire a ratio of the result color information to the color information of the planned color.

For example, the controller may modify the defining procedure for defining the discharge amount of the dye in the discharge amount defining step so as to correct the discharge amount of the dye to be defined afterward in the discharge amount defining step. Various procedures (namely, algorithms for defining the discharge amount of the dye) may be adopted in the defining procedure for defining the discharge amount of the dye. For example, a table that associates each color for dyeing the resin body with the discharge amount of each dye may be stored in a storage device. The controller may acquire the discharge amount of each dye corresponding to the planned color from the table so as to define the discharge amount. In this case, the correcting step may correct the information in the table to modify the defining procedure. Further, the information (base color information) of the discharge amount of each dye different in color (for example, Red, Yellow, and Blue) for dyeing the resin body in a planned density may be stored in the storage device. The controller may calculate the discharge amount of each dye for dyeing the resin body in the planned color, based on the base color information so as to define the discharge amount. In this case, the correcting step may correct the base color information to modify the defining procedure.

The present disclosure exemplarily describes the vapor phase transfer method, as the transfer method that transfers the dye to the resin body, that sublimes the sublimable dye printed on the substrate in a state in which the resin body and the substrate with dye are arranged in a vacuum to face to each other in a non-contact manner, and thereby transfers the dye to the resin body. However, the transfer method may be changed. For example, the dye may be transferred to the resin body in a state in which the resin body and the substrate with dye are arranged in a contact manner.

In the discharge amount defining step, the controller may define the discharge amount of one specific dye among the dyes to be discharged by the printing device, as the planned color having a planned density is dyed by the specific dye. In the correcting step, the controller may correct the discharge amount of the specific dye to be defined afterward in the discharge amount defining step, based on the density indicated by the result color information and the density of the planned color. With this, the discharge amount of the specific dye is corrected such that the resin body is appropriately dyed in the planned density. Consequently, the resin body is appropriately dyed by the specific dye in the color having the planned density.

The controller may repeatedly execute the discharge amount defining step, the result color information acquisition step, and the correcting step, as each dye to be discharged by the printing device is set as the specific dye. With this, the discharge amount of each dye is corrected such that the resin body is appropriately dyed in the planned density. Consequently, the resin body is appropriately dyed in the color represented by a combination of the dyes.

In the discharge amount defining step, the controller may define respective discharge amounts of several dyes among the dyes to be discharged by the printing device, as the planned color having a planned density is dyed by the several dyes. In the correcting step, the controller may correct at least one of the discharge amounts of the several dyes, based on the result color information and the color information of the planned color. In this case, the discharge amounts of the several dyes may be corrected together.

The color information measuring device may be a spectroscopic measuring device that measures a spectrum of the resin body as the color information. In this case, the color information for which an influence caused by a lighting environment or the like is suppressed is acquired, compared to a case in which an RGB camera or the like is used as the color information measuring device. Thus, the dyeing quality is further improved. Also, in a case in which the resin body is dyed using the several dyes, the spectrum, which is a distribution of intensity for each wavelength, is acquired, so that the discharge amount of each dye is appropriately corrected.

A specific method for correcting the discharge amount of the dye based on the spectrum may be also selected as needed. For example, the controller may acquire a spectral transmittance of the dyed resin body as the result color information and correct the discharge amount of the dye based on the transmittance at the maximum absorption peak of each dye and the transmittance of the planned color. That is, the controller may increase the discharge amount of the specific dye from that before corrected, in a case in which the transmittance of the color to be dyed by the specific dye is larger than the planned transmittance, while the controller may decrease the discharge amount of the specific dye from that before corrected, in a case in which the transmittance is smaller than the planned transmittance. In a case in which the resin body is dyed using the several dyes, the controller may correct the discharge amount of each dye based on the transmittance at the maximum absorption peak of each dye.

While, a measuring device (for example, an RGB camera, or the like) other than the spectroscopic measuring device may be used as the color information measuring device. Further, in a case in which a general camera and the RGB filter are used together, the spectral characteristic of the resin body may be presumed as the color information.

In a case in which a difference between the result color information acquired in the result color information acquisition step and the color information of the planned color exceeds a tolerable range, the controller may execute a notifying step that notifies an operator that the quality of the dyeing to the resin body is inferior. With this, the operator can easily recognize that the dyeing to the resin body has not been appropriately executed.

In a case in which a difference between the result color information acquired in the result color information acquisition step and the color information of the planned color exceeds a threshold, the controller may execute the correcting step. In a case in which the quality of the dyeing is inferior, the discharge amount of the dye is corrected, so that the quality of the dyeing afterward is improved. Consequently, the resin body is further appropriately dyed.

The controller may execute feedback control that repeats the correcting step as each dyeing process is executed to the resin body. With this, the discharge amount of the dye is appropriately corrected as each resin body is actually dyed, so that the resin body is further appropriately dyed.

The timing for executing the correcting step may be selected as needed. For example, the correcting step may be executed when the dyeing system is delivered from a manufacture, when the dyeing system is activated for the first time, or when the dyeing system is in maintenance. Further, the controller may execute the correcting step when instructions for executing the correcting step are input by the operator. Further, the controller may execute the correcting step when the number of the times that the difference between the result color information and the color information of the planned color exceeds a threshold.

The color information measuring device may be provided with several light sources different in type from each other (for example, two or more light sources among a standard light source defined by a standard (a CIE standard light source D65 or the like as one example thereof), a white light source, a light source that emits a light similar to a solar light, and the like). With this, the color information of the dyed resin body is appropriately acquired using the light source desired by the operator.

The resin body to be dyed may be a lens used for glasses. In the correcting step, the controller may correct the discharge amount of the dye to be defined afterward for each kind of a base material of the lens to be dyed. The dyed color is difference depending on the kind of the base material of the lens even when the discharge amount is the same. Accordingly, the discharge amount of the dye is corrected for each kind of the base material of the lens, so that the discharge amount of the dye necessary for appropriately dyeing the each base material is defined based on the base material.

The controller may acquire the color information of the lens before dyed and then deduct the color information of the lens before dyed from the result color information so as to acquire the color information of the dyed lens. With this, the influence of the color of the lens before dyed is removed, so that a relationship between the discharge amount of the dye and the result of the dyeing is appropriately recognized.

Fifth Aspect

In the vapor phase transfer dyeing method, the resin body loaded on a dyeing tray served as one example of an installation portion is dyed. Thus, the dye is apt to adhere to a vicinity of a portion of the dyeing tray where the resin body is loaded, during the dyeing process. If the dyeing process is executed in a state in which the adhering dye is remaining, the remaining dye is also fixed on the resin body, and thereby the dyeing quality might be deteriorated. While, in a case in which the dyeing tray is cleaned or discarded after each dyeing process is executed, the operation efficiency is deteriorated. As described above, in the conventional technique, it is difficult to efficiently and appropriately execute the dyeing process. The fifth aspect of the present disclosure provides a dyeing tray, a loading frame, and a spacer capable of efficiently and appropriately dyeing the resin body by means of the vapor phase transfer dyeing method.

The dyeing tray according to the fifth aspect of the present disclosure, on which a resin body to be dyed is loaded in a dyeing process of a vapor phase transfer dyeing method. The tray includes a tray body, and a loading frame on which the resin body is loaded, the loading frame being detachably attached to the tray body.

The loading frame according to the fifth aspect of the present disclosure is used in the dyeing process of the vapor phase transfer dyeing method. The loading frame on which the resin body to be dyed is loaded is detachably attached to the tray body.

The spacer according to the fifth aspect of the present disclosure is used in the dyeing process of the vapor phase transfer dyeing method. The spacer forms a space between a substrate to which a sublimable dye adheres and which is loaded on the tray body and a loading frame on which the resin body to be dyed is loaded and which is installed in the tray body.

The resin body to be dyed in the dyeing process of the vapor phase transfer dyeing method is loaded on the dyeing tray exemplarily described in the present disclosure. The dyeing tray exemplarily described in the present disclosure is provided with the tray body, and the loading frame on which the resin body is loaded. The loading frame is detachably attached to the tray body.

When the operator uses the dyeing tray of the present disclosure, the operator can detach the loading frame from the tray body to clean or discard the detached loading frame. Consequently, the operator can efficiently and appropriately execute the dyeing process, compared to a case in which a whole of the tray is cleaned or discarded.

An attachment portion to which the loading frame is detachably attached may be formed in the tray body. With this, the loading frame is easily attached in a proper position, and thereby the dyeing quality is further improved.

A substrate loading portion may be formed in the tray body. The substrate loading portion may be formed at an upper and outer side with respect to the attachment portion in the tray body. The substrate to which the sublimable dye adheres is loaded on the substrate loading portion. With this, the sublimable dye is sublimed in a state in which the substrate is loaded on the substrate loading portion, so that the dye is appropriately transferred to the resin body.

The substrate loading portion may be formed at an upper and outer side with respect to the attachment portion in the tray body. With this, when the substrate is loaded on the substrate loading portion, the substrate is positioned to properly face the resin body loaded on the loading frame.

The dyeing tray may be further provided with the spacer. The spacer forms a space between the substrate loaded on the substrate loading portion and the loading frame. With this, the sublimable dye is appropriately transferred from the substrate to the resin body through the space formed by the spacer. Further, the sublimed dye is appropriately prevented from being leaked to the outside by the spacer.

The spacer may be formed in a cylindrical shape extended upward from an outer peripheral part of the portion where the resin body is loaded, of the loading frame. With this, the space is appropriately formed by the spacer between the substrate and the loading frame.

An upper end of the spacer may be protruded upward with respect to a loading surface of the substrate loading portion in a state in which the spacer is attached to the tray body. With this, the substrate and the upper end of the spacer are apt to adhere to each other, so that the sublimed dye is further prevented from being leaked to the outside.

The spacer may be a component separated from the loading frame. That is, the spacer is not formed integrally with the loading frame but formed separated from the loading frame. The spacer may be detachably attached together with the loading frame to the tray body. With this, the operator can load the resin body on the loading frame installed in the tray body in a state in which the spacer is detached. In a case in which the spacer is detached, a space around the loading frame is large, compared to a case in which both of the loading frame and the spacer are installed in the tray body. Thus, the operator can easily load the resin body on the loading frame. Further, in a case in which the spacer is formed as a component separated from the loading frame, the material of the loading frame and the material of the spacer can be different from each other. Consequently, a manufacturer of the dyeing tray can appropriately select the material of each of the loading frame and the spacer in accordance with the function thereof.

However, the loading frame and the spacer may be formed integrally. Also in this case, the sublimable dye is appropriately transferred to the resin body and is prevented from being leaked to the outside.

The tray body may be further provided with a positioning portion. The positioning portion positions the substrate to be loaded on the substrate loading portion against the resin body. With this, the substrate is precisely positioned against the resin body by the positioning portion. Further, the position of the substrate is prevented from being deviated against the resin body. Consequently, the dyeing is executed further easily with superior quality. The positioning portion may be protruded upward to the outer side of the substrate loading portion, in the tray body. With this, the substrate is appropriately positioned inside the positioning portion.

The tray body may be further provided with a substrate protection portion. The substrate protection portion is extended to an upper position by a thickness of the substrate or more, with respect to the loading surface of the substrate loading portion on which the substrate is loaded, in the tray body. With this, even in a case in which other object (for example, other dyeing tray or the like) is piled on the dyeing tray on which the substrate has been loaded, the piled object is apt to contact not the substrate but the substrate protection portion, so that the substrate is hardly damaged. Consequently, the deterioration of the dyeing quality is appropriately suppressed. Further, it is preferable that the height of the substrate protection portion from the loading surface of the substrate loading portion is larger than the thickness of the substrate. With this, the substrate is appropriately protected.

At least a part of the positioning portion may be also used as at least a part of the substrate protection portion. With this, a structure of the dyeing tray having both of a function for positioning the substrate and a function for protecting the substrate is easily simplified.

The tray body may be further provided with a bottom engagement portion and a top engagement portion. The bottom engagement portion is formed as a recess portion formed in a bottom portion of the tray body. The top engagement portion is formed as a projection portion formed at a top portion of the tray body. When another tray body is piled on the tray body, the top engagement portion engages with the bottom engagement portion of the piled tray body. With this, the dyeing trays are stably piled in a vertical direction.

At least a part of the positioning portion may be also used as at least a part of the top engagement portion. Further, at least a part of the substrate protection portion may be also used as at least a part of the top engagement portion. With this, the structure of the dyeing tray is easily simplified.

The height of the top engagement portion from the loading surface of the substrate loading portion may be equal to or larger than the total of the depth of the bottom engagement portion and the thickness of the substrate. With this, even when the dyeing trays are piled in the vertical direction, the substrate hardly contacts the dyeing tray piled above, so that the substrate is hardly damaged. Consequently, the deterioration of the dyeing quality is appropriately suppressed. Further, it is preferable that the height of the substrate protection portion from the loading surface of the substrate loading portion is larger than the total of the depth of the bottom engagement portion and the thickness of the substrate. With this, the substrate is appropriately protected.

The resin body to be dyed may be a lens used for glasses. Two attachment portions to which the loading frame is attached may be formed on one tray body. In this case, a pair (left and right) of the lenses for glasses is dyed in a state in which they are loaded on one single dyeing tray. Consequently, the operation efficiency of the operator is further improved.

A plurality kinds of the loading frames may be formed in accordance with the diameters of the lenses to be dyed. With this, the loading frame corresponding to the diameter of the lens is appropriately selected, so that the various lenses having different diameters can be appropriately dyed using one single tray body.

A light transmissive portion that allows a light to transmit therethrough in the vertical direction may be formed in each of the loading frame and the attachment portion. With this, at least one of the color information and the optical characteristic of the lens can be measured in a state in which the lens is installed (loaded) on the dyeing tray. Consequently, the operation efficiency is further improved.

A recess portion extended from the attachment portion toward an outside may be formed at a periphery of the attachment portion in the tray body. With this, the operator can insert a finger or the like into the recess portion, so that the various members (for example, the loading frame, the resin body and the like) can be easily detached from the attachment portion.

A transmissive portion for sensor that allows a light, which is emitted by an optical sensor, to transmit therethrough may be formed in the attachment portion. With this, it can be appropriately detected by the optical sensor whether at least one of the resin body, the loading frame and the spacer is installed in the tray body.

A melting point of the material of a portion in the loading frame that contacts at least the resin body may be 200° C. or more. The temperature of the resin body becomes high in the fixing process in the vapor phase transfer dyeing method. Thus, deformation or the like of the loading frame is appropriately suppressed by adopting the material of the loading frame having the melting point of 200° C. or more. Further, the heat conductivity of the material of a portion in the loading frame that contacts at least the resin body may be 0.5 W/mK or less. With this, the heat is hardly conducted from the heated resin body to the outside, so that the resin body is appropriately heated easily. The deformation or the like of the loading frame is suppressed and the resin body is easily heated by adopting the material of the loading frame having the melting point of 200° C. or more and heat conductivity of 0.5 W/mK or less.

The identifier or the tag described above may be installed in the tray body. The tray body can be used many times compared to the loading frame or the like. Thus, the frequency for installing the identifier or the tag in a component is reduced, compared to a configuration in which the identifier or the tag is installed in the loading frame or the like.

In the present disclosure, the tray on which the resin body is loaded is served as an installation portion in which the resin body is installed. However, the configuration of the installation portion may be changed. For example, the installation portion may be formed to interpose and hold the resin body from the sides thereof.

EMBODIMENTS

Hereinafter, one typical embodiment according to the present disclosure will be described with reference to the drawings. A dyeing system 1 dyes a resin body automatically and continuously. In the present embodiment, the resin body to be dyed is a plastic lens L used for glasses (see FIG. 2 and others). However, a part of the technique exemplarily described in the present disclosure can be applied to a technique for dyeing the resin body other than the lens L. For example, at least a part of the technique exemplarily described in the present disclosure can be adopted for dyeing various resin bodies such as goggles, mobile phone covers, light covers, accessories, toys, films (for example, thickness thereof is 400 μm or less), and plate materials (for example, thickness thereof is 400 μm or more). An example of the resin body to be dyed also includes a resin body attached to a component other than the resin body (for example, wood, glass or the like). The dyeing system 1 of the present embodiment dyes the resin bodies while conveying the resin bodies continuously. While, at least a part of the technique exemplarily described in the present disclosure can be also adopted in a dyeing system that dyes the resin bodies while conveying the resin bodies one by one.

System Configuration

A system configuration of the dyeing system 1 of the present embodiment will be schematically described with reference to FIG. 1. The dyeing system 1 of the present embodiment is provided with a conveyance device 10, a preparation unit 20, a printing device 30, a transfer device 40, a dye fixing device 50, a coating device 60, and a control device 70.

Although the details are described below, the transfer device 40 and the dye fixing device 50 of the present embodiment are included in an automatic dyeing device 3 that executes transferring and fixing of the dye to the lenses L automatically and continuously. Other devices other than the transfer device 40 and the dye fixing device 50 (for example, the printing device 30 or the like) may be assembled in the automatic dyeing device 3.

The conveyance device 10 conveys a conveyance unit U (see FIGS. 4, 5, 6 and 8) to the automatic dyeing device 3 or the like. Specifically, the conveyance device 10 of the present embodiment conveys the conveyance units U continuously to the printing device 3 and the automatic dyeing device 3 or the like. The conveyance device 10 of the present embodiment conveys the conveyance unit U to the preparation unit 20, the printing device 30, the transfer device 40, the dye fixing device 50, and the coating device 60 in this order (namely, from a left side to a right side in FIG. 1). The conveyance unit U includes a dyeing tray 80 (see FIG. 2), and the lens L loaded on the dyeing tray 80. The dyeing tray 80 is one example of an installation portion in which the lens L served as a resin body is installed. Further, the conveyance unit U may include a sheet-like substrate (substrate with dye) S (see FIGS. 5, 6 and 8) having a surface to which the dye adheres.

The preparation unit 20 executes preparation before actually executing the transferring and fixing of the dye to the lens L. Specifically, the preparation unit 20 of the present embodiment is provided with an optical characteristic measuring device 21 and a rotation device 22.

The optical characteristic measuring device 21 is provided with a measuring optical system that measures an optical characteristic of the lens L. The optical characteristic measuring device 21 emits a measurement beam to the lens L and receives the measurement beam passing the lens L and thereby measures the optical characteristic of the lens L (for example, spherical power, astigmatic power, astigmatic axis angle, prismatic power, or the like). When the astigmatic axis angle of the lens L is measured, the angle in the rotation direction of the lens L is determined. A known technique can be adopted for the configuration of the optical characteristic measuring device 21, and therefore the detailed description thereof is omitted (a configuration of the optical characteristic measuring device 21 is described in, for example, Japanese Patent Application Publication No. 2012-107910 and others).

The rotation device 22 is provided with an actuator (for example, a motor or the like) that rotates a support portion that supports the lens L, and the lens L supported by the support portion. The rotation device 22 rotates the lens L, which is a kind of the resin body, for each conveyance unit U conveyed by the conveyance device 10 and thereby sets a rotation direction of the lens L. The rotation device 22 of the present embodiment rotates the lens L based on the angle in the rotation direction of the lens L measured by the optical characteristic measuring device 21 to set the rotation direction of the lens L to a target direction. Although the details are described below, in a case in which the lens L is dyed in a gradation color and the lens L is asymmetry with respect to a geometric center axis, the dyeing system 1 of the present embodiment rotates the lens L to match the angle of the lens L with the angle of the dye to be printed on the substrate S.

A specific method for rotating the lens L using the rotation device 22 may be changed. A method for determining the angle in the rotation direction of the lens L is not limited to a method for measuring the astigmatic axis angle of the lens L. For example, the preparation unit 20 may be provided with a concealed mark detection unit that detects a concealed mark indicating the angle in the rotation direction of the lens L. In this case, the rotation device 22 may determine the angle in the rotation direction of the lens L based on the concealed mark detected by the concealed mark detection unit and rotate the lens L based on the detected result. Further, at least one of the determination of the angle of the lens L and the rotation of the lens L may be performed by an operator. While, in a case in which the lens L is symmetry with respect to the geometric center axis, the rotation of the lens L is omitted.

Figure 5:
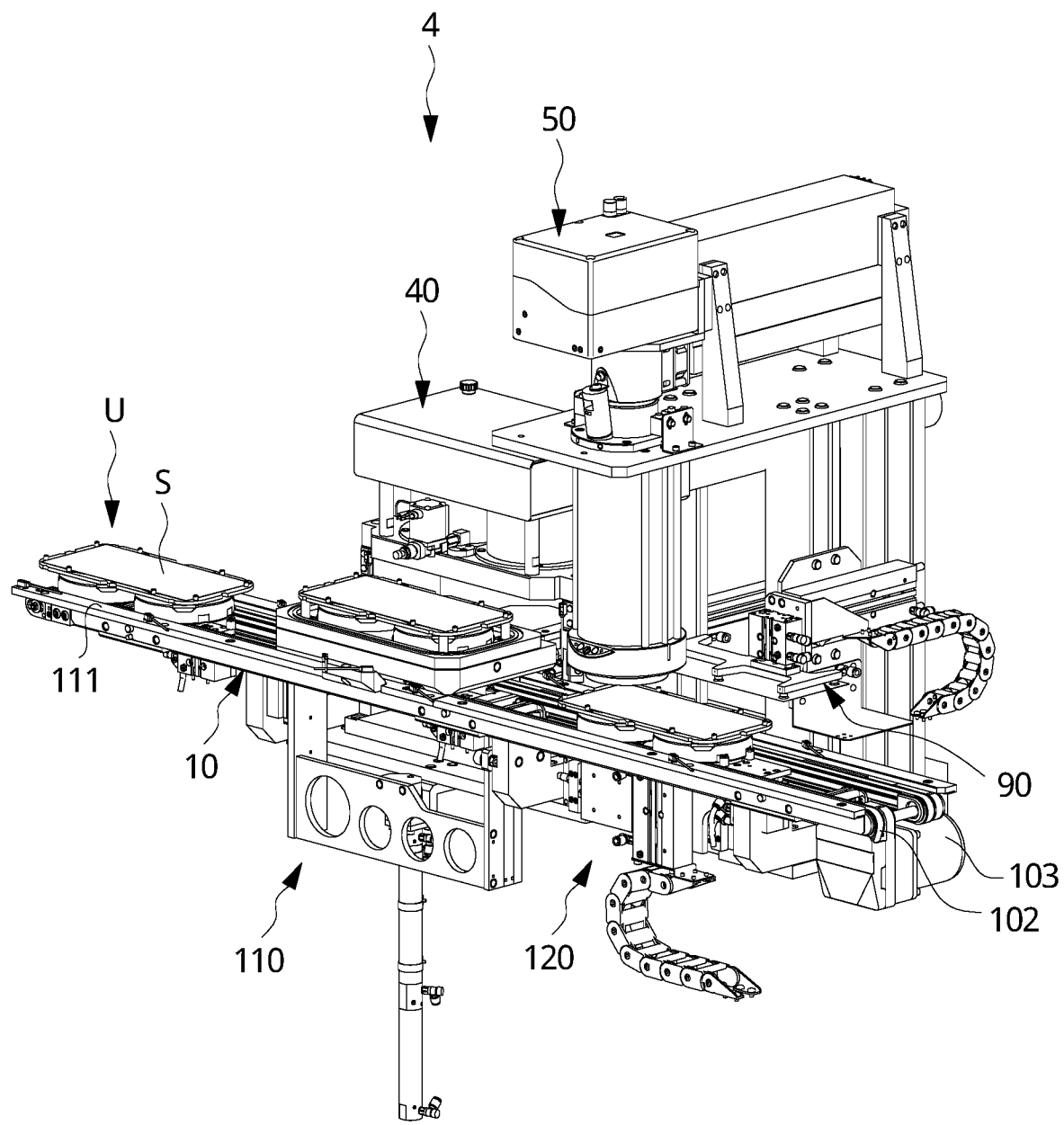
FIG. 5 is a perspective view illustrating a transferring and fixing unit 4 seen from a right upper side.
Figure 6:
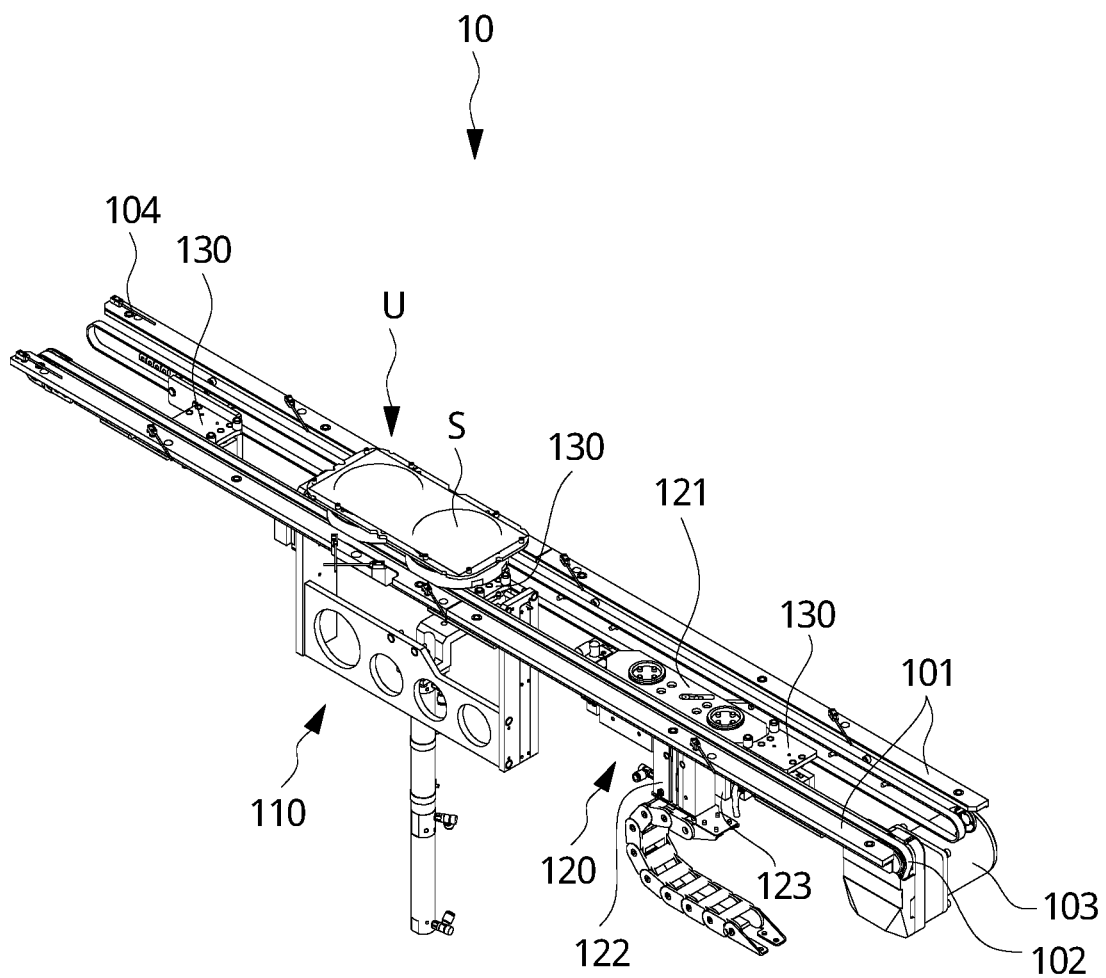
FIG. 6 is a perspective view illustrating a conveyance device 10 seen from a right upper side.
Figure 8:
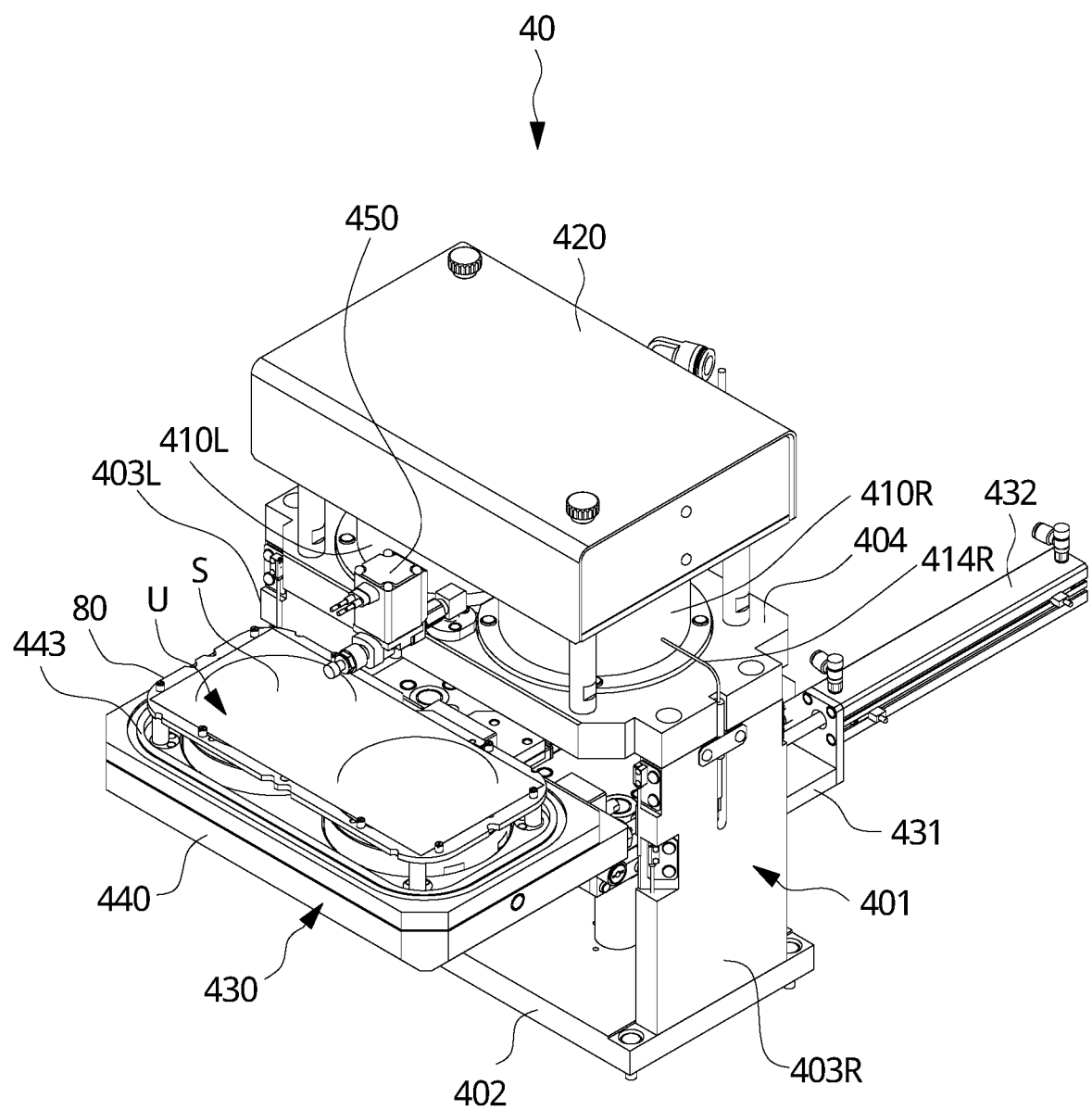
FIG. 8 is a perspective view illustrating a transfer device 40 seen from a right upper side.

The printing device 30 prints the dye on the sheet-like substrate S (see FIGS. 5, 6 and 8). In the present embodiment, a paper or a metallic film (made of aluminum in the present embodiment) with suitable hardness is adopted as the substrate S. However, as the material of the substrate S, other material such as glass, heat resistant resin, and ceramics may be adopted. Although the details are described below, in the dyeing system 1 of the present embodiment, in order to appropriately transfer the dye to the lens L while preventing aggregation of the dye, the dye on the substrate S is heated in a state in which the substrate S and the lens L are separately arranged in a vacuum (including substantially vacuum) to face each other and thereby the dye is transferred (deposited) to a surface of the lens L (the dyeing method in the present embodiment is called a vapor phase transfer dyeing method). Thus, an inkjet printer that prints an ink containing a sublimable dye, on the substrate S is adopted as the printing device 30. The printing device 30 may also print a normal ink not containing the sublimable dye, on the substrate S. The printing device 30 executes the printing based on the print data generated by the control device 70 served as an information processing device (a personal computer (hereinafter, referred to as "PC") in the present embodiment). As a result, the dye with an appropriate amount adheres to an appropriate position on the substrate S. The substrate S with dye for executing the gradation dyeing can be also produced easily.

A configuration of the printing device 30 may be changed. For example, the printing device may be formed as a laser printer. In this case, the toner may contain the sublimable dye. Further, the dye may adhere to the substrate S using a dispenser (liquid quantitative application device) or a roller, instead of using the printing device 30.

The transfer device 40 transfers the dye from the substrate S to the lens L in a state in which the substrate S on which the dye is printed is arranged to face the lens L, for each conveyance unit U conveyed by the conveyance device 10. As described above, in the present embodiment, the dye is transferred from the substrate S to the lens L by the vapor phase transfer method. However, the method for transferring the dye to the lens L may be changed. For example, the dye may be transferred from the substrate S to the lens L in a state in which the substrate S and the lens L are arranged to contact each other. The details of the configuration of the transfer device 40 are described below.

The dye fixing device 50 heats the lens L for each conveyance unit U conveyed by the conveyance device 10 and thereby fixes the dye, which adheres to the surface of the lens L, on the lens L. The dye fixing device 50 of the present embodiment irradiates a laser beam, which is an electromagnetic wave, to the lens L and thereby heats the lens L. However, a device that irradiates the electromagnetic wave other than the laser beam to the lens L (for example, an oven or the like) may be adopted as the dye fixing device. The details of the configuration of the dye fixing device 50 are described below.

In a conveyance path for the conveyance unit U conveyed by the conveyance device 10, a color information measuring device 51 that measures the color information of the lens L dyed by the dye (the lens L on which the dye is fixed) by the transfer device 40 and the dye fixing device 50 is arranged at a downstream side with respect to the dye fixing device 50 (in the present embodiment, a position between the dye fixing device 50 and the coating device 60 on the conveyance path). The color information measuring device 51 of the present embodiment is a spectroscopic measuring device that measures a spectrum of the lens L (specifically, a transmission spectrum in the present embodiment) as the color information. Thus, the color information for which an influence due to a lighting environment or the like is suppressed is acquired, compared to a case in which an RGB camera or the like is used as the color information measuring device. Further, in a case in which the lens L is dyed using the several dyes, the spectrum, which is a distribution of intensity for each wavelength, is acquired, so that the color information of the dyed lens L is appropriately acquired.

While, a device (for example, an RGB camera, or the like) other than the spectroscopic measuring device may be used as the color information measuring device. Further, a position of the color information measuring device 51 may be changed. For example, the color information measuring device 51 may be arranged in the dye fixing device 50. Further, the color information measuring device 51 may be arranged at a downstream side with respect to the coating device 60 on the conveyance path.

The coating device 60 coats a surface of the lens for which the dye is fixed by the dye fixing device 50, for each conveyance unit U conveyed by the conveyance device 10. A specific method for coating the lens L executed by the coating device 60 may be selected as needed. For example, at least one of a spray method, an inkjet printing method, a spin method, and a dip method may be adopted as the coating method. A kind of the coat may be selected as needed from various kinds of coats (for example, hard coat, antireflection coat, water repellent coat, primer coat, and the like).

The control device 70 controls the dyeing system 1. Various information processing devices (for example, at least one of PC, server computer, mobile terminal and the like) may be used as the control device 70. The control device 70 is provided with a controller 71 (for example, CPU or the like) that controls the dyeing system 1 and a database 72 that stores various data. The configuration of the control device 70 may be changed. Plural devices may work together as the control device 70. For example, a control device that controls the dyeing system 1 and a control device that includes the database 72 may be independently formed as respective devices. Further, plural devices may work together to control the dyeing system 1. For example, at least one of the conveyance device 10, the optical characteristic measuring device 21, the rotation device 22, the printing device 30, the transfer device 40, the dye fixing device 50, and the coating device 60 may be provided with the controller. In this case, the controller of the control device 70 and the controller of other device(s) may work together to control the dyeing system 1.

The dyeing system 1 is provided with a reader 2 that reads information relating to the conveyance unit U, for each conveyance unit U. As one example, the reader 2 of the present embodiment is formed as an identifier reader that reads an identifier installed in the conveyance unit U. The identifier to be read by the identifier reader 2 specifies the conveyance unit U. A kind of the identifier used in the dyeing system 1 may be selected as needed. For example, at least one of a QR code (registered trademark), a barcode, an identification hole formed in accordance with a predetermined standard, and the like may be adopted as an identifier. The identifier reader 2 is formed by an identifier reader corresponding to the used identifier (for example, a QR code reader, a barcode reader, an identification hole reader, or the like).

In the present embodiment, when the lens L is heated by the dye fixing device 50, a temperature of the conveyance unit U is increased. Further, also when the dye is transferred to the lens L by the transfer device 40, the temperature of the conveyance unit U is increased because the substrate S is heated. Further, the transfer device 40 of the present embodiment transfers the dye to the lens L in a substantially vacuum environment. Thus, it might be difficult that the reader 2 reads the information, due to an influence of heat and air pressure. However, in the present embodiment, the identifier, which is hardly affected by heat and air pressure, is installed in the conveyance unit U. Consequently, the dyeing system 1 of the present embodiment can appropriately read the information relating to the conveyance unit U while executing the dyeing process for which heating and decompressing is needed.

The configuration of the reader 2 may be changed. For example, a tag into which the information can be written (for example, an IC tag or the like) may be installed in the conveyance unit U. The information written in the tag may include a parameter for the process executed to the lens L in the conveyance unit U. In this case, a tag reader that reads the information from the tag is adopted as the reader 2. When the information is read from the tag by the tag reader 2, the parameter for the process executed to each lens L is appropriately acquired by the control device 70.

Further, the optical characteristic measuring device 21 that measures the optical characteristic of the lens L may be served as the reader that reads the information relating to the conveyance unit U. Further, a concealed mark detection unit that detects a concealed mark of the lens L may be served as the reader that reads the information relating to the conveyance unit U.

In the present embodiment, the reader 2 is installed in each device forming the dyeing system 1. Specifically, a reader 2A is installed at a position before (upstream side) a position where the conveyance unit U reaches the preparation unit 20 in the conveyance path of the conveyance unit U conveyed by the conveyance device 10. A reader 2B is installed in the preparation unit 20. A reader 2C is installed in the printing device 30. A reader 2D is installed in the transfer device 40. A reader 2E is installed in the dye fixing device 50. A reader 2F is installed in the coating device 60. The readers 2 are installed in respective devices, so that the information relating to the conveyance unit U is read as the conveyance unit U is conveyed to each device and then each process is appropriately executed in each device.

The position of the reader 2 may be changed. Further, at least one of the readers 2A to 2F shown in FIG. 1 may be omitted. For example, only the reader 2A installed at the upstream side in the conveyance path may be adopted. The control device 70 may determine the position of each of the conveyance unit U that is being conveyed by the conveyance device 10. In this case, the control device 70 may executed the process to each lens L based on the position of each conveyance unit U and the information relating to the conveyance unit U read by the reader 2.

Dyeing Tray

Figure 2:
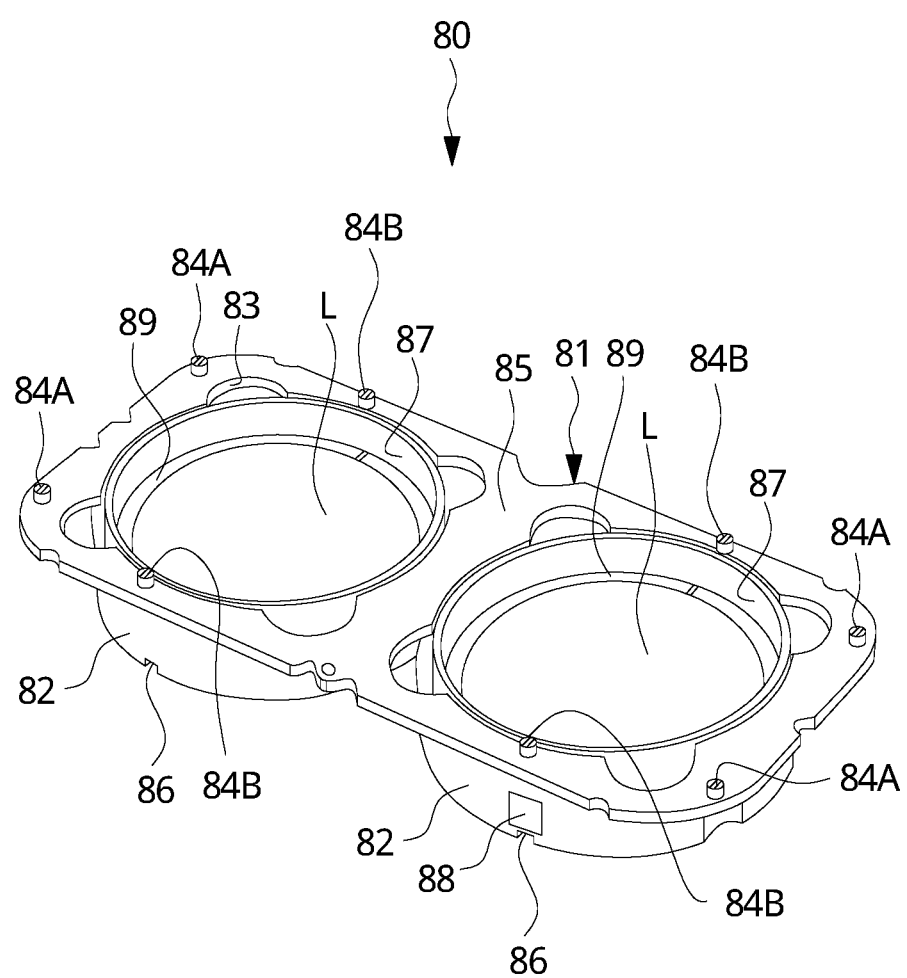
FIG. 2 is a perspective view illustrating a dyeing tray 80 seen from a right upper side, in which two lenses L are installed, while a substrate S is not installed.
Figure 3:
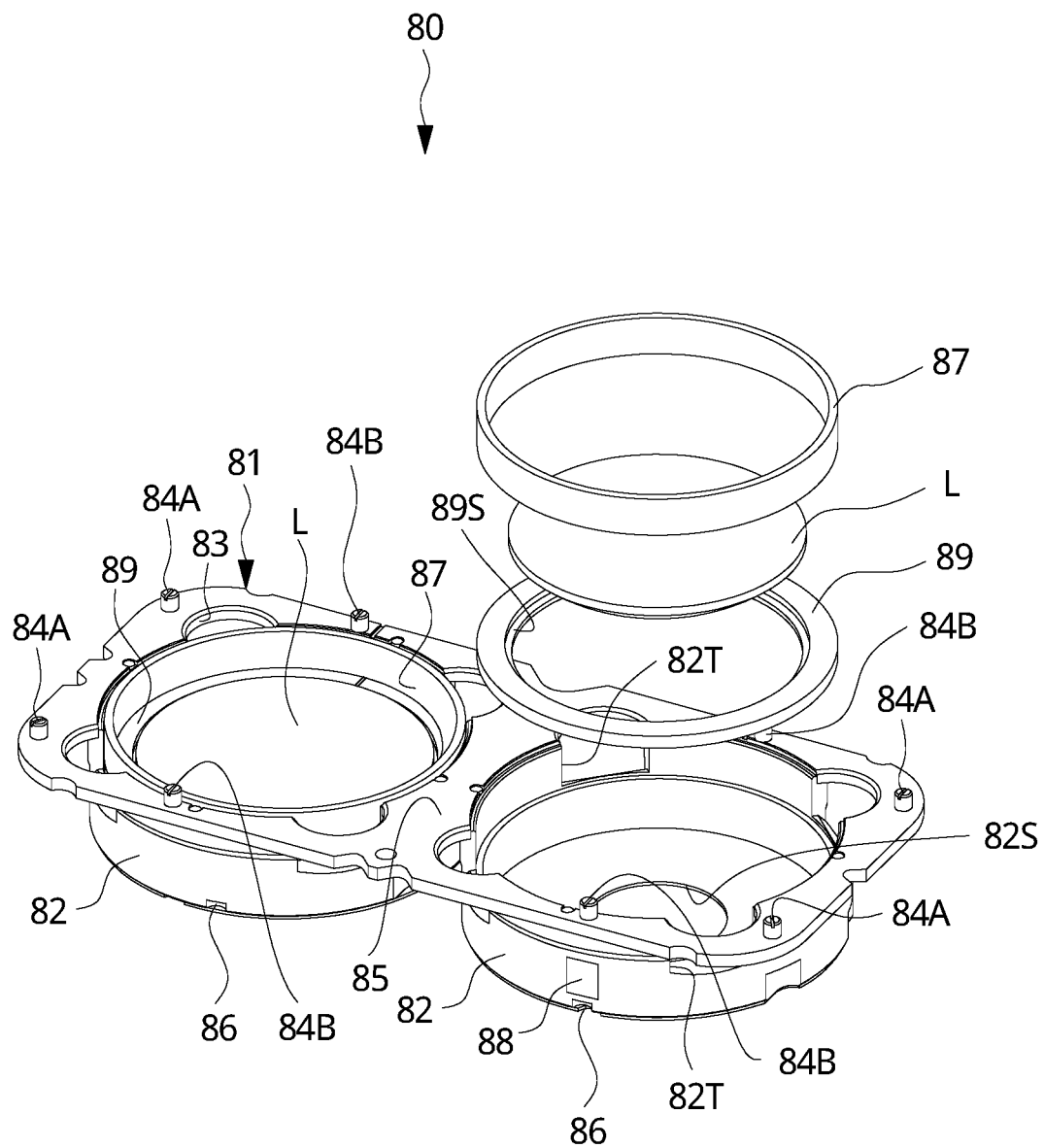
FIG. 3 is a perspective exploded view illustrating the dyeing tray 80 with a loading frame 89, the lens L and a spacer 87 to be attached to one of two attachment portions 82 shown in FIG. 2.

The dyeing tray 80 used in the dyeing system 1 of the present embodiment is described with reference to FIG. 2 and FIG. 3. As described above, the dyeing tray 80 is one example of the installation portion in which the lens L is installed during the conveyance thereof. FIG. 2 is a perspective view of the dyeing tray 80 in which two lenses L are installed (loaded), while the substrate S is not installed. FIG. 3 is a perspective exploded view illustrating the dyeing tray 80 with a loading frame 89, the lens L and a spacer 87 to be attached to one of two attachment portions 82.

As shown in FIG. 2 and FIG. 3, the dyeing tray 80 of the present embodiment is provided with a tray body 81, the loading frame 89, and the spacer 87. Each of the tray body 81, the loading frame 89, and the spacer 87 is formed of a material resistant to a high temperature and a low pressure (substantially vacuum). In the present embodiment, a portion where at least the lens L is loaded thereon and contacts thereto of the loading frame 89 (a whole portion of the loading frame 89 in the present embodiment) is formed of a material having the melting point of 200° C. or more (for example, at least one of fluororesin such as Teflon (registered trademark), stainless steel, and aluminum). In the fixing process (the details thereof are described below) in the vapor phase transfer dyeing method, the temperature of the lens L becomes high. Thus, the deformation or the like of the loading frame 89 is appropriately suppressed by adopting the material of the loading frame 89 having the melting point of 200° C. or more. Further, it is preferable that a portion where at least the lens L is loaded thereon and contacts thereto of the loading frame 89 (a whole portion of the loading frame 89 in the present embodiment) is formed of a material having the heat conductivity of 0.5 W/mK or less (for example, fluororesin such as Teflon (registered trademark)). The heat of the heated lens L is hardly conducted to the loading frame 89 by adopting the material having the heat conductivity of 0.5 W/mK or less as the material of the loading frame 89, so that the resin body is appropriately heated easily. In the present embodiment, each of the tray body 81 and the spacer 87 is formed of metal (aluminum), and the loading frame 89 is formed of Teflon (registered trademark). However, the material of the dyeing tray 80 may be changed. For example, the each of the tray body 81 and the spacer 87 may be formed of resin, and the loading frame 89 may be formed of metal.

The resin body (lens L in the present embodiment) to be dyed is loaded on the loading frame 89. The loading frame 89 of the present embodiment is formed in a ring shape having an outer diameter slightly larger than that of the lens L. A light transmissive portion 89S, which is a circular hole that allows a light to transmit therethrough in a vertical direction, is formed at a center portion of the loading frame 89. The light transmissive portion 89S may be formed by a material that allows a light to transmit therethrough (for example, glass or the like), instead of the hole. A plurality of kinds of the loading frames 89 of which an annular stepped portion, on which the lens L is loaded, has different diameter, is prepared in accordance with the diameter of the lens L to be loaded. The operator uses the loading frame 89 corresponding to the diameter of the lens L to be dyed and loads the lens L on the dyeing tray 80.

The spacer 87 is formed in a tubular shape (cylindrical shape) to be extended upward from an outer periphery of a portion where the lens L is loaded of the loading frame 89. As described above, in the present embodiment, the spacer 87 and the loading frame 89 are formed as respective components separated from each other. Thus, the operator can load the lens L on the loading frame 89 in a state in which the spacer 87 is detached. Consequently, the operator can load the lens L on the loading frame 89 easily. Further, since the loading frame 89 and the spacer 87 are formed as respective components, the material of the loading frame 89 may be different from the material of the spacer 87. However, the loading frame 89 and the spacer 87 may be formed integrally.

The attachment portion 82 is formed in the tray body 81. The loading frame 89 and the spacer 87 are detachably attached to the attachment portion 82. Thus, the operator can detach the loading frame 89 and the spacer 87 from the attachment portion 82 of the tray body 81 and clean or discard only the detached loading frame 89 and the detached spacer 87. Consequently, only the loading frame 89 and the spacer 87 to which the dye easily adheres in the dyeing process among the dyeing tray 80 are efficiently cleaned or discarded.

The attachment portion 82 of the present embodiment is formed in a tubular shape with bottom having a diameter slightly larger than both of the diameter of the loading frame 89 formed in a ring shape and the diameter of the spacer 87 formed in a cylindrical shape. Thus, the operator can attach the loading frame 89 to the attachment portion 82 easily. However, a shape of each of the loading frame 89 and the attachment portion 82 may be changed as needed.

As shown in FIG. 3, a light transmissive portion 82S, which is a hole (circular hole in the present embodiment) that allows a light to transmit therethrough, is formed in a bottom portion (center of the bottom portion in the present embodiment) of the attachment portion 82 formed in a tubular shape with bottom. The light transmissive portion 82S may be formed by a material that allows a light to transmit therethrough (for example, glass or the like), instead of the hole. Since the light transmissive portion 82S is formed in the attachment portion 82 and the light transmissive portion 89S is formed in the loading frame 89, the color information and the optical characteristic of the lens L can be measured in a state in which the lens L is installed (loaded) on the dyeing tray 80 and the substrate S is detached from the dyeing tray 80.

In the present embodiment, two attachment portions 82 are formed in one single tray body 81. Thus, a pair (left and right) of the lenses L used for a pair of glasses is dyed in a state in which they are loaded on one single dyeing tray 80. Consequently, the operation efficiency of the operator is further improved.

A substrate loading portion 85 on which the sheet-like substrate S to which the sublimable dye adheres (see FIGS. 5, 6, and 8) is loaded is formed at an upper and outer side with respect to the attachment portion 82 in the tray body 81. When the substrate S is loaded on the substrate loading portion 85, the sublimable dye adhering to the substrates S faces the lens L loaded on the loading frame 89. With this, the dye is appropriately transferred to the lens L.

The spacer 87 formed in a tubular shape forms a space between the substrate S loaded on the substrate loading portion 85 and the lens L loaded on the loading frame 89. Thus, the sublimable dye is appropriately transferred from the substrate S to the lens L through the space formed by the spacer 87. Further, the sublimed dye is appropriately prevented from being leaked to the outside by the spacer 87. Consequently, the outside of the space hardly gets dirty, so that the dyeing quality is hardly deteriorated.

When the loading frame 89 and the spacer 87 are attached to the attachment portion 82, an upper end of the spacer 87 is protruded upward with respect to a loading surface of the substrate loading portion 85. With this, the substrate S loaded on the substrate loading portion 85 and the upper end of the spacer 87 are apt to adhere to each other, so that the sublimed dye is further prevented from being leaked to the outside.

A recess portion 83 extended from the attachment portion 82 toward an outside (namely, the recess portion 83 that forms a space between the loading frame 89 and the spacer 87, and the tray body 81) is formed around the attachment portion 82 in the tray body 81. With this, the operator can insert a finger or the like into the recess portion 83, so that the loading frame 89, the spacer 87, and the lens L can be easily detached from the attachment portion 82. The recess portion 83 of the present embodiment is a notch formed in the tray body 81 having a substantially plate shape. However, the configuration of the recess portion 83 may be changed. For example, a recess portion recessed downward with respect to a top surface of the loading frame 89 attached to the attachment portion 82 may be formed. Further, four recess portions 83 are formed around each attachment portion 82 in the present embodiment. However, the number of the recess portions 83 may be changed as needed.

As shown in FIG. 3, a pair of transmissive portions for sensor 82T that allows a light emitted by an optical sensor is formed on a side surface of the attachment portion 82 having a substantially cylindrical shape with bottom. Thus, the optical sensor can appropriately detect whether at least one of the lens L, the loading frame 89, and the spacer 87 (the spacer 87 in the present embodiment) is attached to the attachment portion 82. In a case in which the optical sensor detects that the spacer 87 is not attached to the attachment portion 82, the dyeing system 1 of the present embodiment prohibits the transfer process to be executed by the transfer device 40, and the fixing process (namely, irradiation of the laser beam for fixing the dye) to be executed by the dye fixing device 50.

Projections 84 (84A and 84B) protruded upward with respect to the loading surface of the substrate loading portion 85 on which the substrate S is loaded are formed at positions at an outer side with respect to the attachment portion 82 in the tray body 81 (specifically, at an outer side with respect to the substrate loading portion 85).

A shape of the substrate S of the present embodiment is a rectangular sheet shape that covers both of two attachment portions 82. In the present embodiment, the projections 84 (eight projections) are formed at positions along an outer circumference of the substrate S loaded at an appropriate position in the dyeing tray 80 (namely, the substrate S is appropriately loaded on the substrate loading portion 85). Thus, the substrate S is loaded in a region (substrate loading portion 85) surrounded by the projections 84, so that the substrate S is appropriately positioned against the lens L. Further, the position of the loaded substrate S is prevented from being shifted from the lens L. That is, at least one of the projections 84 of the present embodiment (all of the projections 84A and 84B in the present embodiment) are served as a positioning portion that positions the substrate S against the lens L.

Further, at least one of the projections 84 of the present embodiment (all of the projections 84A and 84B in the present embodiment) is protruded upward by a thickness or more of the substrate S with respect to the loading surface of the substrate loading portion 85 on which the substrate S is loaded. Thus, even in a case in which other object is piled on the dyeing tray 80 on which the substrate S has been loaded, the piled object is apt to contact the projection(s) 84, so that the object hardly contacts the substrate S. Consequently, the substrate S is hardly damaged. As described above, the projection(s) 84 of the present embodiment is served as a substrate protection portion that protects the substrate S loaded on the dyeing tray 80, from the object piled above the substrate S.

In the present embodiment, projections 84 are served as both of the positioning portion and the substrate protection portion. In other words, at least a part of the positioning portion and at least a part of the substrate protection portion are formed by the projections 84. Consequently, the structure of the dyeing tray 80 is easily simplified.

A bottom engagement portion 86, which is a recess portion recessed upward, is formed on the bottom portion of the tray body 81 (in the present embodiment, each of the bottom portions of two attachment portions 82). When another dyeing tray 80 (tray body 81) is piled on the dyeing tray 80, four projections 84B adjacent to the attachment portion 82 among the projections 84 formed on the upper part of the tray body 81, engage with the bottom engagement portions 86 of the piled dyeing tray 80. That is, each of four projections 84B are served as a top engagement portion that engages with the bottom engagement portion 86 of another tray body 81 piled on. Thus, the dyeing trays 80 are stably piled in the vertical direction. Each of the bottom engagement portions 86 and each of the top engagement portions of the present embodiment are asymmetry arranged (for example, rotation asymmetry). Thus, the operator can easily pile the dyeing trays 80 with the orientation thereof matched.

The height of the projection 84B from the loading surface of the substrate loading portion 85 is equal to or larger than the total of the depth of the bottom engagement portion 86 (depth of the recess portion) and the thickness of the substrate S. Thus, even when the dyeing trays 80 are piled on in a state in which the substrates S are loaded on the substrate loading portions 85, each of the substrates S hardly contacts the dyeing trays 80 piled on, so that the substrate S is hardly damaged.

As described above, in the present embodiment, the projection 84B is served as the top engagement portion, the positioning portion, and the substrate protection portion. Consequently, the structure of the dyeing tray 80 is easily simplified. However, two or all of the top engagement portion, the positioning portion, and the substrate protection portion may be formed by respective components separated from each other.

In a case in which the projections 84 are formed in the tray body 80, the number of the projections 84 is not limited to eight. Further, the shape of the projection 84 may be changed. For example, the projection may be formed by a rib member extended upward from an area along the outer circumference of the substrate S.

An identifier 88 to be read by the reader 2 is installed in the tray body 81. The tray body 81 can be used many times compared to the loading frame 89 or the like. Thus, the frequency for installing the identifier 88 in a component is reduced, compared to a configuration in which the identifier 88 is installed in the loading frame 89 or the like. In a case in which a tag reader that reads the information from a tag is used as the reader 2 (see FIG. 1), the tag into which the information can be written may be installed in the tray body 81, instead of the identifier 88.

Automatic Dyeing Device

The automatic dyeing device 3 of the present embodiment is described with reference to FIG. 4 through FIG. 12. As described above, the automatic dyeing device 3 of the present embodiment is provided with the transfer device 40 and the dye fixing device 50 to execute the transferring and the fixing of the dye to the lenses L automatically and continuously. The automatic dyeing device 3 is assembled in the dyeing system 1 together with the printing device 30 and the like. Further, as described above, the printing device 30 or the like may be assembled in the automatic dyeing device 3.

Figure 4:
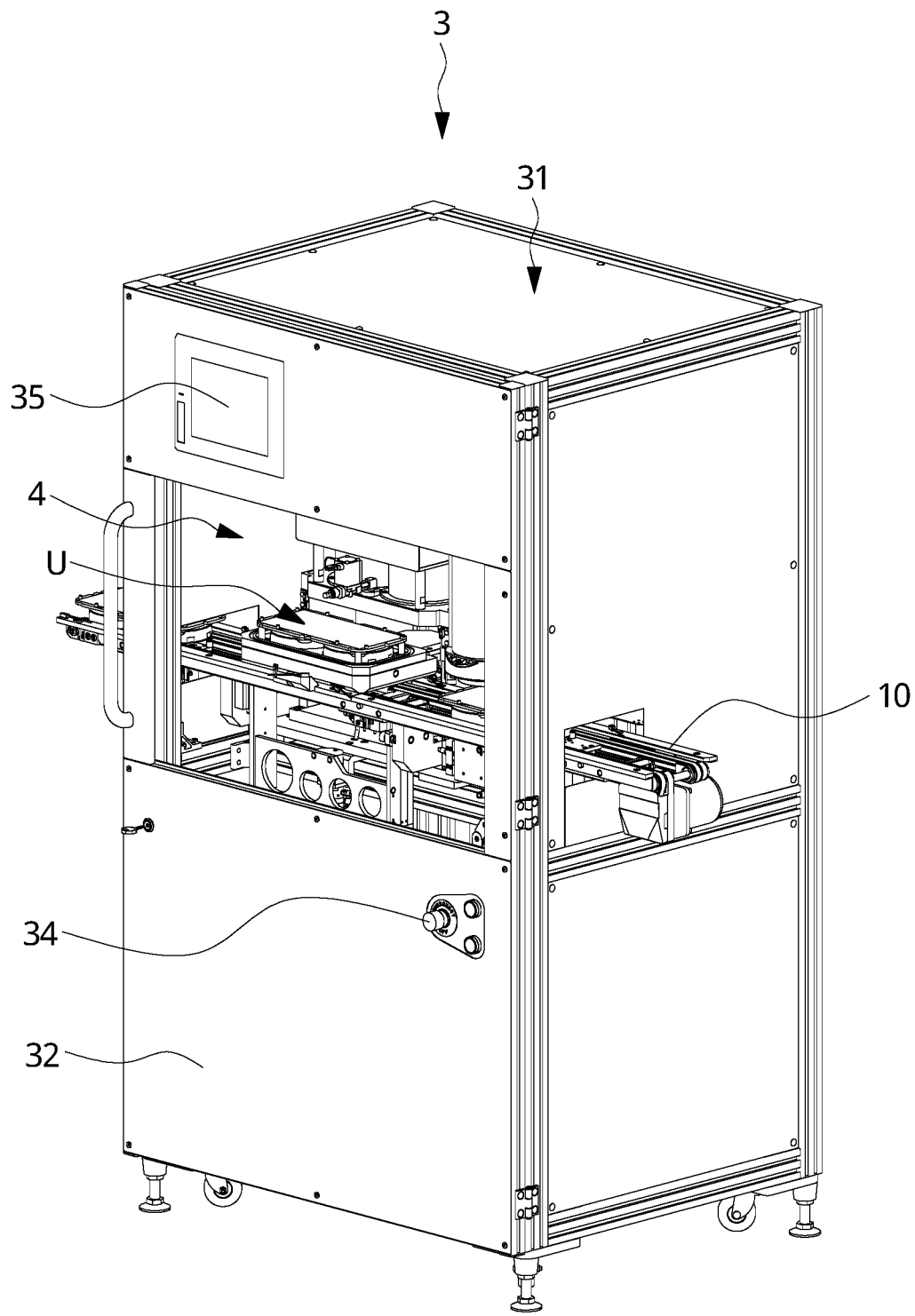
FIG. 4 is a perspective view illustrating an automatic dyeing device 3 seen from a right upper side.

As shown in FIG. 4, the automatic dyeing device 3 is provided with a housing 31 having a substantially box shape. A transferring and fixing unit 4 (see FIG. 5) in which the transfer device 40, the dye fixing device 50 and the like are assembled to a part of the conveyance device 10 is installed in the housing 31. Ends of the transferring and fixing unit 4 at a left side and a right side are protruded toward an outside from the housing 31.

A front portion 32 (a left front side in FIG. 4) of the housing 31 is connected to a body of the housing 31 via a hinge at a right end portion thereof in a rotatable manner with respect to the body of the housing 31. When the maintenance or the like of the automatic dyeing process 3 is executed, a whole of the front portion 32 is opened. Further, a wide region slightly upper than a center portion of the housing 31 in the vertical direction is formed of a transparent material. Thus, the operator can check the process executed by the automatic dyeing device 3 through the transparent material. An emergency stop button 34 or the like for inputting instructions to forcibly stop the operation of the automatic dyeing device 3 is formed at a position slightly lower than the center portion of the front portion 32 of the housing 31 in the vertical direction. Further, a touch panel 35 that receives various operational instructions input by the operator is formed at an upper part of the front portion 32 of the housing 31.

As shown in FIG. 5, the transferring and fixing unit 4 is provided with a part of the conveyance device 10, the transfer device 40, the dye fixing device 50, and a substrate holding device 90. The conveyance device 10 of the present embodiment schematically conveys the conveyance units U continuously from the upstream side (left side in FIG. 5) to the downstream side (right side in FIG. 5) in the conveyance direction. In the transferring and fixing unit 4, the transfer device 40, the dye fixing device 50, and the substrate holding device 90 are arranged in this order from the upstream side in the conveyance direction. The conveyance device 10 conveys the conveyance unit U to the transfer device 40, the substrate holding device 90, the dye fixing device 50, and the substrate holding device 90 in this order. The positions of the dye fixing device 50 and the substrate holding device 90 may be reversed. The automatic dyeing device 3 of the present embodiment conveys the conveyance unit U including the substrate S to which the dye adheres, to the transferring and fixing unit 4.

Conveyance Device

The conveyance device 10 included in the transferring and fixing device 4 is described with reference to FIG. 6 and FIG. 7. As shown in FIG. 6, the conveyance device 10 is provided with a pair of rails 101 extended in the conveyance direction. A rotation belt 102 formed along the rail 101 is arranged near the rail 101. The rotation belt 102 is connected to a conveyance motor 103 (for example, a stepping motor or the like). When the conveyance motor 103 is driven, the rotation belt 102 is rotated. When the rotation belt 102 is rotated, the conveyance unit U moves in the conveyance direction along the rail 101.

Sensors 104 (in the present embodiment, photoelectric sensor) for detecting presence/absence of the conveyance unit U are arranged at plural positions on the rail 101. The control unit 70 detects the position of the conveyance unit U that is being conveyed by the conveyance device 10, based on the detection results of the sensors 104.

The conveyance device 10 is provided with a first delivery unit 110 and a second delivery unit 120. The first delivery unit 110 is arranged at a transfer delivery position near the transfer device 40 (see FIG. 5) to deliver the conveyance unit U between the conveyance device 10 and the transfer device 40. The second delivery unit 120 is arranged at a fixing delivery position near the dye fixing device 50 (see FIG. 5) to deliver the resin body (lens L) in the conveyance unit U between the conveyance device 10 and the dye fixing device 50.

Figure 7:
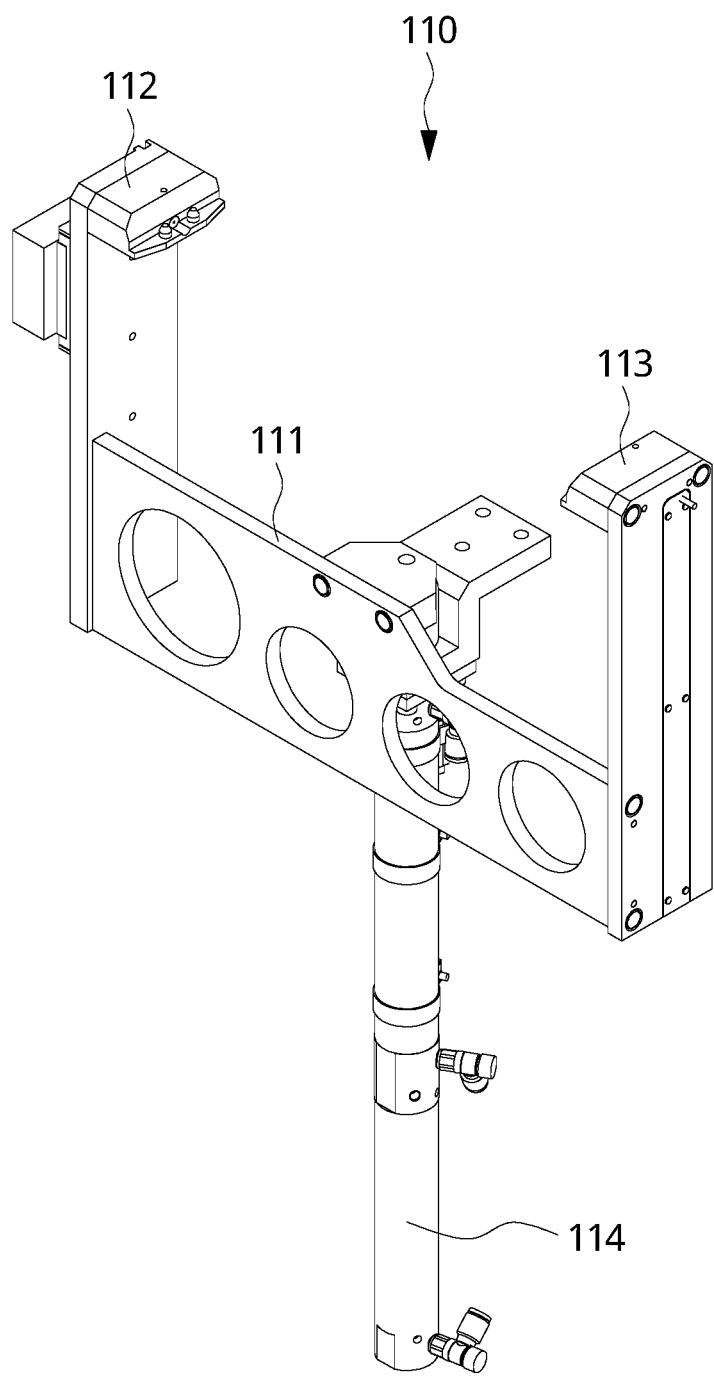
FIG. 7 is a perspective view illustrating a first delivery unit 110 seen from a right upper side.

As shown in FIG. 7, the first delivery unit 110 is provided with a base portion 111, a left arm 112, a right arm 113, and a vertical movement unit 114. The base portion 111 connects the left arm 112 and the right arm 113. Specifically, the left arm 112 is extended upward from a left end of the base portion 111 and is bent toward a right side at an upper part thereof. The right arm 113 is extended upward from a right end of the base portion 111 and is bent toward a left side at an upper part thereof. A distance between the distal ends of the left arm 112 and the right arm 113 is set to be slightly shorter than a length of the dyeing tray 80 (see FIG. 2 and FIG. 3) in a left-right direction.

The vertical movement unit 114 is fixed to the base portion 111. The vertical movement unit 114 is formed by an actuator such as a motor, a cylinder type actuator, and a solenoid (in the present embodiment, cylinder type actuator). When the vertical movement unit 114 is driven, the base portion 111, the left arm 112, and the right arm 113 are integrally moved in the vertical direction. When the left arm 112 and the right arm 113 are moved to an upper position in a state in which the conveyance unit U is conveyed to the transfer delivery position near the transfer device 40, the conveyance unit U positioned at the transfer delivery position is lifted. The conveyance unit U lifted by the first delivery unit 110 is delivered to the transfer device 40 (the details are described below). Further, the conveyance unit U is delivered from the transfer device 40 to the first delivery unit 110 in a state in which the left arm 112 and the right arm 113 are positioned at the upper position. Thereafter, the left arm 112 and the right arm 113 are moved downward, and then the conveyance unit U is returned to the conveyance path.

The description is returned to FIG. 6. The second delivery unit 120 is provided with a lens lift portion 121, a vertical movement unit 121, and a resin body switching unit 123. The lens lift portion 121 is positioned below the conveyance unit U conveyed to the fixing delivery position. The vertical movement unit 122 is fixed to the lens lift portion 121. The vertical movement unit 122 is formed by an actuator such as a motor, a cylinder type actuator, and a solenoid (in the present embodiment, cylinder type actuator). When the vertical movement unit 122 is driven, the lens lift portion 121 is moved in the vertical direction. When the lens lift portion 121 is moved to an upper position, one of two lenses L in the conveyance unit U is delivered to a fixing position where the fixing process is executed by the dye fixing device 50. Further, when the lens lift portion 121 is moved to a lower position, the lens L is delivered from the fixing position to the conveyance path. The resin body switching unit 123 is provided with an actuator such as a motor, a cylinder type actuator, and a solenoid (in the present embodiment, cylinder type actuator). The resin body switching unit 123 moves the lens lift portion 121 in the conveyance direction using the actuator and thereby switches the lens L to be arranged at the fixing position, between two lenses L in the conveyance unit U.

The conveyance device 10 is provided with a plurality of unit positioning portions 130. The unit positioning portions 130 are arranged between the rails forming a pair, at respective positions on the conveyance path. When the unit positioning portion 130 is moved upward by a vertical movement actuator (not shown), the unit positioning portion 130 contacts the conveyance unit U conveyed on the conveyance path and thereby the conveyance unit U is stopped at a predetermined position. Thus, the conveyance device 10 of the present embodiment can stop the conveyance unit U at a predetermined position on the conveyance path precisely. That is, the automatic dyeing device 3 of the present embodiment uses both of the sensor 104 and the unit positioning portion 130 and thereby stops the conveyance unit U at a precise position. However, one of the sensor 104 and the unit positioning portion 130 may be omitted.

Transfer Device

The transfer device 40 is described with reference to FIG. 8 through FIG. 10. As shown in FIG. 8, the transfer device 40 of the present embodiment is provided with a base portion 401, electromagnetic wave passing portions 410R, 410L, an electromagnetic wave generator 420, a closed chamber setting unit 430, and an air pressure controller 450. The base portion 401 supports the transfer device 40. The electromagnetic wave passing portions 410R, 410L allow the electromagnetic wave generated by the electromagnetic wave generator 420 to pass therethrough to the substrate S arranged in a closed chamber C (see FIG. 9) described below. The electromagnetic wave generator 420 generates the electromagnetic wave for heating the substrate S. The closed chamber setting unit 430 forms the closed chamber C together with the base portion 401 and the like. That is, an inside of the closed chamber C is a sealed space surrounded by the closed chamber setting unit 430, the base portion 401, and the like. The closed chamber setting unit 430 sets the conveyance unit U, which is delivered by the first delivery unit 110 (see FIG. 7) of the conveyance device 10, in the closed chamber C. The air pressure controller 450 varies the air pressure in the closed chamber C.

The base portion 401 is provided with a bottom 402, a right column 403R, a left column 403L, and a base 404. The bottom 402 is loaded at an installation position to support a whole of the transfer device 40. The right column 403R is extended upward from a right end of the bottom 402. The left column 403L is extended upward from a left end of the bottom 402. The base 404 is fixed to an upper end of the right column 403R and an upper end of the left column 403L. Thus, when the base portion 401 is seen from a front-rear direction, a rectangular opening is formed in the base portion 401. The base 404 is a substantially plate-like member having sufficient strength. The base 404 has openings respectively facing two lenses L set in the closed chamber C by the closed chamber setting unit 430.

The electromagnetic wave passing portions 410R, 410L are cylindrical members respectively arranged between two openings formed in the base 404 and the electromagnetic wave generator 420. As shown in FIG. 9, the electromagnetic generator 420 is provided with generation sources (in the present embodiment, a halogen heater) 421R, 421L, which generate the electromagnetic wave, therein. The generation source 421R is arranged on an axis of the cylindrical electromagnetic wave passing portion 410R. Similarly, the generation source 421L is arranged on an axis of the cylindrical electromagnetic wave passing portion 410L.

Figure 9:
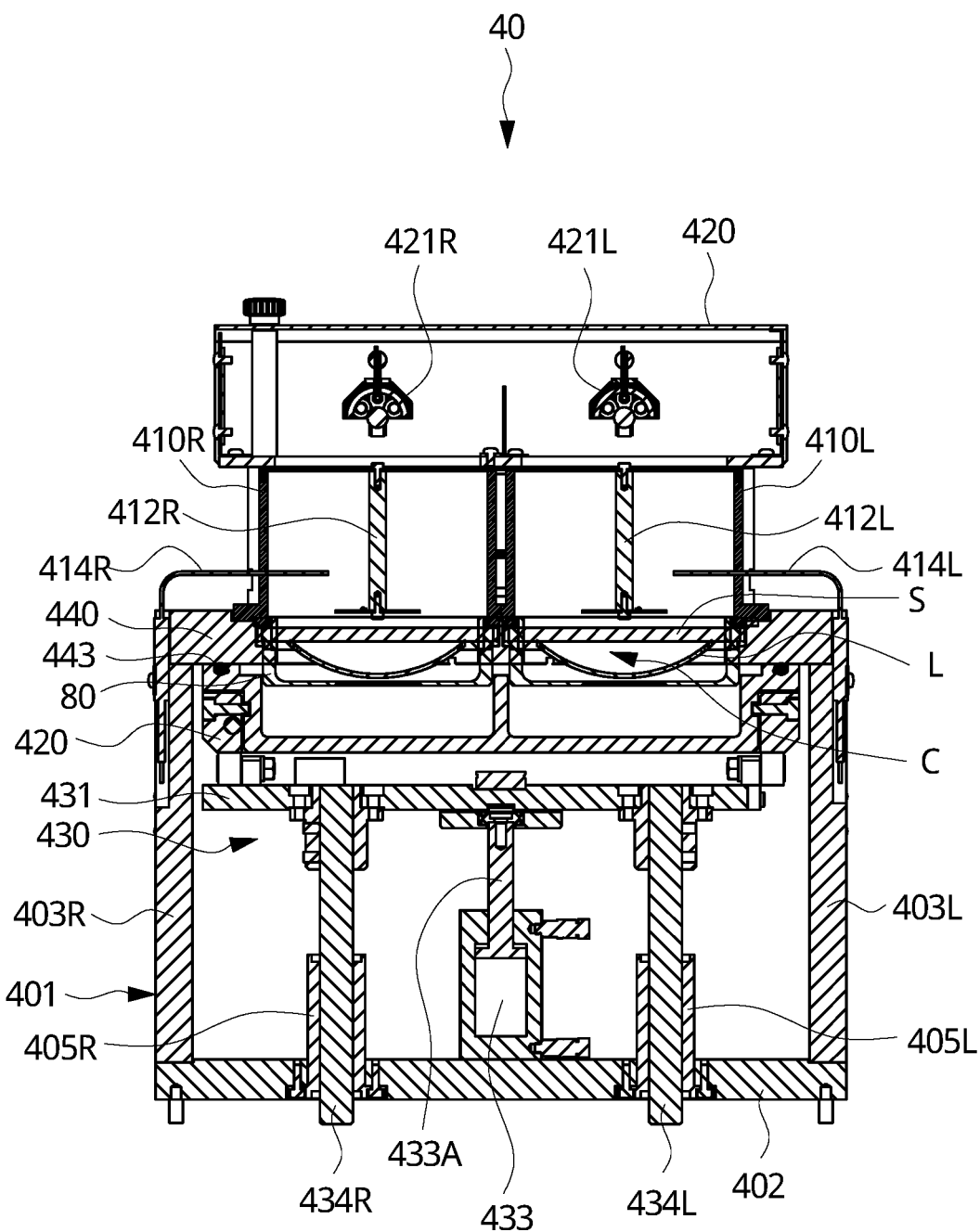
FIG. 9 is a cross-sectional view illustrating a vertical section of the transfer device 40 seen from a rear side.
Figure 10:
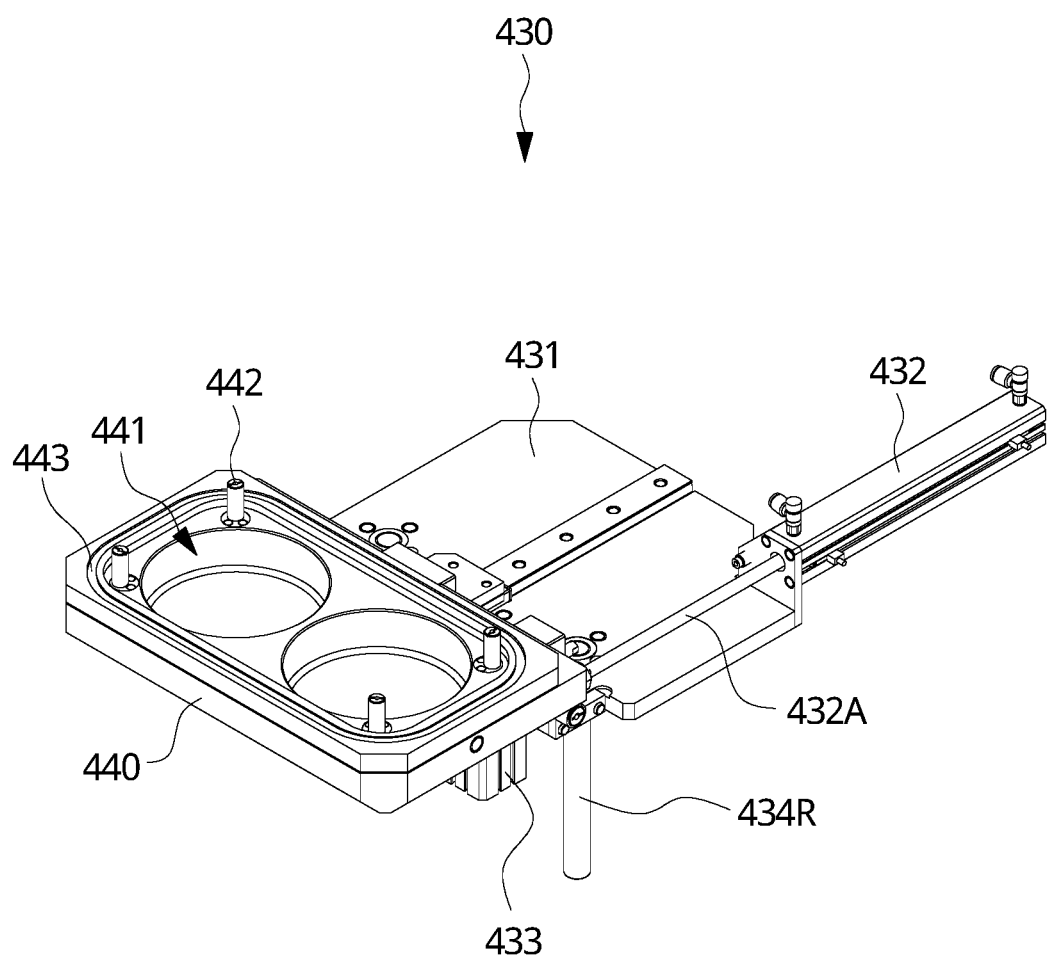
FIG. 10 is a perspective view illustrating a closed chamber setting unit 430 seen from a right upper side.

As shown in FIG. 10, the closed chamber setting unit 430 is provided with a base 431, a closed chamber bottom 440, a front-rear movement unit 432, a vertical movement unit 433, and guide poles 434R, 434L (only the guide pole 434R is shown in FIG. 10). The base 431 is a substantially plate-like member forming a base of the closed chamber setting unit 430. As shown in FIG. 8, the base 431 is arranged in the rectangular opening of the base portion 401. As shown in FIG. 10, the closed chamber bottom 440 is a substantially plate-like member having sufficient strength. A conveyance unit loading portion 441 on which the conveyance unit U including the substrate S is loaded is formed on a top surface of the closed chamber bottom 440. The conveyance unit loading portion 441 of the present embodiment has a recess and a projection corresponding to the shape of the dyeing tray 80 (see FIGS. 2, 3, and 9).

Although the details are described below, the closed chamber bottom 440 is pushed upward against the base 404 of the base portion 401 (see FIGS. 8 and 9) to close a bottom surface of the closed chamber C (see FIG. 9). As shown in FIG. 10, a tray pushing portion 442 and a sealing portion 443 are formed on the top surface of the closed chamber bottom 440.

The tray pushing portion 442 is protruded upward from each position in the conveyance unit loading portion 441 (in the present embodiment, each of four corners of the conveyance unit loading portion 441) and is biased upward by the biasing member (for example, a spring or the like). When the closed chamber bottom 440 is pushed upward against the base 404, the dyeing tray 80 in the conveyance unit U is pushed into the closed chamber C by the tray pushing portions 442. As a result, the dye heated by the electromagnetic wave and sublimed from the substrate S is hardly leaked to an outside of the loading frame 89 and the spacer 87 of the dyeing tray 80 (see FIGS. 2 and 3).

The sealing portion 443 is arranged to annularly cover an outer periphery of the conveyance unit loading portion 441 without forming a gap. The sealing portion 443 is slightly protruded upward from a top surface of the conveyance unit loading portion 441. The sealing portion 443 is formed of a material resistant to a high temperature and a pressure change and having suitable flexibility. Thus, when the closed chamber bottom 440 is pushed upward against the base 404, the sealing portion 443 is pressed against the bottom surface of the base 404 and deformed, so that the airtightness of the closed chamber C (see FIG. 9) is improved.

The front-rear movement unit 432 is an actuator (in the present embodiment, a cylinder actuator) that moves an actuation shaft 432A in the front-rear direction. The front-rear moving portion 432 is fixed to the base 431. The actuation shaft 432A of the front-rear movement unit 432 is fixed to the closed chamber bottom 440. When the front-rear movement unit 432 is driven, the closed chamber bottom 440 is moved in the front-rear direction.

As shown in FIG. 9, the vertical movement unit 433 is an actuator (in the present embodiment, a cylinder actuator) that moves an actuation shaft 433A in the vertical direction. The vertical movement unit 433 is fixed to the bottom 402 of the base portion 401. The actuation shaft 433A of the vertical movement unit 433 is fixed to the base 431. Further, each of the guide poles 434R, 434L is a bar-like member extended downward from the bottom surface of the base 431. The guide poles 434R, 434L are respectively inserted into cylinders 405R, 405L formed on the bottom 402 of the base portion 401 in a vertically movable manner. When the vertical movement unit 433 is driven, the base 431 is moved in the vertical direction. The vertical movement of the base 431 is guided by the guide poles 434R, 434L and the cylinders 405R, 405L. When the base 431 is moved in the vertical direction, the closed chamber bottom 440 supported by the base 431 is moved in the vertical direction.

As shown in FIG. 9, a mask portion 412R is formed at a center portion of the cylindrical electromagnetic wave passing portion 410R. Similarly, a mask portion 412L is formed at a center portion of the cylindrical electromagnetic wave passing portion 410L. Each of the mask portions 412R, 412L interrupts a path of the electromagnetic wave irradiated to a center portion of a circular region on the substrate S to which the dye has adhered, among a path of the electromagnetic wave irradiated to the substrate S from each of the generation sources 421R, 421L of the electromagnetic wave generator 420. As one example, each of the mask portion 412R, 412L of the present embodiment is provided with a shaft extended downward along an axis of each of the cylindrical electromagnetic wave passing portions 410R, 410L, and a disc portion extended in a circular manner to an outer side from a lower portion of the shaft with respect to the shaft as a center. The electromagnetic wave irradiated to the center portion of the circular region to which the dye has adhered, is interrupted by the disc portion.

In a case in which the mask portions 412R, 412L are not formed, the intensity of the electromagnetic wave irradiated to the center portion of the circular region to which the dye has adhered, is stronger than that of the electromagnetic wave irradiated to the periphery of circular region. Further, the heat of the center portion of the circular region of the dye is hardly dissipated, compared to the heat of the periphery of the circular region. Thus, when the electromagnetic wave irradiated to the center portion of the circular region of the dye is interrupted by each of the masks 412R, 412L, the temperature of the center portion of the circular region of the dye is prevented from being increased excessively than the temperature of the periphery thereof. As a result, the dye is uniformly transferred to the lens L easily.

A temperature detection portion 414R that detects a temperature of an inside is arranged in the electromagnetic wave passing portion 410R. Similarly, a temperature detection portion 414L that detects a temperature of an inside is arranged in the electromagnetic wave passing portion 410L. In a case in which the temperature in the closed chamber C is not increased when the generation sources 421R, 421L irradiate the electromagnetic wave, the controller 71 executes at least one of a warning process that warns the operator that failure is caused and a prohibiting process that prohibits executing of the transfer process.

The air pressure controller 450 (see FIG. 8) is provided with a pump and an electromagnetic valve. When the pump is driven, gas in the closed chamber C is discharged to an outside through an air supply and exhaust pipe (not shown). As a result, the closed chamber C is turned into a substantially vacuum. The airtightness in the closed chamber C is sustained by closing the electromagnetic valve. When the electromagnetic valve 33 is opened, gas is introduced from the outside into the closed chamber C, which is in an air pressure reduced state, so that the air pressure in the closed chamber C is increased. Here, a pressure sensor that detects the air pressure in the closed chamber C is arranged in the closed chamber C. In a case in which the air pressure in the closed chamber C is not reduced when the pump is driven, the controller 71 executes at least one of a warning process that warns the operator of malfunction of the transfer device 40 and a prohibiting process that prohibits executing of the transfer process.

The operation in the transfer process executed by the transfer device 40 is described. At first, the controller 71 drives the front-rear movement unit 432 (see FIGS. 8 and 10) of the closed chamber setting unit 430 in a state in which the conveyance unit U is positioned at the upper position by the first delivery unit 110 (see FIGS. 5 to 7) to move the closed chamber bottom 440 from the opening of the base portion 401 to a front side (conveyance path side). As a result, the closed chamber bottom 440 is positioned below the conveyance unit U. Next, the controller 71 causes the first delivery unit 110 to move the conveyance unit U downward, so that the conveyance unit U is loaded on the conveyance unit U on the conveyance unit loading portion 441 of the closed chamber bottom 440. And then, the controller 71 drives the front-rear movement unit 432 of the of the closed chamber setting unit 430 to move the closed chamber bottom 440 on which the conveyance unit U is loaded, to below the base 404 of the base portion 401. And then, the controller 71 drives the vertical movement unit 433 of the closed chamber setting unit 430 to move the closed chamber bottom 440 on which the conveyance unit U is loaded, upward, so as to push the base 404 upward.

Here, it is necessary that the transfer device 40 forms the closed chamber C. Since the inside of the closed chamber C is turned into a substantially vacuum state, the weight of the component that forms the closed chamber C is apt to be heavy. Thus, it is inefficient that the conveyance unit U is arranged in the closed chamber C by moving a whole of the transfer device 40. Against this, the transfer device 40 of the present embodiment forms the closed chamber C by moving upward only the closed chamber bottom 440 that closes the bottom of the closed chamber C, and arranges the conveyance unit U in the closed chamber C. Consequently, the transfer process is efficiently executed.

Further, as described above, the dyeing tray 80 of the conveyance unit U is pushed from below thereof by the tray pushing portion 442 into the closed chamber C. As a result, the sublimed dye is hardly leaked to the outside of the loading frame 89 and the spacer 87 of the dyeing tray 80 through the gap. Further, when the closed chamber bottom 440 is pushed from below thereof against the base 404, the sealing portion 443 is pressed against the bottom surface of the base 404 and thereby deformed. As a result, the sealing performance is improved.

Next, the controller 71 drives the air pressure controller 450 to turn the closed chamber C into a substantially vacuum state. The controller 71 causes the generation sources 421R, 421L of the electromagnetic wave generator 420 to generate the electromagnetic wave so as to heat the dye on the substrate S in the conveyance unit U. The heated dye is sublimed and transferred to the surface of the lens L (top surface in the present embodiment) arranged to face the substrate S. Here, the mask portions 412R, 412L interrupt the path of the electromagnetic wave irradiated to the center portion of the circular region of the dye on the substrate S. Thus, the dye, which has adhered to the substrate S in a circular shape, is uniformly heated easily.

Next, the controller 71 stops the driving of the generation sources 421R, 421L and causes the air pressure controller 450 to increase the air pressure in the closed chamber C. The controller 71 drives the vertical movement unit 433 of the closed chamber setting unit 430 to move downward the closed chamber bottom 440 on which the conveyance unit U is loaded. And then, the controller 71 drives the front-rear movement unit 432 of the closed chamber setting unit 430 to move the closed chamber bottom 440 on which the conveyance unit U is loaded to a side of the conveyance path. As a result, the bent portions of the upper ends of the left arm 112 and the right arm 113 of the first delivery unit 110 are positioned between the closed chamber bottom 440 and the dyeing tray 80. The controller 71 retreats the closed chamber bottom 440 rearward from the conveyance path in a state in which the conveyance unit U is lifted by moving upward the left arm 112 and the right arm 113. The controller 71 causes the first delivery unit 110 to move downward the conveyance unit U to deliver the conveyance unit U onto the conveyance path. The transfer process is finished through the processes described above.

Substrate Holding Device

Figure 11:
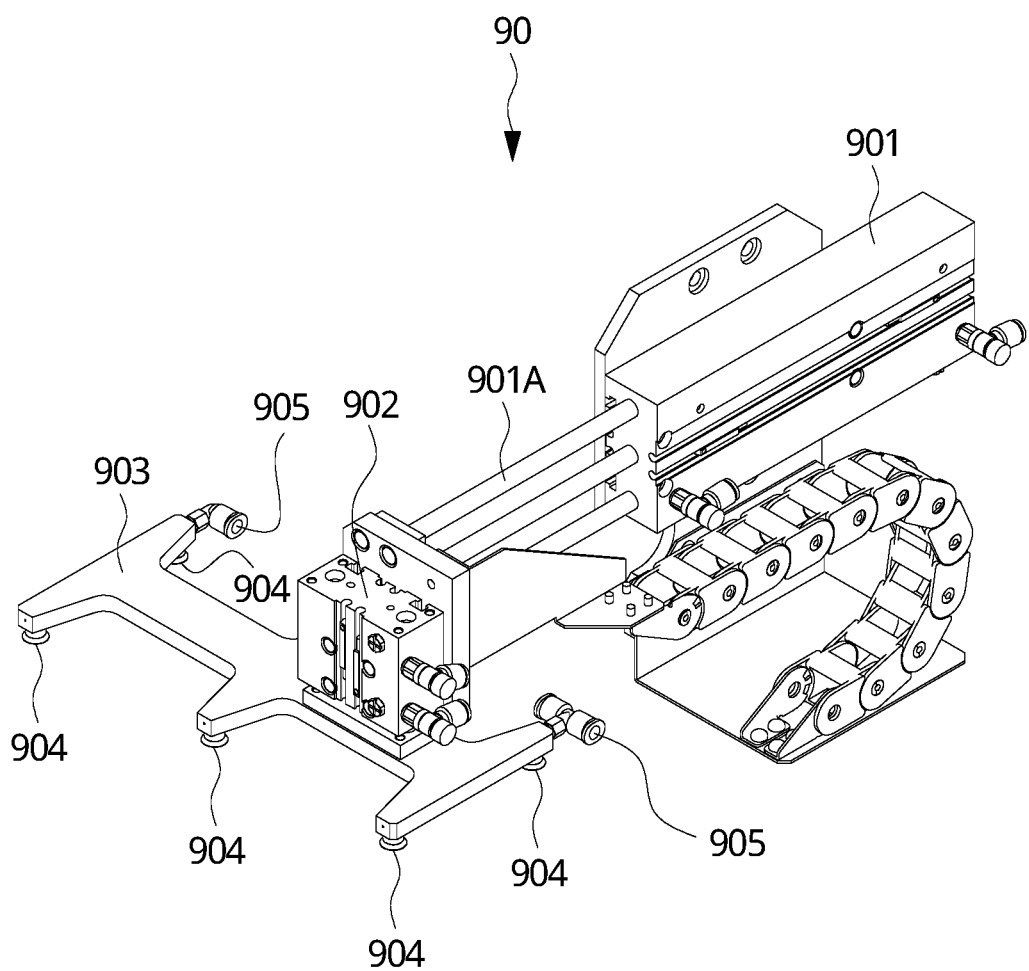
FIG. 11 is a perspective view illustrating a substrate holding device 90 seen from a right upper side.

The substrate holding device 90 is described with reference to FIG. 11. The substrate holding device 90 removes the substrate S from the conveyance unit U after the transfer process and before the fixing process. Further, the substrate holding device 90 of the present embodiment loads the removed substrate S again on the conveyance unit U after the fixing process.

The substrate holding device 90 of the present embodiment is provided with a front-rear movement unit 901, a vertical movement unit 902, and a substrate holding unit 903. The front-rear movement unit 901 is formed by an actuator (in the present embodiment, cylinder type actuator) that moves an actuation shaft 901A in the front-rear direction. The actuation shaft 901A of the front-rear movement unit 901 is fixed to the vertical movement unit 902. The vertical movement unit 902 is formed by an actuator (in the present embodiment, cylinder type actuator) that moves an actuation shaft (not shown) in the vertical direction. The actuation shaft of the vertical movement unit 902 is fixed to the substrate holding unit 903. When the front-rear movement unit 901 is driven, the vertical movement unit 902 and the substrate holding unit 903 are moved in the front-rear direction. When the vertical movement unit 902 is driven, the substrate holding unit 903 is moved in the vertical direction.

The substrate holding unit 903 is provided with a suction port 904 and a passage connection portion 905. The suction port 904 is directed downward. Six suction ports 904 are formed in the substrate holding unit 903 of the present embodiment (five suction ports 904 are shown in FIG. 11). However, the number of the suction ports may be changed. The passage connection portion 905 is connected to a pump (not shown) that generates suction pressure, via a tube. The suction ports 904 and the passage connection portion 905 are connected through a gas passage (not shown) formed inside the substrate holding unit 903. When the pump is driven, gas is sucked from the suction port 904.

In a case in which the substrate holding device 90 removes the substrate S from the conveyance unit U, the controller 71 drives the front-rear movement unit 901 to move the substrate holding unit 903 to above the conveyance unit U conveyed to a substrate removing position in front of the substrate holding device 90. Next, the controller 71 drives the vertical movement unit 902 to move downward the substrate holding unit 903. When the substrate holding unit 903 is moved downward, the suction port 904 of the substrate holding unit 903 contacts a top surface of the substrate S loaded on the conveyance unit U. The controller 71 drives the pump to suck gas from the suction port 904. As a result, the substrate S is sucked and held by the suction port 904. The controller 71 drives the front-rear movement unit 901 in a state in which the substrate S is held by the substrate holding unit 903 to retreat the substrate holding unit 903 and the substrate S to a rear position (namely, a retreated position retreated from the conveyance path).

Although the details are described below, the dyeing system 1 may print the identifier for identifying the conveyance unit U, together with the dye on the substrate S. In this case, the reader 2E of the dye fixing device 50 (see FIG. 1) is arranged below the substrate holding unit 903 positioned at the retreated position. As described above, the dye is printed on the bottom surface, which faces the lens L, of the sheet-like substrate S. Thus, in a case in which the printing device 30 prints the identifier on the bottom surface of the substrate S similar to the dye, the operation hours can be reduced, compared to a case in which the identifier is printed on the top surface of the substrate S. While, in a case in which the identifier is printed on the bottom surface of the substrate S, it is difficult to read the identifier in a state in which the substrate S is loaded on the conveyance unit U. Against this, in the present disclosure, the reader 2E is arranged below the substrate holding unit 903 positioned at the retreated position. Thus, the dyeing system 1 can appropriately read the identifier printed on the bottom surface of the substrate S. However, the identifier may be printed on the top surface of the substrate S. In this case, the reader 2E may be arranged above the substrate holding unit 903 positioned at the retreated position.

Further, the color information measuring device 51 described above (see FIG. 1) is arranged near the substrate holding device 90. The controller 71 causes the color information measuring device 51 to measure the color information of the lens L in a state in which the substrate S is retreated from the dyeing tray 80 by the substrate holding device 90. As described above, in the dyeing tray 80 of the present embodiment (see FIGS. 2 and 3), the light transmissive portion 82S is formed in the attachment portion 82 and the light transmissive portion 89S is formed in the loading frame 89. Thus, the color information of the lens L is appropriately measured by the color information measuring device 51 in a state in which the lens L is installed (loaded) on the dyeing tray 80 and the substrate S is removed from the dyeing tray 80.

When the fixing process executed by the dye fixing device 50 is finished, the controller 71 drives the front-rear movement unit 901 to move the substrate holding unit 903 to above the conveyance unit U conveyed to the substrate removing position. Next, the controller 71 drives the vertical movement unit 902 to move downward the substrate holding unit 903. The controller 71 stops the driving of the pump to cancel the holding of the substrate S held by the substrate holding unit 903. As a result, the substrate S removed once from the conveyance unit U is returned to the conveyance unit U. When the substrate S is returned to the conveyance unit U after the fixing process, the operator can easily compare the dyed lens L and the substrate S used for dyeing the lens L. Accordingly, the operator can appropriately check the dyeing quality, a cause in a case of low dyeing quality, and the like.

The timing of loading the substrate S again on the conveyance unit U may be after both of the fixing process executed by the dye fixing device 50 and the coating process executed by the coating device 60 (see FIG. 1) are finished. In this case, the fixing process and the coating process are easily executed in a state in which the substrate S is removed from the conveyance unit U.

Dye Fixing Device

Figure 12:
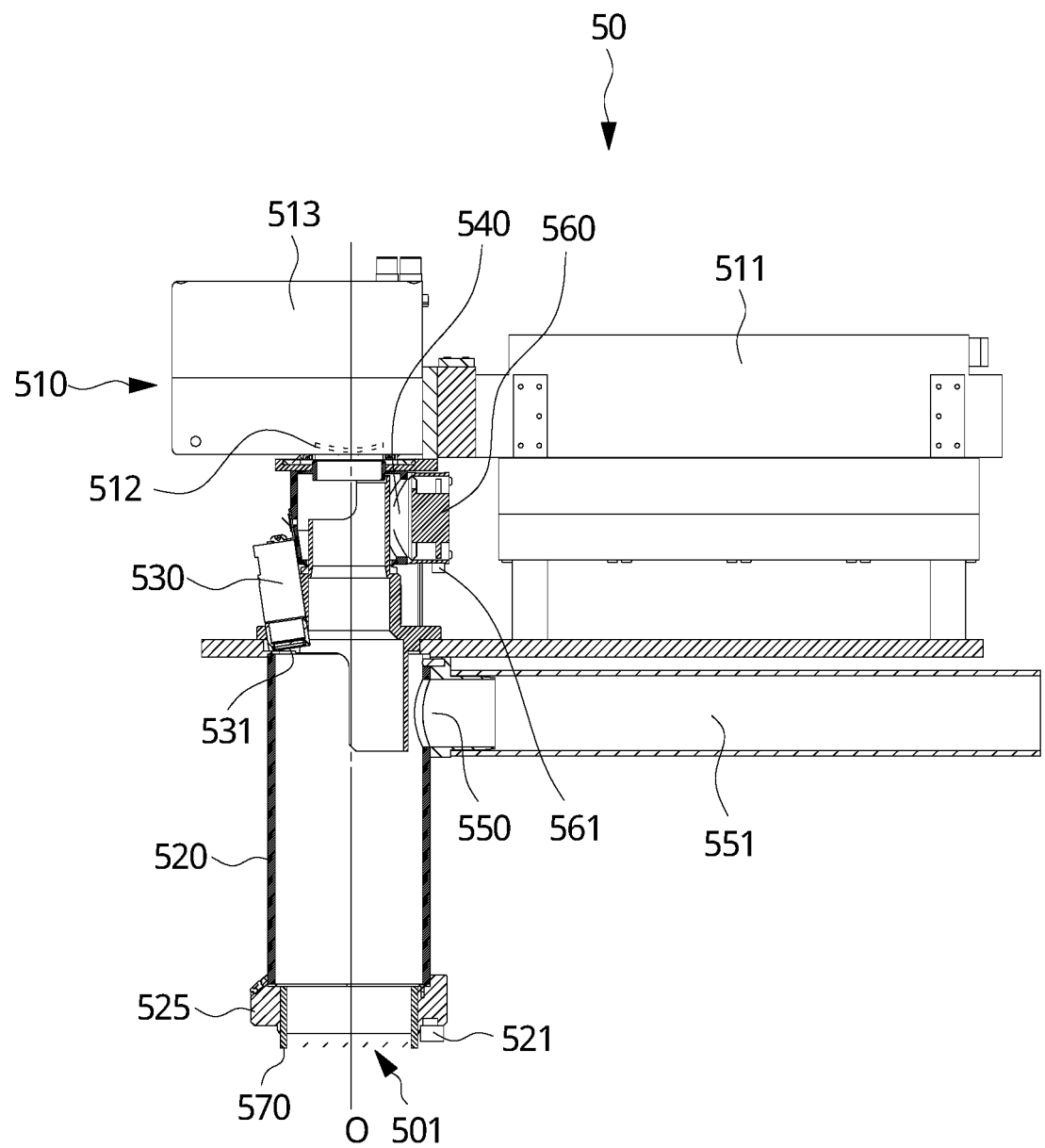
FIG. 12 is a partial cross-sectional view illustrating a dye fixing device 50 seen from a front side.

The dye fixing device 50 is described with reference to FIG. 12. The dye fixing device 50 executes the fixing process that heats the lens L and fixes the dye adhering to the surface of the lens L, on the lens L. Specifically, the dye fixing device 50 of the present embodiment irradiates the laser beam, which is an electromagnetic wave, to the lens L to heat the lens L. The dye fixing device 50 is provided with a laser beam irradiation unit 510, a laser beam interruption unit 520, a thermo camera 530, an inflow port 540, an outflow port 550, a pressure difference generation unit 560, and a radiant heat reflection unit 570.

The laser beam irradiation unit 510 is provided with a laser beam source 511, and an objective lens 512. The laser beam source 511 emits the laser beam having a wavelength that is absorbed by the material of the lens L. The laser beam emitted by the laser beam source 511 is irradiated via the objective lens 512 to the lens L installed at a fixing position 501. The laser beam source 511 of the present embodiment irradiates downward the laser beam. Thus, a downstream side of the optical path of the laser beam is a lower side of the laser beam source 511. However, the direction in which the laser beam is irradiated may be a direction other than a downward direction (for example, a lateral direction, an upward direction or an oblique direction). The upstream side and the downstream side on the optical path of the laser beam are unambiguously defined by the direction in which the laser beam is irradiated.

Further, the laser beam irradiation unit 510 is provided with a scanning unit 513. The scanning unit 513 scans the lens L with the laser beam emitted from the laser beam source 511 by relatively moving the laser beam against the lens L. The scanning unit 513 of the present embodiment is provided with a scanner that deflects an orientation of the laser beam. The laser beam emitted by the laser beam source 511 is irradiated to the lens L through the objective lens 512 after the orientation is deflected by the scanner. Specifically, the scanning unit 513 of the present embodiment is provided with an X-scanner that moves the laser beam in an X-direction crossing an optical axis of the laser beam and a Y-scanner that moves the laser beam in a Y-direction crossing both of the X-direction and the optical axis. The scanning unit 513 moves the laser beam in a two dimensional direction using the X-scanner and the Y-scanner. As one example, a galvanometer mirror is adopted as the scanner of the present embodiment (each of the X-scanner and the Y-scanner). However, a scanner other than the galvanometer mirror (for example, a polygon mirror, an acoustic optical element, and the like) may be adopted. Further, the scanning unit may be formed as a moving unit that moves a position of the lens L against the laser beam. The scanner and the moving unit may be used together as the scanning unit.

The laser beam interruption unit 520 is a cylindrical member formed of a material that interrupts the laser beam (for example, at least one of resin such as acryl, polycarbonate, polyethylene terephthalate and polyvinyl chloride, and metal). The laser beam interruption unit 520 covers at least a part of a space around the optical path (namely, around the optical axis O of the objective lens 512) extended from the objective lens 512 of the laser beam irradiation unit 510 toward the lens L installed at the fixing position 501 and interrupts leakage of the laser beam to an outside of the optical path. Accordingly, the safety is improved by the laser beam interruption unit 520. Specifically, the laser beam interruption unit 520 of the present embodiment covers a whole periphery of the optical path extended from the objective lens 512 toward the lens L. Thus, the safety is further improved. The laser beam interruption unit 512 of the present embodiment is formed in a substantially cylindrical shape. However, the shape of the laser beam interruption unit 520 is not limited to a substantially cylindrical shape.

At least a part of a portion, which is different from a resin body peripheral portion 525 that covers the periphery of the lens L installed at the fixing position 501, in the laser beam interruption unit 520 is formed by a light transmissive member (for example, a transparent acryl resin in the present embodiment) that interrupts the laser beam and transmits a visible light. With this, the operator can check a state of the lens L covered by the laser beam interruption unit 520. In the present embodiment, a whole of the body of the laser beam interruption unit 520 except the resin body peripheral portion 525 is formed by the light transmissive member. With this, the operator can check the lens L through various portions other than the resin body peripheral portion.

A lens detection sensor 521 that detects whether the lens L is arranged at the fixing position 501, is provided in the laser beam interruption unit 520. In a case in which the lens detection sensor 521 detects that the lens L is not arranged at the fixing position 501, the controller 71 executes at least one of a warning process that warns the operator that the lens L is not arranged, and a prohibiting process that prohibits the fixing process (namely, irradiation of the laser beam).

The thermo camera 530 is arranged in the cylindrical laser beam interruption unit 520. The thermo camera 530 detects a heat distribution in the lens L arranged at the fixing position 501. Specifically, the thermo camera 530 causes the electromagnetic wave generated from the lens L arranged at the fixing position 501 to be incident onto the inside thereof through an electromagnetic wave incident portion 531 so as to detect the electromagnetic wave using a detection element. The thermo camera 530 detects the heat distribution in the lens L based on the detected electromagnetic wave. The electromagnetic wave incident portion 531 includes an image forming lens (for example, a germanium lens and the like) that forms an image of the electromagnetic wave generated from the lens L, on the detection element. Further, the electromagnetic wave incident portion 531 includes a filter that interrupts a light having a wavelength of the laser beam irradiated by the laser beam irradiation unit 510. Accordingly, the detection result of the thermo camera 530 is hardly affected by the laser beam.

The controller 71 controls the scanning unit 513 based on the heat distribution in the lens L detected by the thermo camera 530. With this, the heating process of the lens L is appropriately executed based on the actual heat distribution in the lens L.

Both of the inflow port 540 and the outflow port 550 are formed in the cylindrical laser beam interruption unit 520. The inflow port 540 is formed in the laser beam interruption unit 520 at an upstream side of the optical path of the laser beam with respect to the outflow port 550. The inflow port 540 allows gas to flow from the outside to the inside of the laser beam interruption unit 520. The outflow port 550 is formed in the laser beam interruption unit 520 at a downstream side of the optical path of the laser beam with respect to the inflow port 540 (namely, a side closer to the lens L than the inflow port 540). The outflow port 550 is formed in the laser beam interruption unit 520 at the downstream side of the optical path of the laser beam with respect to the electromagnetic wave incident portion 531 of the thermo camera 530. The outflow port 530 is formed in the laser beam interruption unit 520 at the upstream side of the optical path of the laser beam with respect to the position of the lens L arranged at the fixing position 501. The outflow port 550 discharges the gas from the inside to the outside of the laser beam interruption unit 520. An exhaust pipe 551 that leads the gas to be discharged to a predetermined portion is connected to the outflow port 550. With this, the gas is appropriately discharged from the laser beam interruption unit 520.

The pressure difference generation unit 560 generates a pressure difference for sending the gas from the inflow port 540 to the outflow port 550. As one example, the pressure difference generation unit 560 of the present embodiment is formed by an inflow blower that sends the gas from the inflow port 540 to the inside of the laser beam interruption unit 520. That is, the pressure difference generation unit 560 of the present embodiment is formed in the inflow port 540. However, an outflow blower that sends the gas from the outflow port 550 to the outside of the laser beam interruption unit 520 may be formed in at least one of the outflow port 560 and the exhaust pipe 551, instead of the inflow blower or together with the inflow blower. That is, the pressure difference generation unit 560 may be formed in at least one of the passage of the gas flowing in from the inflow port 540 to the inside of the laser beam interruption unit 520 and the passage of the gas discharged from the outflow port 550 to the outside of the laser beam interruption unit 520.

A driving detection unit 561 is formed in the pressure difference generation unit 560. The driving detection unit 561 detects whether the pressure difference generation unit is driven normally. In a case in which the driving detection unit 561 detects that the pressure difference generation unit 560 is not driven normally, the controller 71 executes at least one of a warning process that warns the operator, and a prohibiting process that prohibits the heating of the lens L using the laser beam irradiation unit 510. With this, the possibility of the execution of the fixing process in a state in which the failure caused in the pressure difference generation unit 560 can be reduced.

The radiant heat reflection unit 570 that reflects the radiant heat generated from the lens L, which is a resin body, is formed at least on an inner peripheral surface of the resin body peripheral portion 525 in the laser beam interruption unit 520. Thus, at least a part of the radiant heat discharged from the lens L heated by the laser beam is reflected toward the lens L by the radiant heat reflection unit 570. As a result, the heat of the lens L (in particular, the outer peripheral portion of the lens L) is hardly dissipated to the periphery thereof, so that the temperature of the lens L is appropriately increased by the laser beam. That is, the temperature of the whole of the lens L is easily increased, and the temperature difference between the outer peripheral portion and the inside of the lens L is hardly generated by the radiant heat reflection unit 570. Consequently, the dye is easily and appropriately fixed on the lens L.

The radiant heat reflection unit 570 is formed on the whole periphery in a circumferential direction of the inner peripheral portion of the cylindrical resin body peripheral portion 525. With this, the radiant heat discharged from the lens L is easily and further efficiently reflected toward the lens L by the radiant heat reflection unit 570, compared to a configuration in which the radiant heat reflection unit is formed on a part of the periphery in the circumferential direction of the inner peripheral portion of the resin body peripheral portion 525.

As described above, at least a part of the portion in the laser beam interruption unit 520 except the resin body peripheral portion 525 in which the radiant heat reflection unit 570 is formed, is formed by the light transmissive member. Thus, according to the dye fixing device 50 of the present embodiment, the lens L is appropriately heated and the state of the lens L is easily checked.

The radiant heat reflection unit 570 is protruded downward with respect to a lower end of the inner peripheral surface of the resin body peripheral portion 525. With this, the periphery of the lens L installed at the fixing position 501 is appropriately covered by the radiant heat reflection unit 570. Consequently, the lens L is further appropriately heated.

The radiant heat reflection unit 570 is formed of metal such as aluminum and stainless steel (in the present embodiment, only aluminum or stainless steel). Aluminum or stainless steel can easily reflect the radiant heat (electromagnetic wave). Consequently, the temperature of the lens L is further appropriately increased.

The operation in the fixing process executed by the dye fixing device 50 is described. The controller 71 moves the lens L to the fixing position 501 using the second delivery unit 120 (see FIG. 6) of the conveyance device 10 and drives the pressure difference generation unit 560. The controller 71 causes the laser beam source 511 to emit the laser beam and controls the scanning unit 513 while driving the pressure difference generation unit 560. Specifically, the controller 71 acquires the parameters for the process executed to the lens L based on the information relating to the conveyance unit U read by the reader 2E (see FIG. 1). The controller 71 controls the scanning unit 513 based on the acquired parameter and the heat distribution in the lens L detected by the thermo camera 530. The parameters may include, for example, a parameter of a target temperature of the lens L. Further, in the fixing process, a degree of the temperature difference between respective portions in the lens L is different depending on the shape of the lens L. Thus, the parameters may include a parameter relating to the shape of the lens L (for example, a parameter relating to power of the lens L or the like). Further, the dye may be appropriately fixed to the lens L by setting a temperature transition of the lens L in accordance with the material of the lens L. Thus, the parameters may include a parameter relating to the material of the lens L. Further, the dye may be appropriately fixed to the lens L by setting the temperature transition of the lens L in accordance with the density of the color for dyeing the lens L. Thus, the parameters may include a parameter relating to the density of the color for dyeing the lens L. Further, the controller 71 may control the scanning unit 513 such that the temperature difference between respective portions in the lens L becomes small, based on the heat distribution in the lens L detected by the thermo camera 530.

Here, in the dye fixing device 50 of the present embodiment, the gas flows to the inside of the laser beam interruption unit 520 from the inflow port 540 to the outflow port 550. That is, the gas flows from the upstream side (upper side in the present embodiment) toward the downstream side (lower side in the present embodiment) of the optical path of the laser beam. With this, even when the dye on the surface of the lens L is heated and gasified, the dye hardly adheres to the objective lens 512 of the laser beam irradiation unit 510. Consequently, an influence caused by the adhering of the dye to the objective lens 512 is suppressed.

Further, the outflow port 550 is formed in the laser beam interruption unit 520 at the upstream side of the optical path of the laser beam with respect to the position of the lens L arranged at the fixing position 501. With this, the gas that flows into the inside of the laser beam interruption unit 520 from the inflow port 540 hardly reaches the lens L that is being heated. Thus, it is suppressed that the lens L to be heated is cooled by the gas that flows into the inside of the laser beam interruption unit 520. Consequently, deterioration of the heating efficiency is suppressed.

Further, the outflow port 550 is formed in the laser beam interruption unit 520 at the downstream side of the optical path of the laser beam with respect to the electromagnetic wave incident portion 531 of the thermo camera 530. With this, even when the dye on the surface of the lens L is heated and gasified, the dye hardly adheres to the electromagnetic wave incident portion 531 of the thermo camera 530. Consequently, deterioration of the performance of the thermo camera 530 is also appropriately suppressed.

The position of each of the inflow port 540 and the outflow port 550 may be changed. For example, the inflow port and the outflow port may be formed in the laser beam interruption unit 520 between the objective lens 512 of the laser beam irradiation unit 510 and the position of the lens L arranged at the fixing position 501 so as to face each other to interpose the optical path of the laser beam therebetween. With this, even when the gasified dye moves from the lens L toward the objective lens 512, the gasified dye is apt to flow toward the outflow port before reaching the objective lens 512.

When the heating process of the lens L using the laser beam is finished, the controller 71 causes the second delivery unit 120 of the conveyance unit 10 (see FIG. 6) to return the lens L to the conveyance path. The controller 71 determines whether the lens L for which the heating process is necessary is loaded on the dyeing tray 80 (see FIGS. 2 and 3), other than the lens L for which the heating process is finished, based on the parameter. In a case in which the lens L for which the heating process is necessary is not loaded on the dyeing tray 80, the controller 71 finishes the fixing process to the lens L in the conveyance unit U and conveys the conveyance unit U to the downstream side (the substrate holding device 90 in the present embodiment). While, in a case in which the lens L for which the heating process is necessary is loaded on the dyeing tray 80, the controller 71 drives the resin body switching unit 123 of the second delivery unit 120 to switch the lens L t to be arranged at the fixing position 501. Thereafter, the controller 71 heats the lens L arranged at the fixing position 501 and conveys the conveyance unit U to the downstream side.

In the dyeing system 1 of the present embodiment, an optical sensor (not shown) is provided at the upstream side of the transfer device 40 and the upstream side of the dye fixing device 50 in the conveyance path of the conveyance device 10. The optical sensor emits a light passing both of the light transmissive positions 82S forming a pair formed in the attachment portion 82 of the dyeing tray 80, and thereby the optical sensor determines whether at least one of the lens L, the loading frame 89, and the spacer 87 (in the present embodiment, the spacer 87) is installed in the dyeing tray 80. With this, the controller 71 can appropriately recognize whether the space 87 is attached to each of the attachment portions 82 forming a pair in the dyeing tray 80 (namely, whether the lens L is installed).

First Dyeing Control Process

A first dyeing control process executed by the controller 71 of the dyeing system 1 is described with reference to FIG. 13. The first dyeing control process is executed in a case in which the identifier is formed in the dyeing tray 80 (in the present embodiment, the tray body 81). That is, in the first dyeing control process, the information of the identifier formed in the conveyance unit U is read and the parameter corresponding to the read information is acquired. The operation of the dyeing process executed by the dye fixing device 50 or the like is controlled based on the acquired parameter. When the dyeing process is executed to the lens L loaded on each of the conveyance units U, the controller 71 executes the first dyeing control process exemplarily shown in FIG. 13, based on a dyeing control program stored in a storage device.

At first, the controller 71 determines whether the process information that indicates the process contents executed to the lens L is acquired (S1). The process information is, for example, input into the controller 71 by the operator operating an operation unit (not shown) or made by other device. In the first dyeing control process, the process information acquired in S1 includes at least one of the information that indicates presence/absence of the gradation dyeing and the direction thereof, the information of the number of the lenses L (one or two) included in one single conveyance unit U, the information of the color for dyeing the lens L (namely, the color of the dye to be printed on the substrate S), the information of the density of the dyeing color, the information of the material of the lens L, and the information relating to the coating applied to the lens L. Further, the process information acquired in S1 may include the information relating to the shape of the lens L. The shape of the lens L (a curve value, a thickness, or the like) affects the optical characteristic of the lens L (for example, spherical power or the like). Thus, the information relating to the shape of the lens L may include the information relating to the curve value and the thickness of the lens L, and the optical characteristic of the lens L. In a case in which the information relating to the shape of the lens L is acquired in S1, the process of S6 described below may be omitted. Further, the optical characteristic of the lens L is different depending on the material of the lens L. Thus, the information of the material of the lens L may be acquired based on the optical characteristic of the lens L measured by the optical characteristic measuring device 21. Further, the information relating to the shape of the lens L may include at least one of a diameter, an outer shape, and the like of the lens L. In a case in which the process information is not acquired (S1: NO), the process proceeds to S4.

While, in a case in which the process information with respect to the lens L is acquired (S1: YES), an identifier 88 of the conveyance unit U on which the target lens L of the process information is to be loaded is read by the reader 2A (S2). The controller 71 causes the database 72 to store the parameter that indicates the process contents associated with the identifier read in S2, based on the process information acquired in S1 (S3). The parameter to be stored in S3 includes at least one of a parameter of gradation that indicates the presence/absence of the gradation dyeing and the direction thereof, a parameter of the number of lenses that indicates the number of lenses L included in one single conveyance unit U, a parameter of color that indicates the color for dyeing the lens L (namely, the color of the dye to be printed on the substrate S), a parameter of density that indicates the color for dyeing the lens L (namely, the density of the color of the dye to be printed on the substrate S), a parameter of material that indicates the material of the lens L, and a parameter of coating that indicates the contents of coating applied to the lens L. Further, in a case in which the information relating to the shape of the lens L has been acquired in S1, a parameter of shape that indicates the shape of the lens L may be stored in S3.

Next, it is determined whether the conveyance unit U is conveyed to the preparation unit 20 (S4). In a case in which the conveyance unit U is not conveyed to the preparation unit 20 (S4: NO), the process proceeds to S8. While, in a case in which the conveyance unit U is conveyed to the preparation unit 20 (S4: YES), the identifier 88 of the conveyance unit U conveyed to the preparation unit 20 is read by the reader 2B in S5. Further, the parameter (in S5, at least the parameter of gradation) corresponding to the read identifier 88 is acquired from the database 72 (S5). And then, the controller 71 acquires the parameter of shape of the lens L based on the optical characteristic of the lens L measured by the optical characteristic measuring device 21, and causes the database 72 to store the parameter of shape associated with the identifier read in S5 (S6). The controller 71 controls the rotation driving of the rotation device 22 for the lens L, based on the parameter of gradation corresponding to the identifier read in S5 and the orientation of the lens L measured by the optical characteristic measuring device 21 (S7). That is, in a case in which the gradation dyeing is executed and the lens L is asymmetry with respect to the geometric center axis as a center, the controller 71 rotates the lens L to match the orientation of the lens L with the orientation of the dye to be printed on the substrate S. In a case in which the lens L is symmetry with respect to the geometric center axis as a center, the process of S7 may be omitted.

The dyeing system 1 may define the angle in the rotation direction of a region of the dye to be printed by the printing device 30 described below, based on the measured orientation of the lens L instead of rotating the lens L, which is a resin body, using the rotation device 22. Also in this case, the gradation dyeing is appropriately executed to the resin body. Further, the controller 71 may acquire the parameter of the optical characteristic of the lens L in S5. In a case in which the optical characteristic measured by the optical characteristic measuring device 21 is different from the optical characteristic acquired in S5, the controller 71 may execute at least one of a warning process that warns the operator, and an aborting process that aborts the dyeing process to the lens L. With this, the possibility that the lens L, which is not the target lens L to be dyed, is erroneously dyed is reduced.

Next, it is determined whether the conveyance unit U is conveyed to the printing device 30 (S8). In a case in which the conveyance unit U is not conveyed to the printing device 30 (S8: NO), the process proceeds to S11. While, in a case in which the conveyance unit U is conveyed to the printing device 30 (S8: YES), the identifier 88 of the conveyance unit U conveyed to the printing device 30 is read by the reader 2C in S9. Further, the parameter corresponding to the read identifier 88 (in S9, at least one of the parameter of gradation, the parameter of the number of lenses, the parameter of color, the parameter of density, the parameter of material, and the parameter of shape (the parameter of optical characteristic may be included)) is acquired from the database 72. The controller 71 controls the printing device 30 based on the parameter acquired in S9 to execute the printing operation of the dye to the substrate S (S10). For example, the controller 71 may cause the printing device 30 to print the dye with the color indicated by the parameter of color, in a density indicated by the parameter of density according to the presence/absence of the gradation indicated by the parameter of gradation. Further, the controller 71 may cause the printing device 30 to print the dye to form circular dye regions of which the number thereof is equal to the number of the lenses indicated by the parameter of the number of lenses. The controller 71 may cause the printing device 30 to print the dye with the discharge amount in accordance with the material of the substrate of the lens L.

Next, it is determined whether the conveyance unit U is conveyed to the transfer device 40 (S11). In a case in which the conveyance unit U is not conveyed to the transfer device 40 (S11: NO), the process proceeds to S13. While, in a case in which the conveyance unit U is conveyed to the transfer device 40 (S11: YES), the controller 71 causes the transfer device 40 to execute the transfer process in accordance with the number of the lenses L loaded on the conveyance unit U (the position of the lens L in a case in which the number of the lenses L is one) (S12). Specifically, the identifier 88 of the conveyance unit U conveyed to the transfer device 40 is read by the reader 2D of the transfer device 40 in S12. Further, the parameter corresponding to the read identifier 88 (in S12, at least the parameter of the number of lenses) is acquired from the database 72. The controller 71 controls the transfer device 40 based on the acquired parameter.

Next, it is determined whether the conveyance unit U is conveyed to the dye fixing device 50 (S13). In a case in which the conveyance unit U is not conveyed to the dye fixing device 50 (S13: NO), the process proceeds to S16. While, in a case in which the conveyance unit U is conveyed to the dye fixing device 50 (S13: YES), the identifier 88 of the conveyance unit U conveyed to the dye fixing device 50 is read by the reader 2E in S14. Further, the parameter corresponding to the read identifier 88 (in S14, at least one of the parameter of gradation, the parameter of the number of lenses, the parameter of color, the parameter of density, the parameter of material, and the parameter of shape (at least one of the parameter of optical characteristic and the parameter of lens diameter may be included)) is acquired from the database 72. The controller 71 controls the dye fixing device 50 based on the acquired parameter (S15).

Specifically, the controller 71 restricts the temperature of a portion in the lens L with a light color (a portion with high luminous transmittance) to be lower than the temperature of a portion in the lens L with a deep color, based on the parameter of gradation. As a result, it can be suppressed that the temperature of the portion with a light color is excessively increased and thereby the substrate is discolored. Further, the controller 71 causes the dye fixing device 50 to execute the fixing process to the lenses L according to the parameter of the number of lenses. Further, the controller 71 sets a target temperature of the lens L based on the parameter of color and increases the temperature of the lens L to an appropriate temperature according to the dyeing color. Further, the controller 71 controls the temperature transition of the lens L in accordance with the parameter of material so as to fix the dye on the lens L by the method suitable to the material of the lens L. Specifically, the controller 71 controls at least one of the time for increasing the temperature of the lens L to the target temperature, an increase rate of the temperature, a time for sustaining the temperature of the lens L at the target temperature and the like, in accordance with the material of the lens L. Further, the controller 71 controls the scanning unit 513 based on the parameter of shape so as to suppress a temperature difference between portions in the lens L caused by the shape of the lens L, to be excessively large. Specifically, the controller 71 of the present embodiment changes the scanning speed of the lens L with the laser beam depending on the portion in the lens L in a state in which the output power of the laser beam is set uniform, so that the energy applied to each portion in the lens L is adjusted. The energy per each time unit applied to the portion is larger when the scanning speed is low than when the scanning speed is high. When the uniform energy of the laser beam is applied to each portion, in the lens L, the temperature in the portion of which the thickness is small is apt to be increased, compared to the portion of which the thickness is large. Further, the heat is easily discharged from the peripheral portion in the lens L compared to the center portion in the lens L, and thereby the temperature of the peripheral portion is hard to be increased compared to the center portion. Thus, the controller 71 moves the laser beam at the appropriate scanning speed depending on the thickness and the portion in the lens L, based on the parameter of shape of the lens L, so that the temperature difference between the portions in the lens L is suppressed to be excessively large.

Next, it is determined whether the conveyance unit U is conveyed to the coating device 60 (S16). In a case in which the conveyance unit U is not conveyed to the coating device 60 (S16: NO), the process returns to S1. While, in a case in which the conveyance unit U is conveyed to the coating device 60 (S16: YES), the identifier 88 of the conveyance unit U conveyed to the coating device 60 is read by the reader 2F in S17. Further, the parameter corresponding to the read identifier 88 (in S17, at least the parameter of coating) is acquired from the database 72. The controller 71 controls the coating device 60 based on the acquired parameter (S18). Thereafter, the process returns to S1.

Second Dyeing Control Process

A second dyeing control process executed by the controller 71 of the dyeing system 1 is described with reference to FIG. 14. In the second dyeing control process, the controller 71 controls the printing device 30 to print the dye on the substrate S together with the identifier. That is, in a case in which the second dyeing control process is executed, the identifier is not formed in the dyeing tray 80 but formed in the substrate S. This configuration is different from the first dyeing control process. A part of the process in the second dyeing control process may adopt a similar process in the first dyeing control process described above (see FIG. 13). Accordingly, the same process number is assigned to a process in the second dyeing control process that can adopt a similar process in the first dyeing control process, and therefore the description thereof is omitted or simplified. Further, in a case in which the second dyeing control process is executed, at least the readers 2A to 2C among the readers 2 installed in the dyeing system 1 (see FIG. 1) may be omitted.

At first, the controller 71 determines whether the process information that indicates the process contents executed to the lens L is acquired (S1). In a case in which the process information is not acquired (S1: NO), the process proceeds to S11. While, in a case in which the process information with respect to the lens L is acquired (S1: YES), the controller 71 defines the identifier to be associated with the lens L for which the process information is acquired (S21). Next, the controller 71 conveys the conveyance unit U including the lens L for which the process information is acquired, to the preparation unit 20 (S22). The controller 71 acquires the parameter of shape of the lens L based on the optical characteristic of the lens L measured by the optical characteristic measuring device 21, and causes the database 72 to store the parameter of shape associated with the identifier defined in S21 (S6). In a case in which the information relating the shape of the lens L has been acquired in S1, the process of S6 may be omitted. The controller 71 controls the rotation driving of the rotation device 22 for the lens L, based on the parameter of gradation corresponding to the process information of gradation acquired in S1 and the orientation of the lens L measured by the optical characteristic measuring device 21 (S7).

Next, the controller 71 conveys the conveyance unit U including the lens L for which the process information is acquired, to the printing device 30 (S23). The controller 71 controls the printing device 30 based on the parameter corresponding to the process information acquired in S1 (at least one of the parameter of gradation, the parameter of the number of lenses, the parameter of color, the parameter of density, the parameter of material, and the parameter of shape (the parameter of optical characteristic may be included)) so as to print the dye on the substrate S (S10). Further, the controller 71 controls the printing device 30 to print the dye on the substrate S together with the identifier defined in S21 (S24). Further, the controller 71 controls the printing device 30 to print at least one of letters and symbols that indicate the process contents to be executed to the lens L, on the substrate S (S25). Thus, the operator can easily check the process contents (to be) executed to the lens L through at least one of the letters and the symbols printed on the substrate S.

In a case in which the conveyance unit U is conveyed to the transfer device 40 (S11: YES), the controller 71 causes the transfer device 40 to execute the transfer process in accordance with the number of the lenses L loaded on the conveyance unit U (the position of the lens L in a case in which the number of the lenses L is one) (S12). Specifically, in S12, the identifier printed on the substrate S in the conveyance unit U is read by the reader 2D of the transfer device 40. The parameter corresponding to the read identifier (in S12, at least the parameter of the number of lenses) is acquired from the database 72. The controller 71 controls the transfer device 40 based on the acquired parameter.

In a case in which the conveyance unit U is conveyed to the dye fixing device 50 (S13: YES), the identifier printed on the substrate S is read by the reader 2E, and the parameter corresponding to the read identifier is acquired (S14). The controller 71 controls the dye fixing device 50 based on the acquired parameter.

In a case in which the conveyance unit U is conveyed to the coating device 60 (S16: YES), the identifier printed on the substrate S is read by the reader 2F, and the parameter corresponding to the read identifier is acquired (S17). The controller 71 controls the coating device 60 based on the acquired parameter (S18). Thereafter, the process returns to S1.

Third Dyeing Control Process

A third dyeing control process executed by the controller 71 of the dyeing system 1 is described with reference to FIG. 15. In the third dyeing control process, the controller 71 controls each device based on the parameter read by the tag reader 2. That is, in a case in which the third dyeing control process is executed, the parameter is stored in the tag of the conveyance unit U. This configuration is different from the first and second dyeing control processes. A part of the process in the third dyeing control process may adopt a similar process in the first dyeing control process described above (see FIG. 13). Accordingly, the same process number is assigned to a process in the third dyeing control process that can adopt a similar process in the first dyeing control process, and therefore the description thereof is omitted or simplified. Further, in a case in which the third dyeing control process is executed, at least one of the readers (in the present embodiment, the readers 2B to 2F) among the readers 2 installed in the dyeing system 1 (see FIG. 1) includes a tag reader that reads the information from the tag. Further, in a case in which the third dyeing control process is executed, the reader 2A shown in FIG. 1 is changed to a tag writer 2A that writes the information into the tag. Further, in the embodiment described below, the reader 2B shown in FIG. 1 is changed to a tag reader-writer 2B that can read the information from the tag and write the information into the tag. The tag is installed in the member included in the conveyance unit U (for example, the tray body 81 of the dyeing tray 80 or the like).

At first, the controller 71 determines whether the process information that indicates the process contents executed to the lens L is acquired (S1). In a case in which the process information is not acquired (S1: NO), the process proceeds to S4. While, in a case in which the process information with respect to the lens L is acquired (S1: YES), the controller 71 causes the tag writer 2A to write the parameter included in the process information acquired in S1, into the tag of the conveyance unit U for which the process information is acquired (S31).

In a case in which the conveyance unit U is conveyed to the preparation unit 20 (S4: YES), the information is read from the tag of the conveyance unit U by the tag reader-writer 2B (S32). The controller 71 acquires the parameter of shape of the lens L based on the optical characteristic of the lens L measured by the optical characteristic measuring device 21, and causes the tag reader-writer 2B to writer the parameter into the tag (S33). In a case in which the information relating to the shape of the lens L has been acquired in S1, the process of S33 may be omitted. The controller 71 controls the rotation driving of the rotation device 22 for the lens L, based on the parameter of gradation included in the information read in S32 and the orientation of the lens L measured by the optical characteristic measuring device 21 (S7).

In a case in which the conveyance unit U is conveyed to the printing device 30 (S8: YES), the information is read from the tag of the conveyance unit U by the reader 2C (S34). The controller 71 controls the printing device 30 based on the parameter included in the information read in S34 so as to print the dye on the substrate S (S10).

In a case in which the conveyance unit U is conveyed to the transfer device 40 (S11: YES), the controller 71 causes the transfer device 40 to execute the transfer process in accordance with the number of the lenses L loaded on the conveyance unit U (the position of the lens L in a case in which the number of the lenses L is one) (S12). Specifically, in S12, the information written into the tag of the conveyance unit U is read by the reader 2D of the transfer device 40. The transfer device 40 is controlled based on the parameter included in the read information (in S12, at least the parameter of the number of lenses).

In a case in which the conveyance unit U is conveyed to the dye fixing device 50 (S13: YES), the information is read from the tag of the conveyance unit U by the reader 2E (S35). The controller 71 controls the dye fixing device 50 based on the parameter included in the information read in S35.

In a case in which the conveyance unit U is conveyed to the coating device 60 (S16: YES), the information is read from the tag of the conveyance unit U by the reader 2F (S36). The controller 71 controls the coating device 60 based on the parameter included in the information read in S36 (S18).

Discharge Amount Maintenance Process

A discharge amount maintenance process executed by the controller 71 of the dyeing system 1 is described with reference to FIG. 16. In the discharge amount maintenance process, the discharge amount of the dye to be discharged (printed) to the substrate S by the printing device 30 is corrected such that the lens L is appropriately dyed in the planned color (including the density of the color). The operator can input the instructions for executing the discharge amount maintenance process into the dyeing system 1. The operator may input the instructions for executing the discharge amount maintenance process, for example, when the dyeing system 1 is delivered from a manufacture to a customer, when the dyeing system 1 is activated for the first time, when the dyeing system 1 is in maintenance, or when the dyeing quality of the lens L is deteriorated. In a case in which the instructions for executing the discharge amount maintenance process is input, the controller 71 executes the discharge amount maintenance process exemplarily shown in FIG. 16, in accordance with the discharge amount maintenance program stored in the storage device.

At first, the controller 71 acquires the information of a kind of the base material of the lens L to be dyed (S40). The dyed color (for example, the density of the color or the like) is difference depending on the kind of the base material of the lens L even when the discharge amount of the dye is the same. Accordingly, the controller 71 executes the processes of S42 to S52 described below for each kind of the base material acquired in S40. As a result, the discharge amount of the dye necessary for appropriately dyeing the each base material is defined in accordance with the base material.

Next, the controller 71 specifies a target dye of which the discharge amount is to be corrected, among the dyes (for example, dyes of Red, Yellow, and Blue in the present embodiment) to be discharged (printed) by the printing device 30 (S41).

Next, the controller 71 defines the planned color for dyeing the lens L in a color having a planned density dyed by the dye specified in S41 (S42). The color information of the planned color may be represented by hue, brightness (or density), and saturation. In the present embodiment, a spectral transmittance data is used as the color information that specifies the color of the lens L including the planned color. For example, an L*a*b* color space may be adopted as the color information. Further, a luminous transmittance (Y value) may be adopted as the color information. L* denotes brightness, a* and b* denote chromaticity (hue and saturation). Further, the luminous transmittance (Y value) denotes a rate of the visible light transmitted by the lens L. However, other color system may be adopted as the color information of the lens L.

Next, the controller 71 defines the discharge amount of the specific dye to be discharged (printed) by the printing device 30 for dyeing the lens L in the planned color defined in S42, based on the defining procedure (S43). As one example, in the present embodiment, the information of the discharge amount of each dye (base color information) for dyeing the resin body by each dye (for example, dye of Red, Yellow, and Blue) in the planned density is stored in advance in the storage device (for example, the database 72 or the like). The controller 71 calculates the discharge amount of each dye (in S43, the discharge amount of the specific dye) for dyeing the lens L in the planned color, based on the base color information so as to define the discharge amount. That is, in the present embodiment, a procedure that calculates the discharge amount of each dye based on the base color information and the planned color is adopted as the defining procedure (algorithm) for defining the discharge amount. As described above, the defining procedure for defining the discharge amount is defined for each kind of the base material of the lens L to be dyed.

However, the defining procedure for defining the discharge amount of each dye may be changed. For example, a table that associates the color information of the planned color with the discharge amount of each dye necessary for dyeing the lens L in the planned color may be stored in advance in the storage device (for example, the database 72 or the like). The controller 71 may acquire the discharge amount of each dye associated with the planned color from the table so as to define the discharge amount of the dye. That is, the table that associates the planned color with the discharge amount may be used as the defining procedure (algorithm) for defining the discharge amount.

Next, the controller 71 outputs the instructions, to the printing device 30, for discharging (printing) the specific dye at the discharge amount defined in S43 to the substrate S (S44). After the printing is finished, the controller 71 conveys the conveyance unit U to the transfer device 40 to cause the transfer device 40 to execute the transfer process (S45). After the transfer process is finished, the controller 71 conveys the conveyance unit U to the dye fixing device 50 to cause the dye fixing device 50 to execute the fixing process (S46). The fixing control process in S46 may adopt the similar process in S15 (see FIGS. 13 to 15).

Next, the controller 71 acquires the color information (result color information), which is measured by the color information measuring device 51 (see FIG. 1), of the lens L actually dyed by the printing device 30, the transfer device 40, and the dye fixing device 50 (S47). As one example, in the present embodiment, the spectral transmittance data (specifically, the L*a*b* color space and luminous transmittance (Y value)) is used as the result color information as described above.

Here, the color information measuring device 51 of the present embodiment is provided with several light sources different in type from each other (for example, two or more light sources among a standard light source (a CIE standard light source D65 or the like as one example thereof), a white light source, a light source that emits a light similar to a solar light, and the like). The color information measuring device 51 acquires the result color information of the lens L using the light source designated by the operator. Consequently, the color information of the result color of the lens L is appropriately acquired using the light desired by the operator.

Next, the controller 71 corrects the discharge amount of the specified dye discharged from the printing device 30 (as one example, the defining procedure of the discharge amount in the present embodiment), based on a result of a comparing process between the result color information acquired in S47 and the color information of the planned color defined in S42 such that the color of the lens L to be dyed in the later dyeing process is close to the planned color (S49). In the present embodiment, the comparing process calculates the difference between the result color information and the color information of the planned color. However, the comparing process may calculate a ratio of the result color information to the color information of the planned color. In S49 of the present embodiment, the defining procedure for defining the discharge amount of the specified dye is corrected based on the difference between the density of the color indicated by the result color information and the density of the color indicated by the color information of the planned color. Specifically, in a case in which the calculation based on the base color information and the color information of the planned color is adopted as the defining procedure (algorithm) for defining the discharge amount, the calculation procedure is corrected based on the difference of the color information. Further, in a case in which the table that associates the planned color and the discharge amount is adopted as the defining procedure (algorithm) for defining the discharge amount, the associating in the table is corrected. A specific method for correcting the defining procedure may be selected as needed. For example, a correction amount for the defining procedure may be defined in advance, based on the difference between the result color information and the color information of the planned color or the ratio of the result color information to the color information of the planned color. The correction amount for the defining procedure may be acquired by inputting the difference between the result color information and the color information of the planned color or the ratio of the result color information to the color information of the planned color, into a mathematical model trained by a machine learning algorithm. As described above, the correction process exemplarily described in S49 is executed in accordance with the kind of the base material of the lens L.

Next, the controller 71 determines whether the processes of S42 to S49 are completed for all dyes that can be discharged (printed) by the printing device 30 (S51). In a case in which the processes of S42 to S49 are not completed for all dyes (S51: NO), the dye for which the processes are not completed among the dyes is specified (S52), and then the processes of the S42 to S49 are repeated. As a result, the discharge amounts for all dyes are appropriately corrected. With this, the resin body is appropriately dyed in the color represented by a combination of several dyes. In a case in which the processes of S42 to S49 are completed for all dyes (S51: YES), the discharge amount maintenance process is finished.

Figure 16:
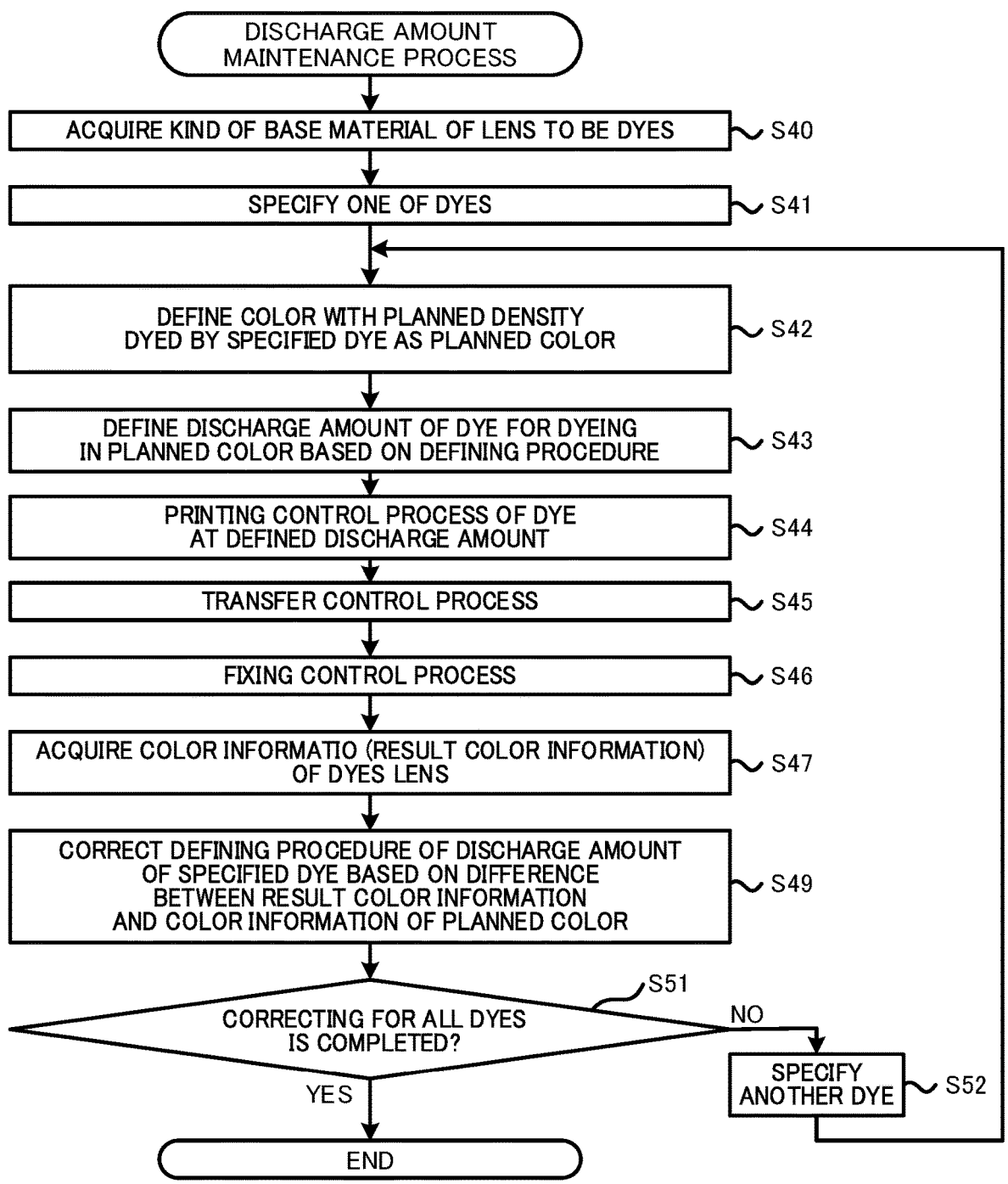
FIG. 16 is a flowchart illustrating one example of a discharge amount maintenance process executed by the controller 71.

In the discharge amount maintenance process exemplarily shown in FIG. 16, the discharge amount (in the present embodiment, the defining procedure of discharge amount) is corrected for all dyes (in the present embodiment, the dyes of Red, Yellow, and Blue). However, the discharge amount may be corrected only for a certain dye among the dyes. Further, in the discharge amount maintenance process exemplarily shown in FIG. 16, the discharge amount is corrected for each dye. However, in S42, the planned color using several dyes may be defined. In S43, the discharge amounts of all dyes for dyeing the lens L in the planned color may be defined. In S44, several dyes may be printed on the substrate S. In S49, the discharge amount of each dye may be corrected based on the result color information and the color information of the planned color. Further, in S49, the discharge amount of each dye may be corrected based on the value of the transmittance of a wavelength of a maximum absorption peak of each dye acquired from the spectral transmittance data served as the result color information. In this case, when the processes S42 to S49 are executed once, the discharge amounts of all dyes are appropriately corrected. In the present embodiment, a spectroscopic measuring device that measures the spectrum of the lens L is adopted as the color information measuring device 51. Thus, even in a case in which the lens L is dyed by several dyes, the discharge amounts of all dyes are appropriately corrected.

Dyeing Quality Determination Process

A dyeing quality determination process executed by the controller 71 of the dyeing system 1 is described with reference to FIG. 17. In the dyeing quality determination process, it is determined whether a difference between the result color of the lens L actually dyed and the planned color exceeds a tolerable range (namely, whether the quality of the dyeing is inferior), and then a process in accordance with the determination result is executed.

The dyeing quality determination process may be executed within each of the first to third dyeing control processes (see FIGS. 13 to 15) described above. That is, the dyeing quality determination process can also execute the process using the identifier or the tag, the process executed by the preparation unit 20, and the process executed by the coating device 60 described with reference to FIGS. 13 to 15. However, in order to simplify the description of the dyeing quality determination process, the description of the process using the identifier or the tag, or the like is omitted. A part of the process in the dyeing quality determination process (for example, the processes of S44 to S47) may adopt a similar process in the discharge amount maintenance process (see FIG. 16) described above. Accordingly, the same process number is assigned to a process in the dyeing quality determination process that can adopt a similar process in the discharge amount maintenance process, and therefore the description thereof is omitted or simplified. When the dyeing process is executed to the lens L loaded on each conveyance unit U, the controller 71 executes the dyeing quality determination process exemplarily shown in FIG. 17, in accordance with the dyeing control program stored in the storage device.

At first, the controller 71 acquires the information of the kind of the base material of the lens L to be dyed (S40). The processes of S61 to S66 described below are executed for each kind of the base material acquired in S40. Next, the controller 71 acquires the information of the planned color (color information) for dyeing the lens L (S61). As described above, the controller 71 may acquire the parameter of color associated with the identifier 88 or the parameter of color read from the tag, as the information of the planned color.

The controller 71 defines the discharge amount of each dye for dyeing the lens L in the planned color of which the color information is acquired in S61 (S62). The defining procedure for defining the discharge amount of each dye may adopt a similar procedure described above in S42 (see FIG. 16). The process of S62 is executed in accordance with the kind of the base material of the lens L.

The controller 71 outputs the instructions to the printing device 30 for discharging (printing) each dye at the discharge mount defined in S62 onto the substrate S (S44). When the printing is completed, the controller 71 conveys the conveyance unit U to the transfer device 40 to execute the transfer process (S45). When the transfer process is completed, the controller 71 conveys the conveyance unit U to the dye fixing device 50 to execute the transfer process (S46). And then, the controller 71 acquires the color information (result color information) measured by the color information measuring device 51 (see FIG. 1) for the lens L actually dyed by the printing device 30, the transfer device 40, and the dye fixing device 50 (S47).

Next, the controller determines whether the difference between the result color information and the color information of the planned color acquired in S61 exceeds the tolerable range (threshold) (S62). The threshold may be set as needed in accordance with the desired dyeing quality or the like. In a case in which the difference between the result color information and the color information of the planned color is equal to or less than the threshold (S62: NO), the dyeing quality is in the tolerable range and therefore the process is finished.

In a case in which the difference between the result color information and the color information of the planned color exceeds the threshold (S62: YES), a quality inferior notification process is executed (S63). In the quality inferior notification process, the notification that the dyeing quality of the lens L is inferior is provided to the operator. The method for providing the notification that the dyeing quality is inferior may be selected as needed. For example, a method for displaying a message on a display, a method for providing the notification via voice, or a method for providing the notification using a warning lamp, may be adopted.

Next, the controller 71 determines whether a discharge amount correction mode is selected by the operator (S65). In the present embodiment, when the dyeing process is executed by the dyeing system 1, the operator can select the discharge amount correction mode or a quality inferior determination mode. In the discharge amount correction mode, when the dyeing quality is inferior, the discharge amount of each dye is corrected. In the quality inferior determination mode, when the dyeing quality is inferior, the notification that the quality is inferior is merely provided to the operator.

In a case in which the discharge amount correction mode is not selected and the quality inferior determination mode is selected (S65: NO), the process is finished. While, in a case in which the discharge amount correction mode is selected (S65: YES), the controller 71 corrects the discharge amount of each dye discharged from the printing device 30 (in the present embodiment, the defining procedure for defining the discharge amount), based on the result color information acquired in S47 and the color information of the planned color acquired in S61 such that the color of the lens L to be dyed in the later dyeing process is close to the planned color (S66). In S66 of the present embodiment, the defining procedure for defining the discharge amount of each dye is corrected for each kind of the base material of the lens L, based on the difference between the density of the color indicated by the result color information and the density of the color indicated by the color information of the planned color. Specifically, in a case in which the calculation based on the base color information and the color information of the planned color is adopted as the defining procedure (algorithm) for defining the discharge amount, the calculation procedure is corrected based on the difference of the color information. While, in a case in which the table that associates the planned color and the discharge amount is adopted as the defining procedure (algorithm) for defining the discharge amount, the associating in the table is corrected.

In a case in which the discharge amount correction mode is always selected, the correction process in S66 is repeatedly executed every time the dyeing process is executed to the lens L. That is, a feedback control that corrects the discharge amount of the dye in accordance with the result color information is executed every time the dyeing process is executed.

The technique described in the above embodiments describes merely an example. Thus, the technique described in the above embodiments may be changed. For example, only a part of the techniques exemplarily described in the above embodiments may be adopted. As one example, in each of the first to third dyeing control processes exemplarily described in the above embodiments, many parameters for the processes executed to the lens L are acquired, and then the dyeing system 1 is controlled based on the many parameters. However, only a part of the many parameters exemplarily described in the above embodiments may be used for executing a part of the processes executed by the dyeing system 1.

Figure 13:
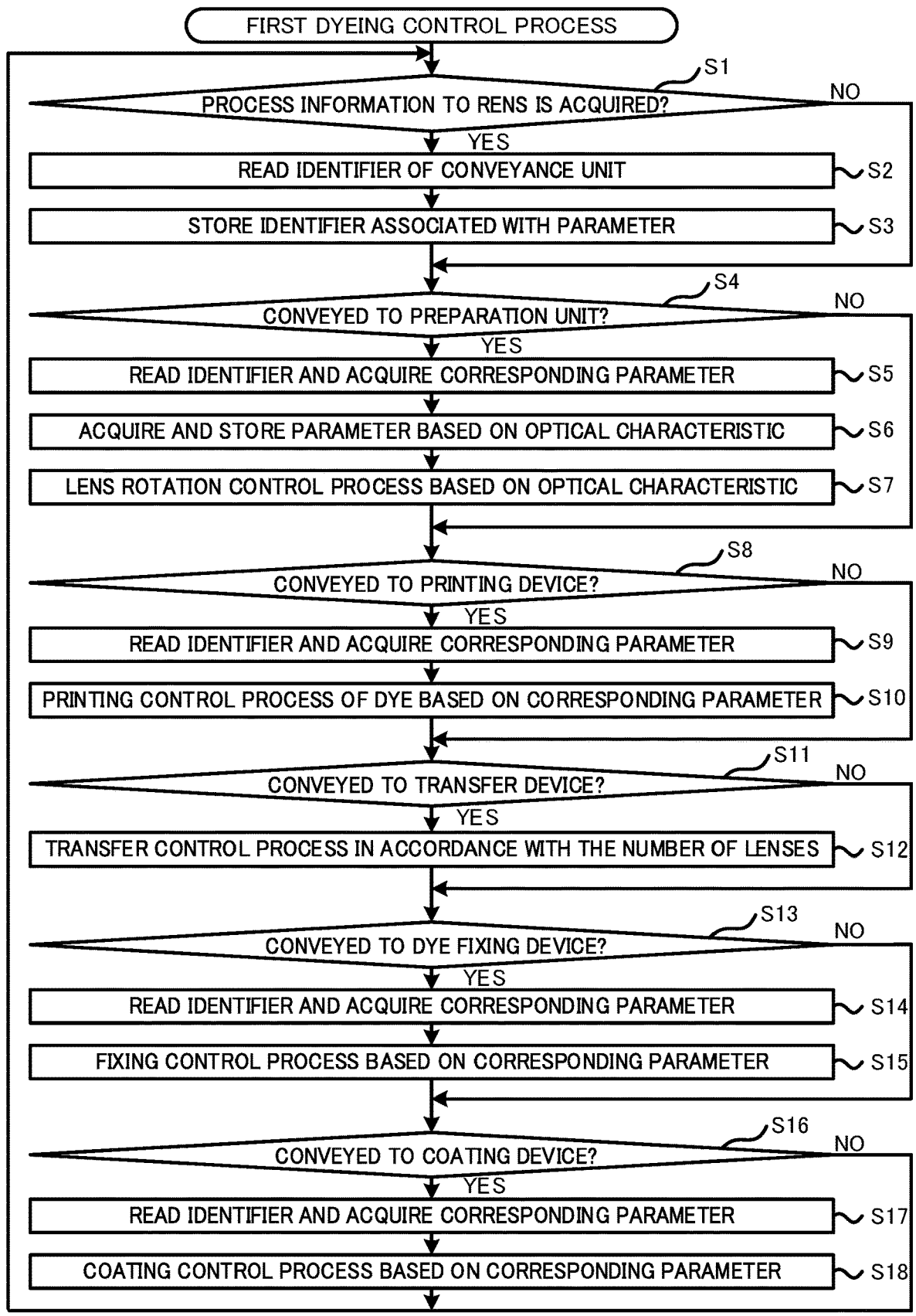
FIG. 13 is a flowchart illustrating one example of a first dyeing control process executed by a controller 71.
Figure 14:
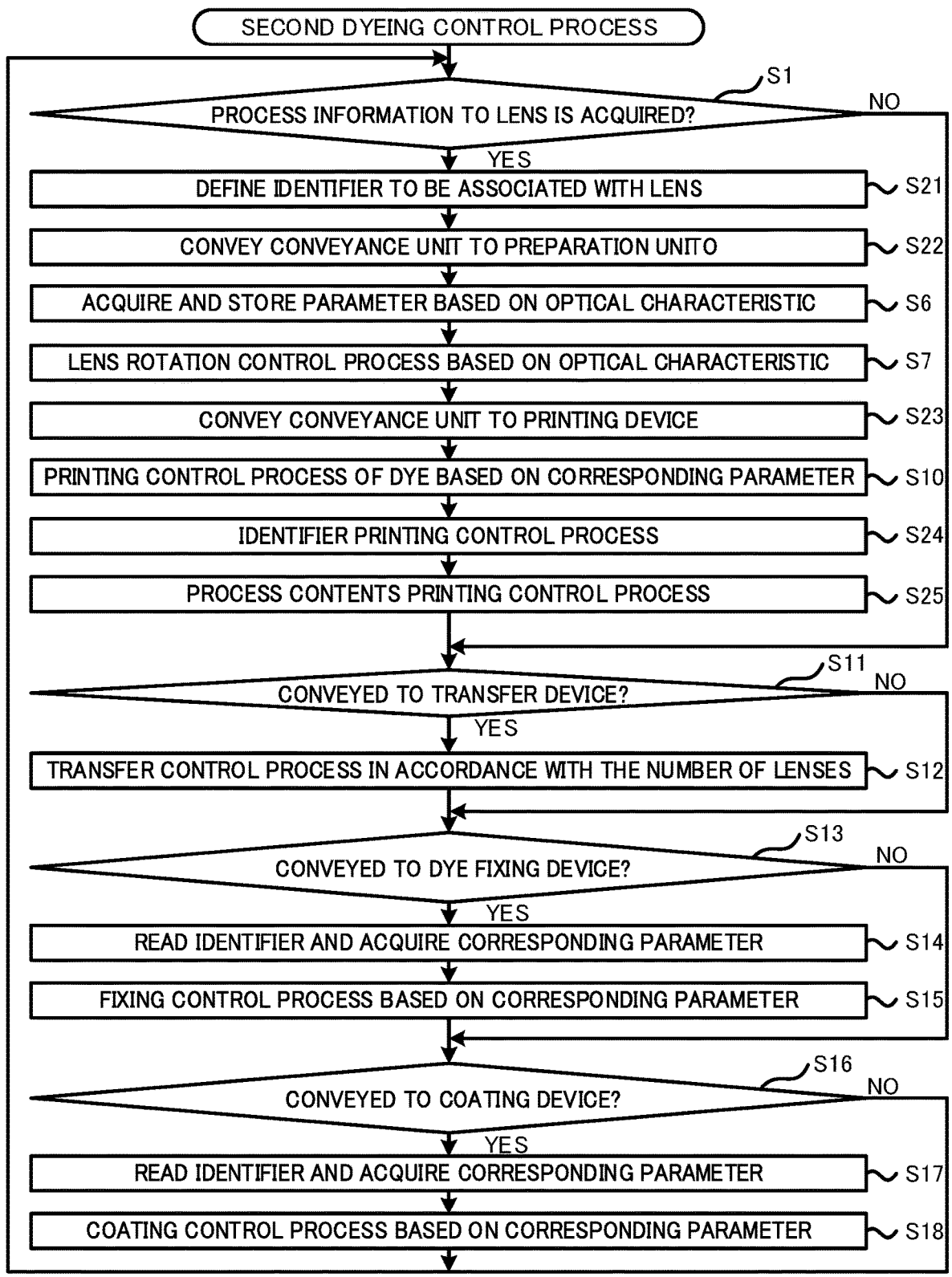
FIG. 14 is a flowchart illustrating one example of a second dyeing control process executed by the controller 71.
Figure 15:
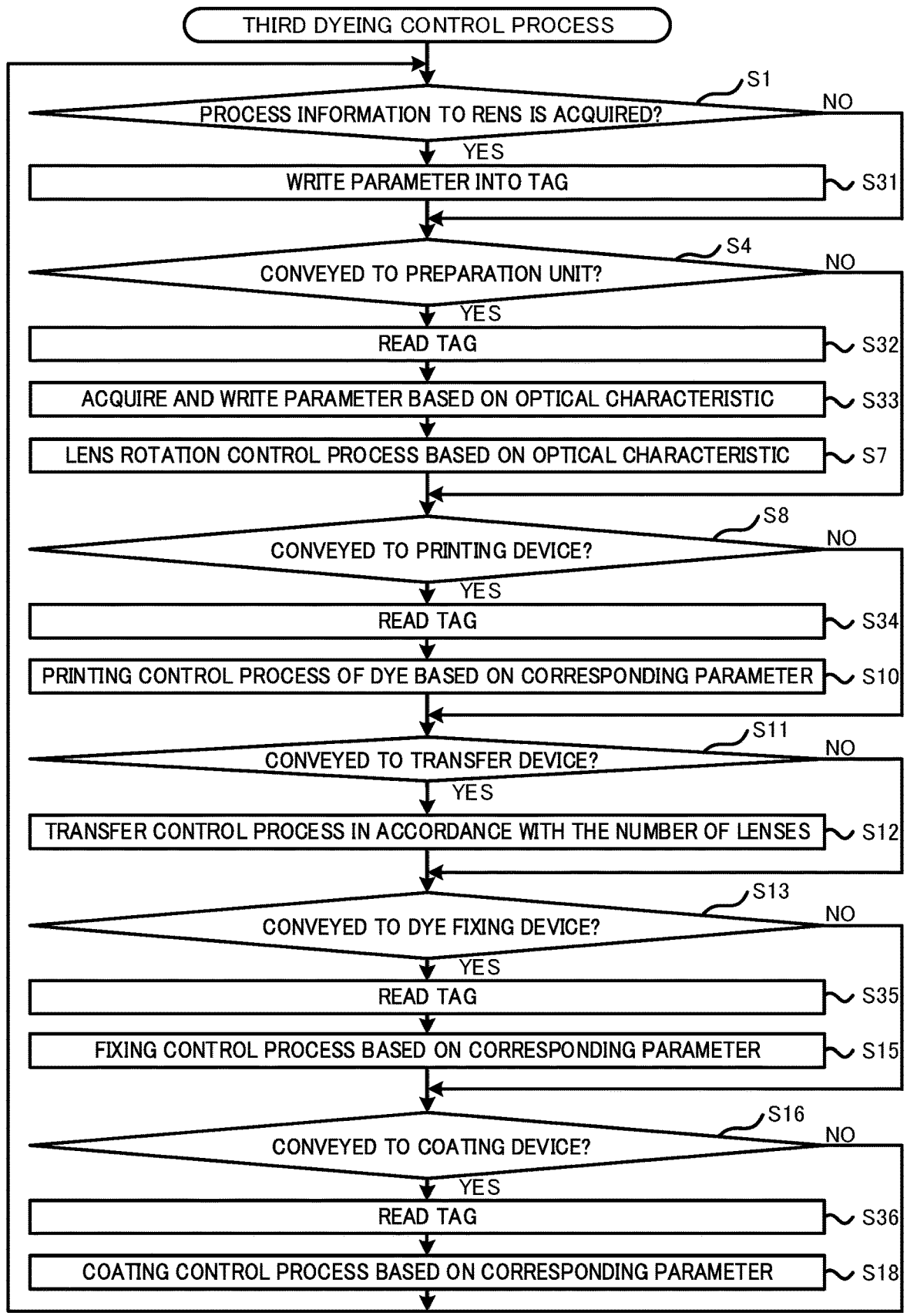
FIG. 15 is a flowchart illustrating one example of a third dyeing control process executed by the controller 71.

The process that acquires the parameter in S5, S9, S14, and S17 shown in FIGS. 13, S14 and S17 shown in FIG. 14, and S32, S34, S35, and S36 shown in FIG. 15 is one example of "a parameter acquisition step". The process that controls the dye fixing device in S15 shown in FIGS. 13 to 15 is one example of "a fixing control step". The process that associates and stores the parameter with the identifier in S3 shown in FIG. 13 is one example of "an associating step". The process that prints the identifier on the substrate S in S24 shown in FIG. 14 is one example of "an identifier printing control step". The process that causes the printing device 30 to print the dye in S10 shown in FIGS. 13 to 15 is one example of "a printing control step". The process that controls the rotation device 22 in S7 shown in FIGS. 13 to 15 is one example of "a rotation control step". The process that controls the coating device in S18 shown in FIGS. 13 to 15 is one example of "a coating control step".

The process that defining the discharge amount of the dye for dyeing the lens L in the planned color in S43 shown in FIG. 16 and S62 shown in FIG. 17 is one example of "a discharge amount defining step". The process that acquires the result color information in S47 shown in FIGS. 16 and 17 is one example of "a result color information acquisition step". The process that corrects the defining procedure in S49 shown in FIG. 16 and S66 shown in FIG. 17 is one example of "a correcting step". The quality inferior notification process executed in S63 shown in FIG. 17 is one example of "a notifying step".

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A dyeing system that dyes a resin body, the dyeing system comprising:
   a conveyance device configured to convey a conveyance unit receiving the resin body;
   a reader configured to read information relating to the conveyance unit;
   a dye transfer device including a heater;
   a dye fixing device including a laser beam source that is configured to emit a laser beam and a scanning unit that is configured to scan the resin body with the laser beam emitted by the laser beam source; and
   a controller configured to perform a dye transfer process and a dye fixing process, wherein
   during the dye transfer process, the controller is configured to control the dye transfer device to transfer, onto a surface of the resin body, a dye on a substrate that faces the resin body by heating the dye on the substrate using the heater; and
   during the dye fixing process, the controller is configured to:
      acquire, based on the information read by the reader, a parameter set for the resin body in accordance with characteristics of the resin body, and
      control the dye fixing device to fix the transferred dye into the surface of the resin body by heating the surface of the resin body using the laser beam source and the scanning unit; and
   during the dye fixing process, the controller is further configured to control the scanning unit to scan the surface of the resin body with the laser beam emitted from the laser beam source in accordance with the acquired parameter.

2. The dyeing system according to claim 1, wherein
   the dye fixing device is configured to irradiate the laser beam to the resin body to heat the resin body.

3. The dyeing system according to claim 1, wherein
   the conveyance unit is a plurality of conveyance units,
   the reader comprises an identifier reader configured to read an identifier arranged for each of the plurality of conveyance units, and
   the controller is configured to acquire the parameter of each of the plurality of conveyance units corresponding to the identifier read by the identifier reader from a database that stores the parameter for each of the plurality of conveyance units.

4. The dyeing system according to claim 3, wherein the controller is configured to, based on process information that indicates process contents to be executed to the resin body, associate the parameter indicating the process contents with the identifier of the conveyance unit in which the resin body is included and cause the database to store the parameter.

5. The dyeing system according to claim 3, further comprising a printing device configured to print the dye on the substrate,
   wherein the controller is configured to control the printing device to print the identifier corresponding to the conveyance unit on the substrate together with the dye.

6. The dyeing system according to claim 3, wherein the conveyance unit comprises an installation portion in which the resin body is installed, and
   the identifier is installed in the installation portion.

7. The dyeing system according to claim 1, wherein the reader comprises a tag reader that reads the information from a writable tag installed in the conveyance unit, and
   the controller is configured to acquire the parameter included in the information read by the tag reader.

8. The dyeing system according to claim 1, wherein the reader comprises an optical characteristic measuring device configured to measure an optical characteristic of the resin body formed as a lens, and
   the controller is configured to acquire a parameter for controlling the dye fixing device based on the optical characteristic of the lens measured by the optical characteristic measuring device.

9. The dyeing system according to claim 1, further comprising at least one dyeing process executing device configured to execute a process other than dye fixation,
   wherein the conveyance device is configured to convey the conveyance unit to each of the dye fixing device and the dyeing process executing device, and
   when the controller causes the dyeing process executing device to execute the dyeing process to the resin body in the conveyance unit of which the information is read, the controller is configured to control the dyeing process executing device based on the acquired parameter.

10. The dyeing system according to claim 1, further comprising a printing device configured to print the dye on the substrate,
   wherein, when the controller causes the printing device to print the dye on the substrate used in the conveyance unit of which the information is read, the controller is configured to control the printing device based on the acquired parameter.

11. The dyeing system according to claim 10, further comprising a rotation device configured to define an orientation of the resin body against the substrate on which the dye is printed by rotating the resin body for each conveyance unit conveyed by the conveyance device, wherein, when the controller causes the rotation device to rotate the resin body in the conveyance unit of which the information is read, the controller is configured to control the rotation device based on the acquired parameter.

12. The dyeing system according to claim 1, further comprising a coating device configured to coat the surface of the resin body to which the dye is fixed by the dye fixing device for each conveyance unit conveyed by the conveyance device,
   wherein, when the controller causes the coating device to coat the resin body in the conveyance unit of which the information is read, the controller is configured to control the coating device based on the acquired parameter.

13. The dyeing system according to claim 1, further comprising a printing device configured to print the dye on the substrate,
   wherein the conveyance device is configured to convey the conveyance unit from the printing device to the transfer device.

14. The dyeing system according to claim 1, wherein the controller is further configured to control the scanning unit by changing a scanning speed of the laser beam for the resin body based on the acquired parameter.

15. The dyeing system according to claim 1, wherein the heater is a halogen heater.

* * * * *